(12) United States Patent
Sunkavalli et al.

(10) Patent No.: US 11,538,216 B2
(45) Date of Patent: Dec. 27, 2022

(54) DYNAMICALLY ESTIMATING LIGHT-SOURCE-SPECIFIC PARAMETERS FOR DIGITAL IMAGES USING A NEURAL NETWORK

(71) Applicants: Adobe Inc., San Jose, CA (US); Université Laval, Québec (CA)

(72) Inventors: Kalyan Sunkavalli, San Jose, CA (US); Yannick Hold-Geoffroy, San Jose, CA (US); Christian Gagne, Quebec City (CA); Marc-Andre Gardner, Quebec City (CA); Jean-Francois Lalonde, Quebec City (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/558,975

(22) Filed: Sep. 3, 2019

(65) Prior Publication Data
US 2021/0065440 A1 Mar. 4, 2021

(51) Int. Cl.
*G06T 15/00* (2011.01)
*G06T 15/50* (2011.01)
(Continued)

(52) U.S. Cl.
CPC ............ *G06T 15/506* (2013.01); *G06N 3/08* (2013.01); *G06T 7/50* (2017.01); *G06T 7/60* (2013.01);
(Continued)

(58) Field of Classification Search
CPC .. G06T 17/00; G06T 5/00; G06T 5/50; G06T 15/00; G06T 15/50; G06T 15/60
(Continued)

(56) References Cited

U.S. PATENT DOCUMENTS

| 8,385,637 B2 * | 2/2013 | Finlayson | G06T 7/90 |
| | | | 382/162 |
| 10,586,394 B2 * | 3/2020 | Perez-Ramirez | G01S 5/16 |

(Continued)

FOREIGN PATENT DOCUMENTS

WO WO-2021248252 A1 * 12/2021 ............... G06T 1/40

OTHER PUBLICATIONS

Kán P, Kafumann H. Deeplight: light source estimation for augmented reality using deep learning. The Visual Computer. Jun. 2019; 35(6):873-83.*

(Continued)

*Primary Examiner* — Phu K Nguyen
(74) *Attorney, Agent, or Firm* — Keller Preece PLLC

(57) ABSTRACT

This disclosure relates to methods, non-transitory computer readable media, and systems that can render a virtual object in a digital image by using a source-specific-lighting-estimation-neural network to generate three-dimensional ("3D") lighting parameters specific to a light source illuminating the digital image. To generate such source-specific-lighting parameters, for instance, the disclosed systems utilize a compact source-specific-lighting-estimation-neural network comprising both common network layers and network layers specific to different lighting parameters. In some embodiments, the disclosed systems further train such a source-specific-lighting-estimation-neural network to accurately estimate spatially varying lighting in a digital image based on comparisons of predicted environment maps from a differentiable-projection layer with ground-truth-environment maps.

11 Claims, 21 Drawing Sheets

(51) Int. Cl.
  *G06T 7/50* (2017.01)
  *G06T 7/90* (2017.01)
  *G06T 7/70* (2017.01)
  *G06N 3/08* (2006.01)
  *G06T 7/60* (2017.01)

(52) U.S. Cl.
  CPC .................. *G06T 7/70* (2017.01); *G06T 7/90* (2017.01); *G06T 2200/24* (2013.01); *G06T 2207/20081* (2013.01); *G06T 2207/20084* (2013.01)

(58) Field of Classification Search
  USPC ......................................................... 345/418
  See application file for complete search history.

(56) References Cited

U.S. PATENT DOCUMENTS

2019/0043261 A1* 2/2019 Perez-Ramirez .... G06K 9/6202
2019/0331513 A1* 10/2019 Jalilian ................... G06N 3/08

OTHER PUBLICATIONS

Gardner MA, Hold-Geoffroy Y, Sunkavalli K, Gagné C, Lalonde JF. Deep Parametric Indoor Lighting Estimation. arXiv preprint arXiv :1910.08812. Oct. 19, 2019.*
Gardner MA, Sunkavalli K, Yumer E, Shen X, Gambaretto E, Gagné C, Lalonde JF. Learning to predict indoor illumination from a single image. arXiv preprint arXiv: 1704.00090. Apr. 1, 2017.*
Nieto G, Jiddi S, Robert P. Robust Point Light Source Estimation Using Differentiable Rendering. arXiv preprint arXiv:1812.04857. Dec. 12, 2018.*
LeGendre C, Ma WC, Fyffe G, Flynn J, Charbonnel L, Busch J, Debevec P. DeepLight: Learning Illumination for Unconstrained Mobile Mixed Reality. In 2019 IEEE/CVF Conference on Computer Vision and Pattern Recognition (CVPR) Jun. 15, 2019 (pp. 5911-5921). IEEE.*
Mandi D, Yi KM, Mohr P, Roth PM, Fua P, Lepetit V, Schmalstieg D, Kalkofen D. Learning lightprobes for mixed reality illumination. In2017 IEEE International Symposium on Mixed and Augmented Reality (ISMAR) Oct. 9, 2017 (pp. 82-89). IEEE.*
F. Banterle, M. Callieri, M. Dellepiane, M. Corsini, F. Pellacini, and R. Scopigno. EnvyDepth: An interface for recovering local natural illumination from environment maps. Computer Graphics Forum, 32(7):411-420, 2013.
J. Barron and J. Malik. Shape, illumination, and reflectance from shading. IEEE Transactions on Pattern Analysis and Machine Intelligence, 37(8):1670-1687, 2013.
J. Barron and J. Malik. Intrinsic scene properties from a single rgb-d image. TPAMI, 2015.
V. Blanz and T. Vetter. A morphable model for the synthesis of 3d faces. In SIGGRAPH, pp. 187-194, 1999.
A. Chang, A. Dai, T. Funkhouser, M. Halber, M. Niessner, M. Savva, S. Song, A. Zeng, and Y. Zhang. Matterport3D: Learning from RGB-D data in indoor environments. International Conference on 3D Vision (3DV), 2017.
P. Debevec. Rendering synthetic objects into real scenes: Bridging traditional and image-based graphics with global illumination and high dynamic range photography. In Proceedings of the 25th Annual Conference on Computer Graphics and Interactive Techniques, SIGGRAPH, pp. 189-198, 1998.
M.-A. Gardner, K. Sunkavalli, E. Yumer, X. Shen, E. Gambaretto, C. Gagné , and J.-F. Lalonde. Learning to predict indoor illumination from a single image. ACM Transactions on Graphics (SIGGRAPH Asia), 9(4), 2017.
S. Georgoulis, K. Rematas, T. Ritschel, M. Fritz, T. Tuytelaars, and L. V. Gool. What is around the camera? In ICCV, 2017.
R. Grosse, M. K. Johnson, E. H. Adelson, and W. T. Freeman. Ground truth dataset and baseline evaluations for intrinsic image algorithms. In IEEE International Conference on Computer Vision, 2009.
Y. Hold-Geoffroy, K. Sunkavalli, S. Hadap, E. Gambaretto, and J. Lalonde. Deep outdoor illumination estimation. In IEEE Conference on Computer Vision and Pattern Recogni-tion, 2017.
K. Karsch, V. Hedau, D. Forsyth, and D. Hoiem. Rendering synthetic objects into legacy photographs. ACM Transactions on Graphics, 30(6):1, 2011.
K. Karsch, K. Sunkavalli, S. Hadap, N. Carr, H. Jin, R. Fonte, M. Sittig, and D. Forsyth. Automatic scene inference for 3d object compositing. ACM Transactions on Graphics, (3):32:1-32:15, 2014.
J. F. Lalonde, A. A. Efros, and S. G. Narasimhan. Estimating the natural illumination conditions from a single outdoor image. International Journal of Computer Vision, 98(2):123-145, 2012.
T.-M. Li, M. Aittala, F. Durand, and J. Lehtinen. Differentiable monte carlo ray tracing through edge sampling. ACM Trans. Graph. (Proc. SIGGRAPH Asia), 37(6):222:1-222:11, 2018.
Z. Li, Z. Xu, R. Ramamoorthi, K. Sunkavalli, and M. Chandraker. Learning to reconstruct shape and spatially-varying reflectance from a single image. ACM Trans. Graph., 37(6):269:1-269:11, Dec. 2018.
G. Liu, D. Ceylan, E. Yumer, J. Yang, and J.-M. Lien. Material editing using a physically based rendering network. 2017.
S. Lombardi and K. Nishino. Reflectance and illumination recovery in the wild. IEEE Transactions on Pattern Analysis and Machine Intelligence, 38(1):129-141, 2016.
J. Lopez-Moreno, E. Garces, S. Hadap, E. Reinhard, and D. Gutierrez. Multiple Light Source Estimation in a Single Image. Computer Graphics Forum, 2013.
R. Maier, K. Kim, D. Cremers, J. Kautz, and M. Nießner. Intrinsic3d: High-quality 3D reconstruction by joint appearance and geometry optimization with spatially-varying lighting. InInternational Conference on Computer Vision (ICCV), Venice, Italy, Oct. 2017.
S. R. Marschner and D. P. Greenberg. Inverse lighting for photography. InIS&T Color Imaging Conference, 1997.
A. Meka, M. Maximov, M. Zollhoefer, A. Chatterjee, H.P. Seidel, C. Richardt, and C. Theobalt. Lime: Live intrinsic material estimation. InIEEE Conference on Computer Vision and Pattern Recognition, 2018.
S. Song, F. Yu, A. Zeng, A. X. Chang, M. Savva, and T. Funkhouser. Semantic scene completion from a single depth image. IEEE Conference on Computer Vision and Pattern Recognition, 2017.
J. Xiao, K. A. Ehinger, A. Oliva, and A. Torralba. Recognizing scene viewpoint using panoramic place representation. In IEEE Conference on Computer Vision and Pattern Recognition, 2012.
E. Zhang, M. F. Cohen, and B. Curless. Emptying, refurnishing, and relighting indoor spaces.ACM Transactions on Graphics, 35(6), 2016.

* cited by examiner

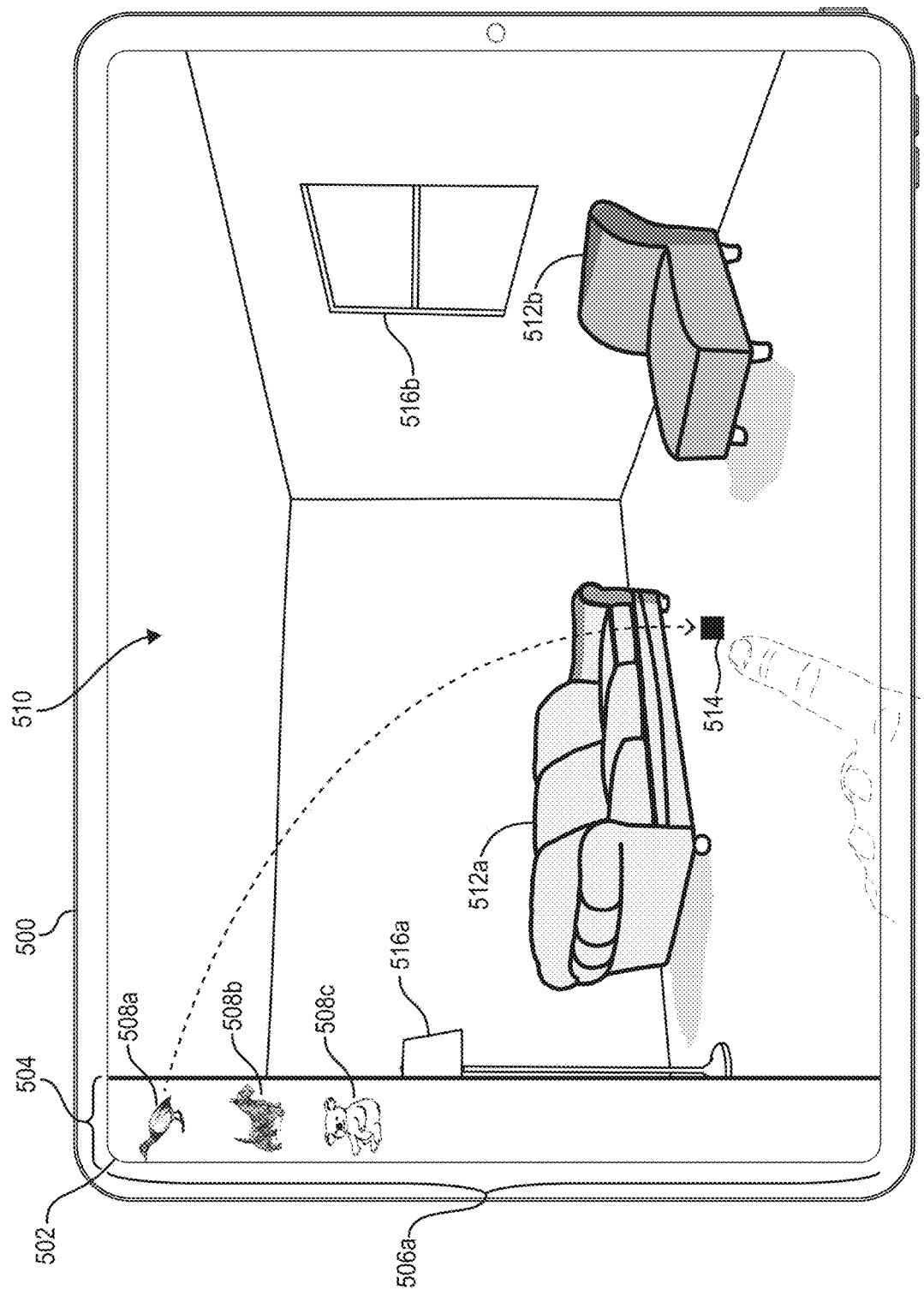

DYNAMICALLY ESTIMATING LIGHT-SOURCE-SPECIFIC PARAMETERS FOR DIGITAL IMAGES USING A NEURAL NETWORK

BACKGROUND

Digital imagery systems often portray digitally enhanced images or other scenes with visual effects. For example, some existing digital imagery systems render both real objects and computer-simulated objects in scenes that include lighting from light sources either within or without a field of view for digital images. Some digital imagery systems adjust the color, intensity, or other features of lighting from multiple light sources. When a digital image includes lighting from multiple light sources, a digital imagery system may need to solve complex problems to reflect spatially varying lighting from multiple sources—particularly for indoor digital images. Despite making significant advances, existing digital imagery systems exhibit limitations that inhibit such systems from quickly rendering objects at positions, accurately and realistically rendering objects with spatially varying lighting, and training a neural network to generate spatially varying lighting parameters.

To render digital images with lighting for a computer-simulated object, for example, some conventional digital imagery systems recover geometry, reflectance, and illumination from a single digital image of an arbitrary object using hand-crafted priors for components of the digital image. In some cases, conventional digital imagery systems assume the geometry of indoor scenes based on known geometries. But both hand-crafted priors and assumed geometry often result in lighting parameters that unrealistically portray lighting conditions of computer-simulated objects in a digital image, particularly for scenes with light from multiple sources. Such systems often cannot illuminate virtual objects with lighting that matches that of a real physical scene.

In addition to unrealistic portrayals of lighting, some existing digital imagery systems solve complex computing problems or use overly complicated network architectures that slow down the output of lighting parameters. In some cases, for instance, existing digital imagery systems reconstruct a multi-view three-dimensional model of a digital image's geometry as a basis for generating lighting parameters. Further, some existing digital imagery systems apply a rendering-based optimization to estimate scene geometry and reflectance, detect light-source positions, and estimate light source intensities—but only by applying challenging inverse computing equations solved with heuristics.

Both reconstruction of a scene's geometry and computationally heavy inverse equations slow down the computational time in which such systems generate lighting parameters. As objects move or lighting changes within a physical environment, such digital imagery systems accordingly consume excessive time and user input to portray lighting for virtual objects in different positions or different lighting conditions.

SUMMARY

This disclosure describes embodiments of methods, non-transitory computer readable media, and systems that solve the foregoing problems and provide other benefits. For example, the disclosed systems can render a virtual object in a digital image by using a source-specific-lighting-estimation-neural network to generate three-dimensional ("3D") lighting parameters specific to a light source illuminating the digital image. To generate such source-specific-lighting parameters, for instance, the disclosed systems utilize a compact source-specific-lighting-estimation-neural network comprising both common network layers and network layers specific to different lighting parameters. In some embodiments, the disclosed systems further train such a source-specific-lighting-estimation-neural network to accurately estimate spatially varying lighting in a digital image based on comparisons of predicted environment maps from a differentiable-projection layer with ground-truth-environment maps.

In some embodiments, for example, the disclosed systems identify a request to render a virtual object at a designated position within a digital image. The disclosed systems subsequently extract a common feature vector from the digital image utilizing common network layers of a source-specific-lighting-estimation-neural network. Based on the common feature vector, the systems further generate 3D-source-specific-lighting parameters utilizing parametric-specific-network layers of the source-specific-lighting-estimation-neural network. In response to the request to render, the systems accordingly render a modified digital image comprising the virtual object at the designated position illuminated according to the 3D-source-specific-lighting parameters.

The following description sets forth additional features and advantages of the disclosed methods, non-transitory computer readable media, and systems, and may make such additional features and advantages obvious or disclose them from the practice of exemplary embodiments.

BRIEF DESCRIPTION OF THE DRAWINGS

The detailed description refers to the drawings briefly described below.

FIGS. 5A-5C illustrate a computing device rendering a digital image comprising a virtual object at different designated positions according to 3D-source-specific-lighting parameters in accordance with one or more embodiments.

DETAILED DESCRIPTION

Figure 1:
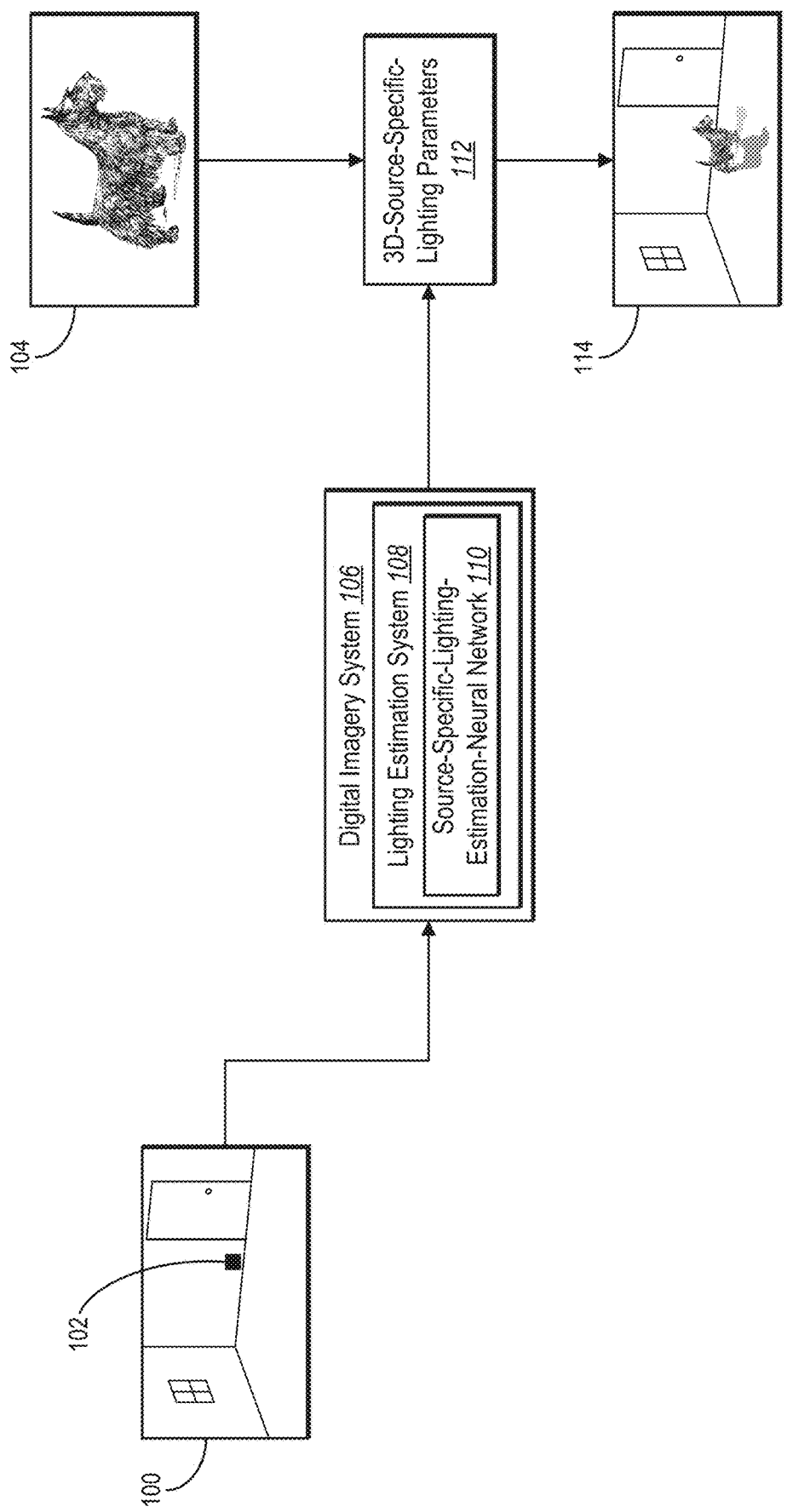
FIG. 1 illustrates a digital imagery system and a lighting estimation system using a source-specific-lighting-estimation-neural network to generate 3D-source-specific-lighting parameters and render a digital image comprising a virtual object at a designated position according to the parameters in accordance with one or more embodiments.

This disclosure describes one or more embodiments of a lighting estimation system that uses a source-specific-lighting-estimation-neural network to estimate lighting parameters specific to predicted light sources illuminating a digital image and render a virtual object in the digital image according to such source-specific-lighting parameters. Based on a request to render a virtual object in a digital image, for example, the lighting estimation system uses the source-specific-lighting-estimation-neural network to analyze the digital image and generate 3D-source-specific-lighting parameters. The lighting estimation system can further modify such 3D-source-specific-lighting parameters based on user input, a change in position, or a change in lighting conditions within a digital image.

In some embodiments, for instance, the lighting estimation system identifies a request to render a virtual object at a designated position within a digital image. To render such a scene, the lighting estimation system extracts a common feature vector from the digital image utilizing common network layers of a source-specific-lighting-estimation-neural network. Based on the common feature vector, the lighting estimation system further generates 3D-source-specific-lighting parameters utilizing parametric-specific-network layers of the source-specific-lighting-estimation-neural network. In response to the request to render, the lighting estimation system renders a modified digital image comprising the virtual object at the designated position illuminated according to the 3D-source-specific-lighting parameters.

In addition to generating 3D-source-specific-lighting parameters, the lighting estimation system can generate each set of 3D-source-specific-lighting parameters comprising different lighting parameters for a particular light source. For example, a set of 3D-source-specific-lighting parameters can be both specific to a predicted light source and include different parameters corresponding to the predicted light source. Among other parameters described below, a set of 3D-source-specific-lighting parameters can include, for instance, 3D-source-specific-distance parameters and 3D-source-specific-direction parameters respectively estimating a distance and a direction of a predicted light source from a reference point (e.g., a camera, a focal point of a camera). Such 3D-source-specific-lighting parameters can further include source-specific-size parameters and source-specific-color parameters respectively estimating a size and a color of a predicted light source. As indicated below, 3D-source-specific-lighting parameters can further capture high dynamic range ("HDR") lighting throughout a digital image even when the digital image is represented in low dynamic range ("LDR") lighting.

To generate 3D-source-specific-lighting parameters, in some embodiments, the lighting estimation system uses a source-specific-lighting-estimation-neural network comprising both common network layers and parametric-specific-network layers. In certain implementations, for instance, the lighting estimation system uses a first subset of common network layers to extract a latent feature vector from a digital image and a second subset of common network layers to extract a common feature vector from the latent feature vector. The lighting estimation system subsequently applies different sets of the parametric-specific-network layers to generate different lighting parameters as part of a set of 3D-source-specific-lighting parameters. Among other network layers described below, the parametric-specific-network layers can include, for instance, distance-parametric-specific-network layers and direction-parametric-specific-network layers.

As suggested above, the lighting estimation system can apply parametric-specific-network layers to generate 3D-source-specific-lighting parameters based on a common feature vector. In some cases, the lighting estimation system uses part of such 3D-source-specific-lighting parameters as an input for other 3D-source-specific-lighting parameters. For example, in certain implementations, the lighting estimation system generates 3D-source-specific-distance parameters estimating a distance of a light source from a reference point based on both a latent feature vector and 3D-source-specific-direction parameters utilizing (in part) distance-parametric-specific-network layers from the parametric-specific-network layers.

In addition to generating and illuminating a modified digital image with 3D-source-specific-direction parameters, in some cases, the lighting estimation system provides lighting parameter controls to adjust individual lighting parameters within a set of 3D-source-specific-lighting parameters. For example, the lighting estimation system can provide a client device with a graphical user interface comprising lighting parameter controls for 3D-source-specific-lighting parameters corresponding to different predicted light sources illuminating a modified digital image.

By providing lighting parameter controls with which users can interact and adjust, the lighting estimation system facilitates light-source-specific visual effects or other light-source-specific adjustments.

In certain embodiments, the lighting estimation system not only applies a source-specific-lighting-estimation-neural network but can optionally train such a network to generate 3D-source-specific-lighting parameters. To avoid the challenges of mismatching lighting parameters with the wrong light source, for instance, the lighting estimation system can train the source-specific-lighting-estimation-neural network in two stages. In a first training stage, for example, the lighting estimation system can apply a differentiable-projection layer to 3D-source-specific-predicted-lighting parameters to project a predicted environment map corresponding to a digital training image and compare the environment map to a ground-truth-environment map corresponding to the digital training image. By comparing the predicted environment map to the ground-truth-environment map, the lighting estimation system determines an environment-map loss. Through multiple training iterations of the first training stage, the lighting estimation system modifies internal parameters of the source-specific-lighting-estimation-neural network based on such environment-map losses until a point of convergence.

In a second training stage, for example, the lighting estimation system can compare subsequent 3D-source-specific-predicted-lighting parameters to ground-truth-source-specific-lighting parameters corresponding to a subsequent digital training image to determine lighting parameter losses. Through multiple training iterations of the second training stage, the lighting estimation system modifies internal parameters of the parametric-specific-network layers based on the lighting parameter losses until a point of convergence—while simultaneously maintaining internal parameters of the common network layers.

In some embodiments, the multi-stage training process of the lighting estimation system facilitates tuning a neural network to output more accurate lighting parameters. By using a differentiable-projection layer and environment maps in the first training stage, the lighting estimation system avoids mismatching (and trains for the correct matching of) 3D-source-specific-predicted-lighting parameters with a predicted light source. By using ground-truth-source-specific-lighting parameters in the second training stage, the lighting estimation system can fine-tune the parametric-specific-network layers to generate more accurate lighting parameters corresponding to a predicted light source.

As further suggested above, the disclosed lighting estimation system overcomes several technical deficiencies that hinder conventional digital imagery systems. For example, the lighting estimation system improves the accuracy and realism with which existing digital imagery systems generate spatially varying lighting for a digital image. As noted above and described below, the lighting estimation system can create such realistic lighting in part by using a source-specific-lighting-estimation-neural network trained to analyze features from individual light sources illuminating a digital image and generate 3D-source-specific-lighting parameters comprising different parameters for one or more predicted light sources.

Unlike some conventional systems that render unnatural lighting for virtual objects using hand-crafted priors or assumed geometries, the disclosed lighting estimation system can create lighting parameters with source-specific-level accuracy for a digital image. Further unlike certain conventional systems that fail to differentiate parameters among different light sources, the disclosed lighting estimation system can create lighting parameters that capture lighting conditions and shading emanating from a particular light source either inside or outside a digital image's field of view. To attain such accuracy, in some embodiments, the lighting estimation system generates 3D-source-specific-lighting parameters using a neural network tuned in training stages using one or both of ground-truth-environment maps and ground-truth-source-specific-lighting parameters.

In addition to source-specific-level parameters output by a source-specific-lighting-estimation-neural network, the lighting estimation system provides control options to adjust lighting parameters specific to predicted light sources illuminating a modified digital image. Unlike some conventional digital imagery systems that can adjust lighting parameters for undifferentiated lighting conditions, the lighting estimation system can provide more flexibility in lighting adjustments. In some embodiments, for example, the lighting estimation system provides lighting parameter controls to adjust individual parameters within a set of 3D-source-specific-lighting parameters for visual effects or other lighting adjustments—including, but not limited to, controls for adjusting a distance, direction, size, and color of a particular light source.

In addition to more realistically portraying spatially varying lighting, the disclosed lighting estimation system can also simplify the network architecture and internal parameters with which a digital imagery system outputs lighting parameters. As suggested above, some existing digital imagery systems use decoders to produce HDR intensity and red, green, and blue ("RGB") environment maps from a latent feature vector. By contrast, in some embodiments, the lighting estimation system uses a neural network comprising parametric-specific-layers that infer 3D-source-specific-lighting parameters from a latent feature vector. Such inference makes for a faster neural network by allowing a reduced number of network parameters (e.g., less than 10 million network parameters) compared to conventional networks that use a large number of network parameters (e.g., 34 million network parameters). By using simpler decoders in the parametric-specific-layers, the lighting estimation system uses a faster source-specific-lighting-estimation-neural network. This faster network results in more computing efficiency, where the lighting estimation system can generate parameters in roughly 51 milliseconds per digital image on a central processing unit ("CPU") compared to 127 milliseconds or 5 minutes for existing digital imagery systems.

In addition to more accurate lighting parameters and enhanced computing efficiency, in certain implementations, the lighting estimation system simplifies and avoids compounding errors in training a source-specific-lighting-estimation-neural network. As suggested above, multiple light sources illuminating an image or other digital images can complicate training a neural network to learn lighting parameters representing such multiple sources. When a digital imagery system attempts to learn lighting parameters specific to individual light sources, for example, a neural network can attribute lighting features to the wrong light source, particularly during early training stages. Such a mismatch of lighting parameters with light sources can foment inaccuracies through the training process and propagate errors in training iteration after training iteration. In short, a neural network can be challenging to train properly for lighting parameters corresponding to multiple light sources.

To avoid such a mismatch of lighting parameters with the wrong light source, in some embodiments, the lighting estimation system uses a differentiable-projection layer to convert 3D-source-specific-predicted-lighting parameters to a predicted environment map. The lighting estimation system can train the source-specific-lighting-estimation-neural network based on comparisons of such predicted environment maps to ground-truth-environment maps in an initial training stage. By using such environment maps for training, the lighting estimation system avoids correlating 3D-source-specific-predicted-lighting parameters with an incorrect light source during initial training iterations. After training the source-specific-lighting-estimation-neural network to a point of convergence using ground-truth-environment maps, the lighting estimation system can further train the source-specific-lighting-estimation-neural network to generate 3D-source-specific-predicted-lighting parameters based on ground-truth-source-specific-lighting parameters.

Turning now to FIG. 1, this figure illustrates a digital imagery system 106 and a lighting estimation system 108 using a neural network to estimate 3D-source-specific-lighting parameters. In general, and as shown in FIG. 1, the lighting estimation system 108 identifies a request to render a virtual object 104 at a designated position within a digital image 100. The lighting estimation system 108 uses a source-specific-lighting-estimation-neural network 110 to generate 3D-source-specific-lighting parameters 112 for the digital image 100. Based on the request, the digital imagery system 106 renders a modified digital image 114 comprising the virtual object 104 at the designated position illuminated according to the 3D-source-specific-lighting parameters 112. While FIG. 1 depicts the digital imagery system 106 comprising the lighting estimation system 108 and rendering the modified digital image 114, the lighting estimation system 108 may alternatively render the modified digital image 114 by itself.

As just noted, the lighting estimation system 108 can identify a request to render the virtual object 104 at a designated position within the digital image 100. For instance, the lighting estimation system 108 may identify a digital request from a computing device to render a virtual character (or other virtual item) at a particular position on a real floor (or another real item) depicted in a two-dimensional digital image. Alternatively, the lighting estimation system 108 may identify a digital request from a computing device based on computer-executable instructions part of a digital imagery application and accordingly not directly selected by a user. Regardless of the types of objects or scenes from a request, in some embodiments, the request to render the digital image includes an indication of a designated position at which to render a virtual object. For example, in some embodiments, the request includes a local position indicator 102 identifying the designated position, as shown in FIG. 1.

As used in this disclosure, the term "digital image" refers to a digitally rendered image or a depiction of objects. For example, in some embodiments, a digital image depicts a realistic scene from a particular field of view or from multiple fields of view. Such a digital image may be a two-dimensional LDR image for example. Regardless of format, the digital image may include depictions of light from multiple light sources, any one of which may be within or without a digital image's field of view. To illustrate, a digital image may depict a real indoor room containing walls, a floor, and furniture with light emanating from a lamp and from a window. As discussed further below, a digital image may be modified to include a virtual object in an adjusted or modified digital image.

Relatedly, the term "virtual object" refers to a computer-generated-graphical object that does not exist in the physical world. For example, a virtual object may include an object created by a computer for use within a digital imagery application. Such a virtual object may be, but is not limited to, virtual accessories, animals, characters, clothing, cosmetics, footwear, fixtures, furniture, furnishings, hair, people, physical human features, vehicles, or any other graphical object created by a computer. This disclosure generally uses the word "virtual" to designate specific virtual objects (e.g., "virtual pillow" or "virtual shoe"), but generally refers to real objects without the word "real" (e.g., "bed," "couch").

As further used herein, the term "local position indicator" refers to a digital identifier for a location within a digital image. For example, in certain implementations, a local position indicator includes a digital coordinate, pixel, or other marker indicating a designated position within a digital image from a request to render a virtual object. To illustrate, a local position indicator may be a coordinate representing a designated position or a pixel (or coordinate for a pixel) corresponding to the designated position. Among other embodiments, the lighting estimation system 108 may generate (and identify) a local position indicator as a designated position at which to render a virtual object within a digital image.

In addition to identifying a local position indicator, the lighting estimation system 108 uses the source-specific-lighting-estimation-neural network 110 to analyze the digital image 100 before rendering. For example, in some cases, the lighting estimation system 108 extracts a latent feature vector from the digital image 100 using a first subset of common network layers from the source-specific-lighting-estimation-neural network 110. The lighting estimation system 108 further extracts a common feature vector from the latent feature vector using a second subset of common network layers from the source-specific-lighting-estimation-neural network 110.

As used in this disclosure, the term "feature vector" refers to a multi-dimensional vector representing features of a digital image. Whereas a latent feature vector encodes or otherwise represents features of a digital image, a common feature vector encodes or otherwise represents abbreviated or modified features of the digital image. In some embodiments, for example, a latent feature vector constitutes a 3,072-dimensional vector representing an RGB image. In some cases, a common feature vector constitutes a 512-dimensional vector based on (or extracted from) the 3,072-dimensional vector.

The term "source-specific-lighting-estimation-neural network" refers to an artificial neural network that generates lighting parameters indicating features specific to one or more light sources illuminating a digital image. In particular, in certain implementations, a source-specific-lighting-estimation-neural network refers to an artificial neural network that generates location-specific-lighting-parameters indicating spatially varying lighting at different positions within a digital image illuminated by one or more light sources. In some embodiments, a source-specific-lighting-estimation-neural network comprises some or all of the following network layers: (i) a first subset of common network layers from a densely connected convolutional network ("DenseNet"), (ii) a second subset of common network layers comprising fully connected layers, and (iii) a parametric-specific decoder for each set of parametric-specific-network layers, such as discrete deconvolutional layers as decoders.

As further indicated above, the lighting estimation system 108 generates the 3D-source-specific-lighting parameters 112 based on the common feature vector utilizing parametric-specific-network layers of the source-specific-lighting-estimation-neural network 110. As used in this disclosure, the term "3D-source-specific-lighting parameters" refer to parameters that indicate lighting from a light source illuminating a digital image. For instance, in some embodiments, 3D-source-specific-lighting parameters define, specify, or otherwise indicate coloring, lighting, or shading of pixels based on a light source illuminating a digital image. Such 3D-source-specific-lighting parameters may, for example, define the shade or hue of pixels for a virtual object at a designated position.

As shown in FIG. 1, for example, the 3D-source-specific-lighting parameters 112 includes different sets of 3D-source-specific-lighting parameters corresponding to different predicted light sources. In some embodiments, a set of 3D-source-specific-lighting parameters corresponding to a predicted light source can comprise 3D-source-specific-distance parameters, 3D-source-specific-direction parameters, source-specific-size parameters, and source-specific-color parameters respectively estimating a distance of a predicted light source from a reference point, a direction of the predicted light source from the reference point, a size of the predicted light source from the reference point, and a color of the predicted light source.

As further shown in FIG. 1, after generating such lighting parameters, the digital imagery system 106 renders the modified digital image 114 comprising the virtual object 104 at the designated position illuminated according to the 3D-source-specific-lighting parameters 112. For example, in some implementations, the digital imagery system 106 superimposes or otherwise integrates a computer-generated image of the virtual object 104 within the digital image 100. As part of the rendering, the digital imagery system 106 selects and renders pixels for the virtual object 104 that reflect lighting, shading, or color hues indicated by the 3D-source-specific-lighting parameters 112 corresponding to different light sources.

Figure 2:
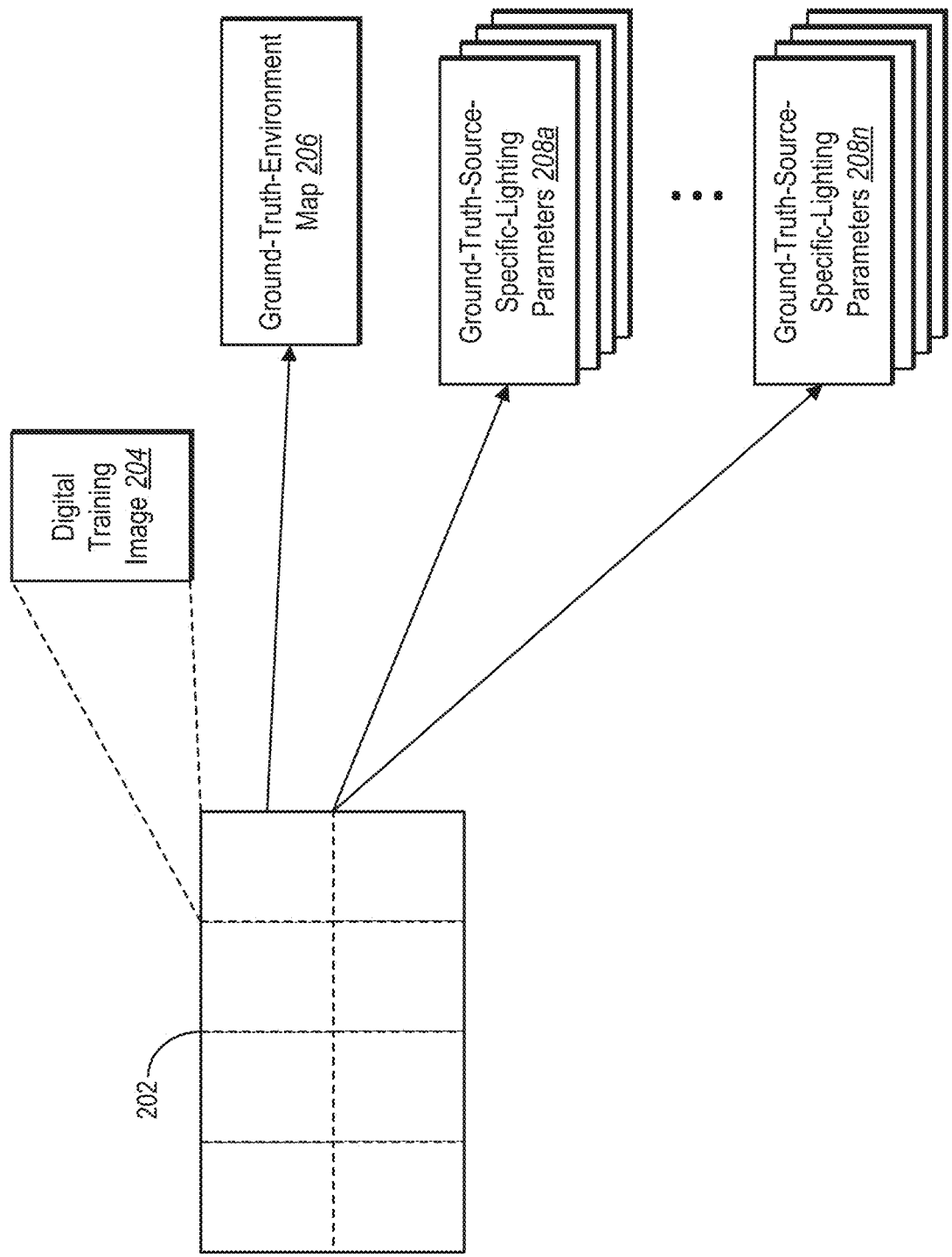
FIG. 2 illustrates a digital training image, a corresponding ground-truth-environment map, and corresponding ground-truth-source-specific-lighting parameters in accordance with one or more embodiments.

As noted above, the lighting estimation system 108 can train a neural network to generate 3D-source-specific-lighting parameters. To facilitate training a source-specific-lighting-estimation-neural network, in some embodiments, the digital imagery system 106 accesses or generates ground-truth datasets. As shown in FIG. 2, for example, the digital imagery system 106 can generate a digital training image, a corresponding ground-truth-environment map, and corresponding ground-truth-source-specific-training parameters for training such a source-specific-lighting-estimation-neural network. By generating digital training images and one or both of corresponding ground-truth-environment maps and ground-truth-source-specific-training parameters, the digital imagery system 106 creates ground-truth datasets for training the source-specific-lighting-estimation-neural network.

As shown in FIG. 2, the digital imagery system 106 optionally uses an HDR-panoramic image 202 (sometimes referred to as an HDR-environment map) as a basis or a precursor image for extracting a digital training image 204 and generating a ground-truth-environment map 206 and ground-truth-source-specific-lighting parameters 208a-208n corresponding to the digital training image 204. For instance, in some embodiments, the digital imagery system 106 uses HDR-panoramic images from the Laval Indoor HDR Dataset available online at indoor.hdrdb.com and described by Marc-André Gardner et al., "Learning to Predict Indoor Illumination from a Single Image," Vol. 36, Article No. 6, *ACM Transactions on Graphics* (2017) (hereinafter, "Gardner"), the entire contents of which are incorporated by reference. To facilitate estimating distance parameters for a light source corresponding to such HDR-panoramic images, in certain implementations, technicians annotate the HDR-panoramic images with per-pixel depth estimates in part by applying EnvyDepth to each HDR-panoramic image, as described by Francesco Banterle et al., "EnvyDepth: An Interface for Recovering Local Natural Illumination from Environment Maps," Vol. 32, Article No. 7, *Computer Graphics Forum* 411-420 (2013) (hereinafter, "Banterle"), the entire contents of which are incorporated by reference. Upon annotating the HDR-panoramic image 202 with depth estimates, the HDR-panoramic image 202 constitutes an HDR-environment map with RGB values and depth estimates at every pixel.

In addition to annotating an HDR-panoramic image, the digital imagery system 106 optionally generates or extracts the digital training image 204 from the HDR-panoramic image 202. For example, in certain implementations, the digital imagery system 106 crops limited field-of-view images from the HDR-panoramic image 202 to extract digital training images, such as by cropping an HDR-panoramic image into eight limited field-of-view HDR images. Accordingly, in some cases, the digital training image 204 constitutes a limited field-of-view HDR image from the HDR-panoramic image 202. Rather than generate the digital training image 204 from an HDR-panoramic image, the digital imagery system 106 can access existing digital training images from a database or a dataset, such as the Laval Indoor HDR Dataset.

While the foregoing examples represent the digital training image 204 as a two-dimensional HDR image, in certain implementations, the digital imagery system 106 uses alternative images or models as digital training images. For example, in one or more embodiments, the digital imagery system 106 may use a two-dimensional LDR image (e.g., extracted from an LDR-panoramic image) as a digital training image. Alternatively, in certain implementations, the digital imagery system 106 renders synthetic scenes or captures real scenes with reconstructed depth to generate digital training images. For purposes of illustration, however, FIG. 2 depicts the digital training image 204 as a two-dimensional HDR image.

Based on a location within the HDR-panoramic image 202 corresponding to the digital training image 204, the digital imagery system 106 optionally generates the ground-truth-environment map 206. For example, in some embodiments, the digital imagery system 106 applies a warping operator to the HDR-panoramic image 202 to warp the HDR-panoramic image 202 to the location of the digital training image 204 and performs thresholding on the warped HDR-panoramic image 202 until reaching 5% of its peak intensity value to generate the ground-truth-environment map 206. As suggested in Gardner, in some embodiments, the digital imagery system 106 applies the warping operator to an HDR-panoramic image from a reference point of a virtual camera to warp the HDR-panoramic image to a location corresponding to a limited field-of-view HDR image crop.

In the alternative to generating a ground-truth-environment map, in some cases, the digital imagery system 106 accesses an existing ground-truth-environment map corresponding to the HDR-panoramic image 202 from a database or a dataset, such as the Laval Indoor HDR Dataset or other HDR panorama dataset. To create a dataset of ground-truth-environment maps, the digital imagery system 106 can similarly generate or access ground-truth-environment maps corresponding to multiple panoramic images from a dataset.

In addition (or in the alternative) to generating the ground-truth-environment map 206 corresponding to the digital training image 204, in certain implementations, the digital imagery system 106 derives or otherwise generates ground-truth-source-specific-lighting parameters 208a-208n from the HDR-panoramic image 202 by applying a derivation algorithm. To perform the derivation algorithm, the digital imagery system 106 extracts a peak intensity value from the HDR-panoramic image 202 and applies simple-region detection to initialize light seeds from the HDR-panoramic image 202. The digital imagery system 106 subsequently "grows" or increases an initial light seed until the intensity value for the HDR-panoramic image 202 decreases to a third of the peak intensity value. After growing the intensity of the initial light seed to a third of the peak intensity value, the digital imagery system 106 can identify the initial light seed as a light source. By masking the initial light source and repeating the derivation algorithm for an additional light seed—if an additional light seed has been detected—the digital imagery system 106 can recognize additional light sources until reaching an energy threshold.

After identifying one or more light sources corresponding to the HDR-panoramic image 202, the digital imagery system 106 can determine the ground-truth-source-specific-lighting parameters 208a-208n based on the one or more light sources. For example, the digital imagery system 106 determines ground-truth-source-specific-distance parameters that estimate a distance of an individual light source from a reference point. Such a reference point may include, but is not limited to, a camera capturing a panoramic image, a virtual camera, a focal point of a camera, or a lens of a camera. The digital imagery system 106 can also determine ground-truth-source-specific-direction parameters that estimate a direction of the individual light source from the reference point. In some cases, the digital imagery system 106 can also determine ground-truth-source-specific-size parameters that estimate a size of the individual light source with respect to the reference point. Further, the digital imagery system 106 can determine ground-truth-source-specific-color parameters that estimate a color of the individual light source.

As suggested above, the digital imagery system 106 can determine ground-truth-source-specific distance, direction, size, and color parameters for each identified light source illuminating a digital training image. For example, in certain implementations, the digital imagery system 106 determines ground-truth-lighting parameters $\mathcal{P}$ corresponding to multiple light sources illuminating an input image $\mathcal{I}$, such as a digital training image or a panoramic image. In some cases, the digital imagery system 106 determines ground-truth-lighting parameters $\mathcal{P}$ according to the following equation:

$$\mathcal{P} = \{p_1, p_2, \ldots, p_N, a\} \tag{1}$$

In equation (1), $p_i$ represents a set of ground-truth-source-specific-lighting parameters corresponding to a particular light source, and a represents a ground-truth-ambient parameter estimating ambient light in a digital training image, where $a \in \mathbb{R}$. For example, the ground-truth-ambient parameter may estimate ambient light in terms of RGB values and (in some cases) represent an average of remaining light in a panoramic image unassigned to a light source. As indicated by equation (1), a given collection of ground-truth-lighting parameters $\mathcal{P}$ may include a first set of ground-truth-source-specific-lighting parameters $p_i$ corresponding to a first light source, a second set of ground-truth-source-specific-lighting parameters $p_2$ corresponding to a second light source, and any additional such sets up through an Nth set of ground-truth-source-specific-lighting parameters $p_N$ corresponding to an Nth light source.

As further suggested above, a given set of ground-truth-source-specific-lighting parameters $p_i$ corresponding to a particular light source may include different lighting parameters specific to the particular light source. For example, in some embodiments, a given set of ground-truth-source-specific-lighting parameters $p_i$ includes different lighting parameters according to the following equation:

$$p_i = \{l_i, d_i, s_i, c_i\} \tag{2}$$

In equation (2), $l_i$ represents ground-truth-source-specific-direction parameters estimating a direction of a light source from a reference point, where $l_i \in \mathbb{R}^3$. In some cases, $l_i$ constitutes a unit vector representing a direction in x, y, and z coordinates from the reference point to a center of mass of light pixels corresponding to a light source. As further indicated by equation (2), $d_i$ represents ground-truth-source-specific-distance parameters estimating a distance of a light source from a reference point, such as a scalar encoding of distance measured in meters. In some embodiments, $d_i$ represents a mean depth for pixels corresponding to a light source, such as the center of mass of light pixels corresponding to the light source.

As further indicated by equation (2), $s_i$ represents ground-truth-source-specific-size parameters estimating a size of a light source with respect to the reference point. To determine $s_i$, the digital imagery system 106 can determine an angular size of light from a light source measured in steradians. In some cases, $s_i$ constitutes an average angular size of major and minor axes of an ellipse fitted on a light source (e.g., light pixels corresponding to a light source). Finally, $c_i$ represents ground-truth-source-specific-color parameters estimating a color of a light source, such as a color represented in RGB values, where $c_i \in \mathbb{R}^3$. In some cases, $c_i$ constitutes a mean RGB color of light pixels corresponding to a light source. As explained further below, in some embodiments, the lighting estimation system 108 projects each of $l_i, d_i, s_i, c_i$ into a spherical gaussian representation.

As indicated above, in some embodiments, the digital imagery system 106 determines ground-truth-lighting parameters $\mathcal{P}$ for each HDR-panoramic image within a dataset, such as for each of 2,100 HDR-panoramic images from the Laval Indoor HDR Dataset. Because the number of light sources illuminating each HDR-panoramic image may differ, the number of light sources N varies in a given collection of ground-truth-lighting parameters $\mathcal{P}$. To ensure that a given collection of ground-truth-lighting parameters $\mathcal{P}$ represents every significant light source illuminating an input image $\mathcal{I}$ (e.g., a digital training image), in some embodiments, the digital imagery system 106 deems a light source significant if the light source provides at least 10% of the energy from the strongest light source illuminating the input image $\mathcal{I}$.

In addition to generating ground-truth-source-specific-lighting parameters corresponding to digital training images, in some embodiments, the digital imagery system 106 further adjusts or tunes the light intensities within the digital training images using a rendering-based-optimization process. As part of executing the rendering-based-optimization process, the digital imagery system 106 generates a panoramic-based-object rendering by rendering a virtual object using an HDR-panoramic image corresponding to a digital training image, where pixels of the HDR-panoramic image are masked except for those pixels corresponding to detected light sources. The digital imagery system 106 further generates a parameter-based-object rendering by rendering the same virtual object illuminated according to ground-truth-lighting parameters corresponding to the digital training image.

As a further part of executing the rendering-based-optimization process, the digital imagery system 106 uses the panoramic-based-object rendering and the parameter-based-object rendering to determine weights to tune light intensities for a digital training image. In particular, the digital imagery system 106 determines a linear combination of weights for the parameter-based-object rendering—such that the linear combination of weights minimizes error in light intensity in comparison between the parameter-based-object rendering and a corresponding ground-truth-environment map. The digital imagery system 106 further uses the linear combination of weights to adjust the ground-truth-color parameters for one or more light sources and light intensities for the one or more light source illuminating the digital training image. As suggested above, in some embodiments, the digital imagery system 106 adjusts the light intensities within each digital training image from a training dataset using the foregoing rendering-based-optimization process.

Figure 3:
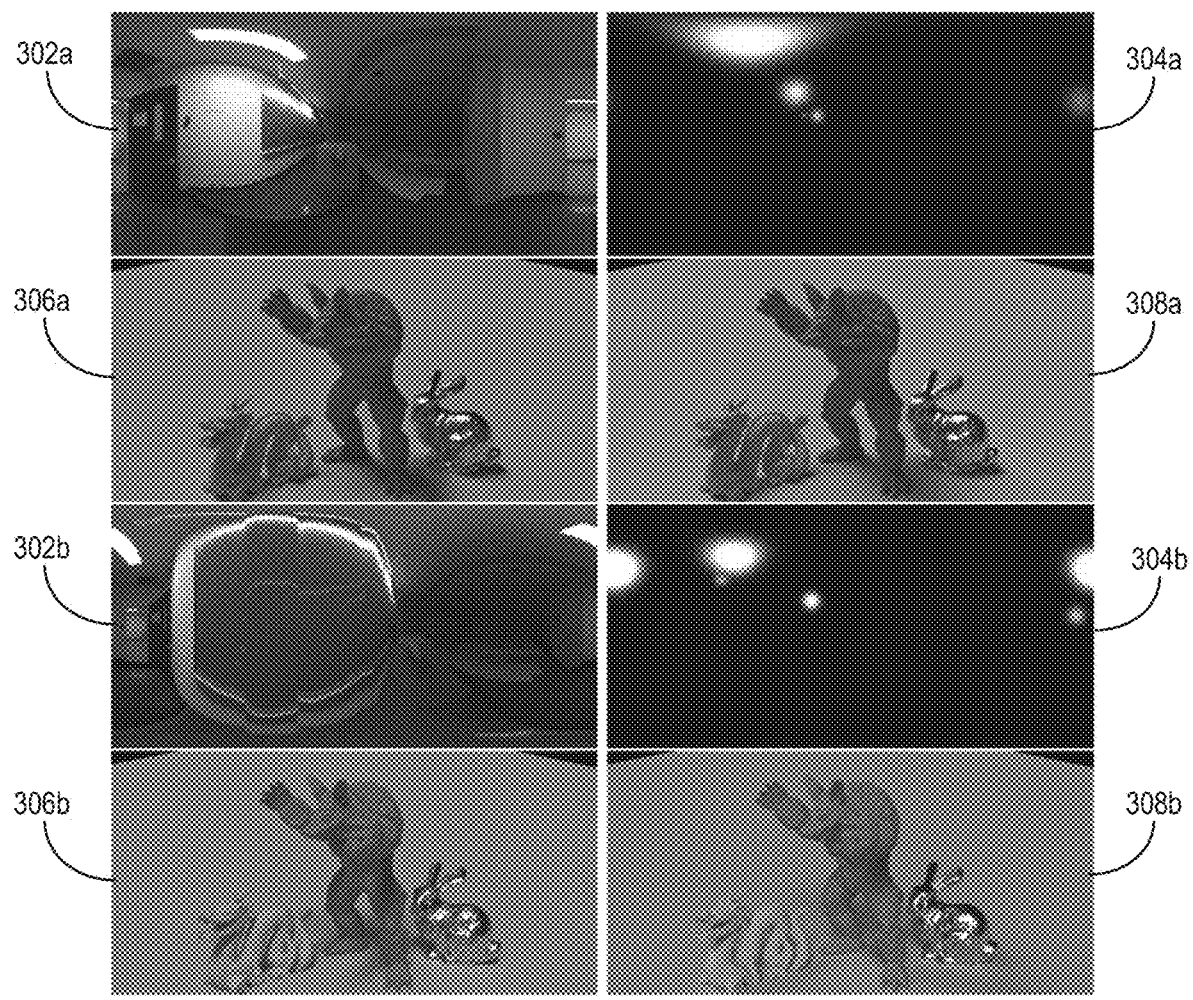
FIG. 3 illustrates examples of panoramic-based-object renderings comprising virtual objects illuminated based on a panoramic image and parameter-based-object renderings comprising virtual objects at different locations illuminated according to ground-truth-source-specific-lighting parameters in accordance with one or more embodiments.

In accordance with some embodiments, FIG. 3 illustrates examples of panoramic-based-object renderings and parameter-based-object renderings comprising virtual objects at different locations within a panoramic scene. As indicated by FIG. 3, for example, the digital imagery system 106 generates a collection of ground-truth-lighting parameters derived from a first digital training image corresponding to an HDR-panoramic image 302a. The digital imagery system 106 further generates a lighting environment map 304a based on the collection of ground-truth-lighting parameters using a mapping function explained below in equation (5). Consistent with the disclosure above, the digital imagery system 106 generates a parameter-based-object rendering 308a comprising a virtual object based on the collection of ground-truth-lighting parameters illuminating a center position of the first digital training image. The digital imagery system 106 further generates a panoramic-based-object rendering 306a comprising the virtual object based on lighting from the HDR-panoramic image 302a corresponding to the center position of the first digital training image.

As further shown in FIG. 3, the digital imagery system 106 also projects the collection of ground-truth-lighting parameters to a location corresponding to a second digital training image corresponding to an HDR-panoramic image 302b. As suggested above, the first and second digital training images represent different locations from the same panoramic scene. The digital imagery system 106 further generates a lighting environment map 304b based on the collection of ground-truth-lighting parameters—projected onto a location corresponding to the second digital training image—using the mapping function explained below in equation (5). Consistent with the disclosure above, the digital imagery system 106 renders a parameter-based-object rendering 308b comprising a virtual object based on the collection of ground-truth-lighting parameters illuminating a center position of the second digital training image. The digital imagery system 106 further renders a panoramic-based-object rendering 306b comprising the virtual object based on lighting from the HDR-panoramic image 302b corresponding to the center position of the second digital training image. As suggested above, the HDR-panoramic images 302a and 302b can constitute HDR-environment maps with RGB values and depth estimates at every pixel.

As indicated by a comparison of the parameter-based-object renderings 308a and 308b to the panoramic-based-object renderings 306a and 306b, respectively, the digital imagery system 106 generates ground-truth-source-specific-lighting parameters for illuminating virtual objects in the parameter-based-object renderings 308a and 308b comparable to (and realistically resembling) lighting conditions within the panoramic-based-object renderings 306a and 306b. Notwithstanding a move in position from the first digital training image to the second digital training image—as indicated by the changes from the HDR-panoramic image 302a to the HDR-panoramic image 302b—the digital imagery system 106 generates ground-truth-source-specific-lighting parameters for illuminating the virtual objects in the parameter-based-object rendering 308b with realistic relighting.

As noted above, in some embodiments, the lighting estimation system 108 trains a source-specific-lighting-estimation-neural network to generate 3D-source-specific-lighting parameters based on ground-truth datasets in one or more training stages. In a first training stage, for example, the lighting estimation system 108 can use a differentiable-projection layer to convert 3D-source-specific-predicted-lighting parameters to a predicted environment map for comparison with a ground-truth-environment map. By iteratively comparing predicted and ground-truth environment maps in iterations of the first training stage, the lighting estimation system 108 avoids mismatching 3D-source-specific-lighting parameters with the wrong light source during early iterations. In a second training stage, the lighting estimation system 108 can generate and compare 3D-source-specific-predicted-lighting parameters to ground-truth-source-specific-lighting parameters. By comparing such lighting parameters in iterations of the second training stage, the lighting estimation system 108 can tune parametric-specific-network layers to improve 3D-source-specific-predicted-lighting parameters. As described below, FIG. 4A depicts an example of a first training stage, and FIG. 4B depicts an example of a second training stage.

Figure 4A:
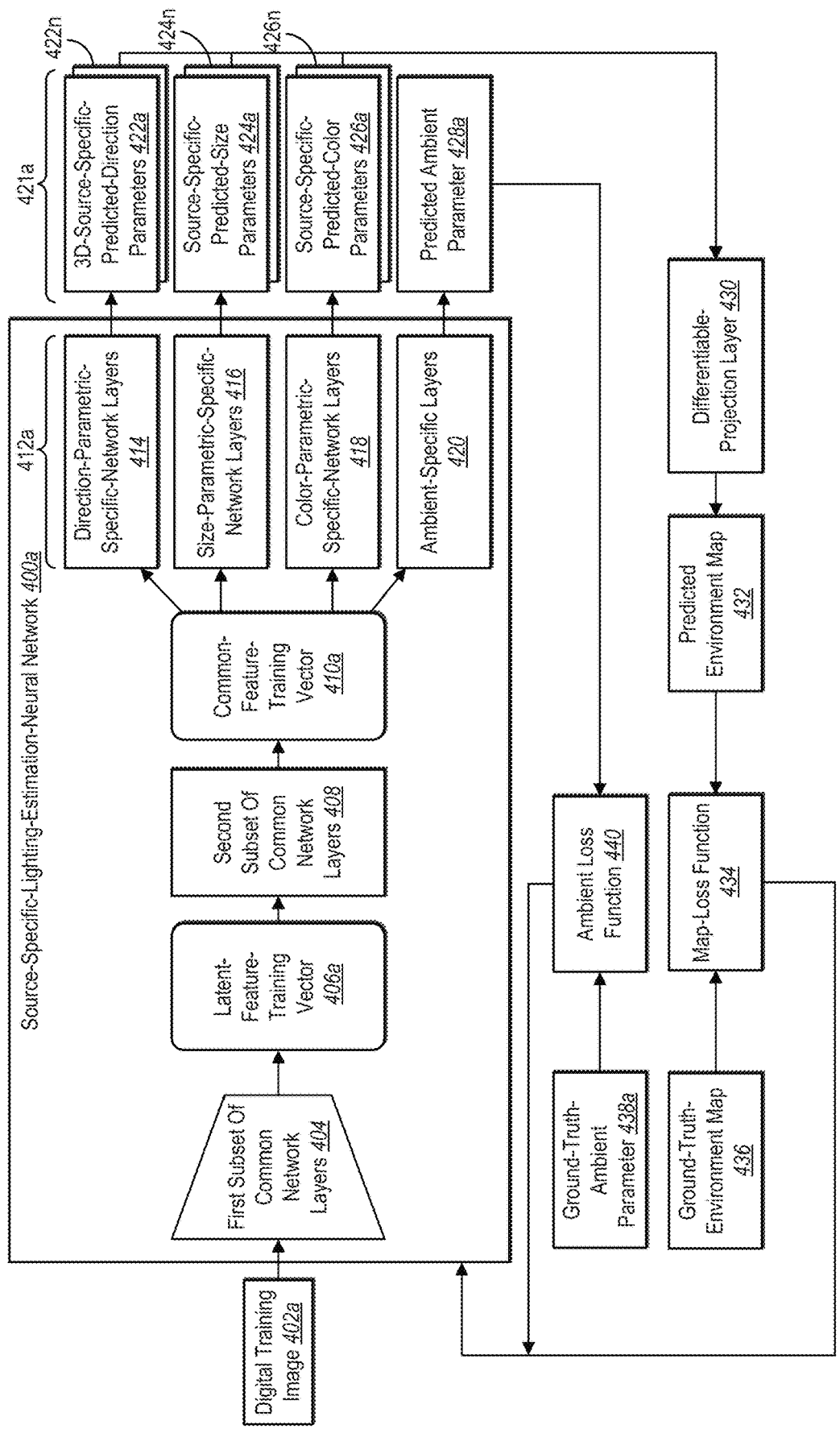
FIGS. 4A-4B illustrate a lighting estimation system training a source-specific-lighting-estimation-neural network to generate 3D-source-specific-lighting parameters in different training stages in accordance with one or more embodiments.
Figure 4B:
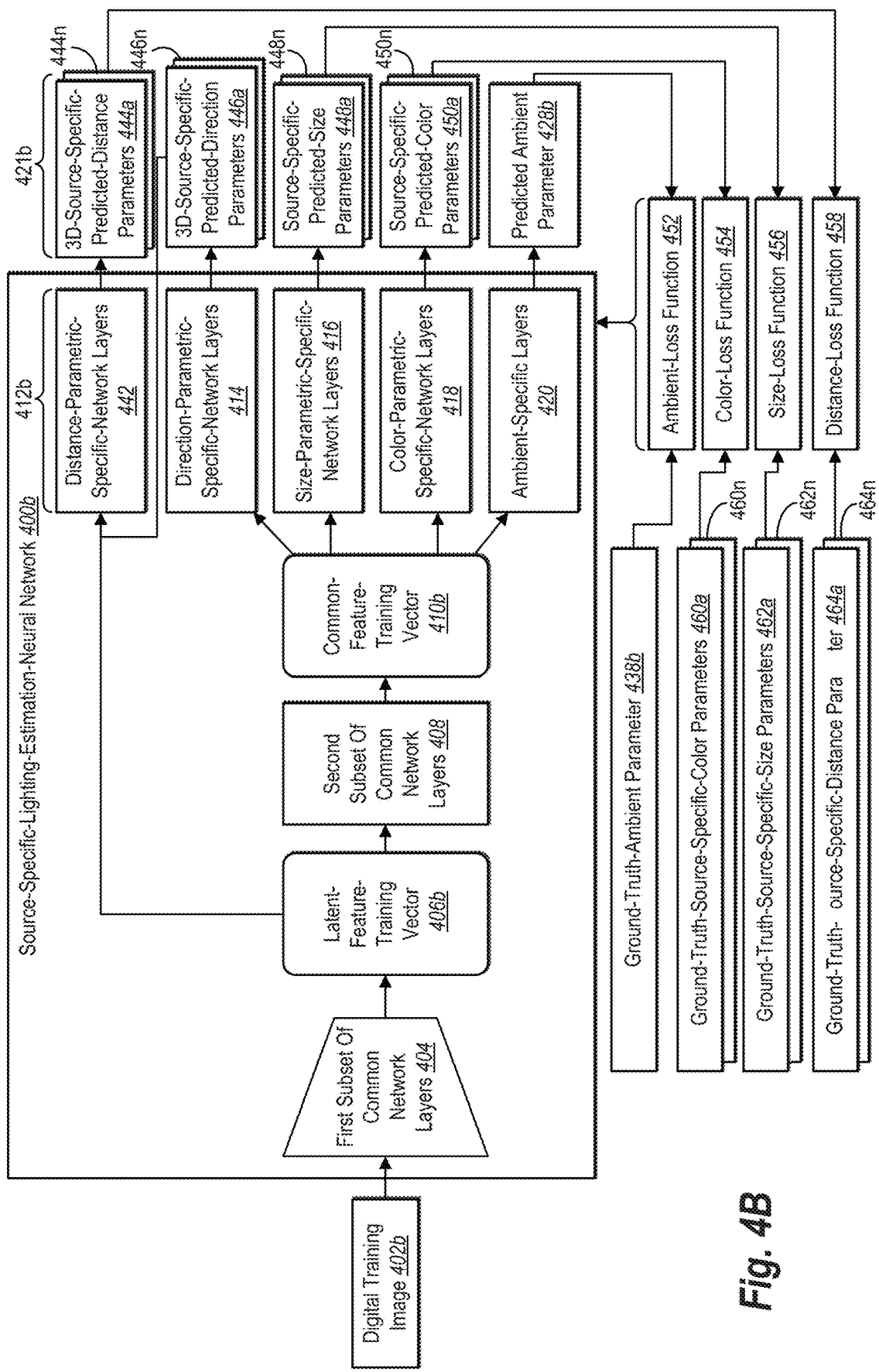

As shown in FIG. 4A, for example, the lighting estimation system 108 processes a digital training image 402a using a source-specific-lighting-estimation-neural network 400a to generate 3D-source-specific-predicted-lighting parameters. The lighting estimation system 108 further applies a differentiable-projection layer 430 to the 3D-source-specific-predicted-lighting parameters to project a predicted environment map 432 corresponding to the digital training image 402a and compare the predicted environment map 432 to a ground-truth-environment map 436 corresponding to the digital training image 402a. By comparing environment maps, the lighting estimation system 108 determines an environment-map loss. Based on determining environment-map losses in multiple training iterations, the lighting estimation system 108 iteratively modifies internal parameters of the source-specific-lighting-estimation-neural network 400a until a point of convergence.

As depicted in FIG. 4A, the source-specific-lighting-estimation-neural network 400a includes a first subset of common network layers 404. In some embodiments, for instance, the first subset of common network layers 404 comprise blocks from a DenseNet as an encoder, such as a headless DenseNet. In some cases, the first subset of common network layers 404 constitutes layers from a DenseNet-121 as described by G. Huang et al., "Densely Connected Convolutional Layers," *Proceedings of the IEEE Conference on Computer Vision and Pattern Recognition* (2017), the entire contents of which are incorporated by reference. Further, in some embodiments, the lighting estimation system 108 applies a DenseNet comprising weights pretrained on an ImageNet.

By using a pre-trained DenseNet, in some implementations, the lighting estimation system 108 shortens training by avoiding a computationally costly pretraining step from existing digital imagery systems, such as in Gardner. Indeed, a source-specific-lighting-estimation-neural network comprising a pre-trained DenseNet-121 includes approximately 8.5 million network parameters and, therefore, approximately four times fewer parameters than Gardner' neural network. By using layers of a pre-trained DenseNet as the first subset of common network layers 404, in certain embodiments, the lighting estimation system 108 can further train the source-specific-lighting-estimation-neural network 400a directly on digital training images cropped from indoor HDR panoramic images, rather than training on digital training images cropped from both HDR panoramic images and LDR panoramic images as in Gardner.

In the alternative to blocks of a DenseNet, in certain implementations, first subset of common network layers 404 comprises an encoder from a Convolutional Neural Network ("CNN"), including a couple of convolutional layers followed by four residual layers. In some such embodiments, the first subset of common network layers 404 comprise the encoder described by Gardner.

As further shown in FIG. 4A, the source-specific-lighting-estimation-neural network 400a includes a second subset of common network layers 408 and parametric-specific-network layers 412a. In some embodiments, the second subset of common network layers 408 comprises one or more fully connected layers. By contrast, in certain implementations, the parametric-specific-network layers 412a comprise multiple parametric-specific decoders, such as decoders each including deconvolutional layers. Accordingly, within the parametric-specific-network layers 412a of FIG. 4A, in certain implementations, direction-parametric-specific-network layers 414 constitute a direction-parameter-specific decoder, size-parametric-specific-network layers 416 constitute a size-parameter-specific decoder, color-parametric-specific-network layers 418 constitute a color-parameter-specific decoder, and ambient-specific layers 420 constitute an ambient-parameter-specific decoder.

As suggested above, the lighting estimation system 108 iteratively inputs digital training images into the source-specific-lighting-estimation-neural network 400a for training during the first training stage. In an initial training iteration shown by FIG. 4A, for example, the lighting estimation system 108 feeds the digital training image 402a to the source-specific-lighting-estimation-neural network 400a. As shown in FIG. 4A, the lighting estimation system 108 applies the first subset of common network layers 404 to extract (or encode) a latent-feature-training vector 406a from the digital training image 402a. The lighting estimation system 108 further applies the second subset of common network layers 408 to extract a common-feature-training vector 410a from the latent-feature-training vector 406a. As indicated above, in some embodiments, the latent-feature-training vector 406a constitutes a 3,072-dimensional vector representing the digital training image 402a, and the common-feature-training vector 410a constitutes a 512-dimensional vector extracted from the 3,072-dimensional vector.

After extracting the common-feature-training vector 410a, the lighting estimation system 108 processes the common-feature-training vector 410a using the parametric-specific-network layers 412a to generate predicted lighting parameters 421a—including both 3D-source-specific-predicted-lighting parameters and a predicted ambient parameter. As shown in FIG. 4A, for example, the lighting estimation system 108 extracts (or decodes) 3D-source-specific-predicted-direction parameters 422a-422n from the common-feature-training vector 410a using the direction-parametric-specific-network layers 414. The lighting estimation system 108 further extracts (or decodes) source-specific-predicted-size parameters 424a-424n from the common-feature-training vector 410a using the size-parametric-specific-network layers 416. The lighting estimation system 108 further extracts (or decodes) source-specific-predicted-color parameters 426a-426n from the common-feature-training vector 410a using the color-parametric-specific-network layers 418. Finally, the lighting estimation system 108 extracts (or decodes) a predicted ambient parameter 428a from the common-feature-training vector 410a using the ambient-specific layers 420.

As suggested above, sets of 3D-source-specific-predicted-lighting parameters correspond to a predicted light source. For example, each set from the 3D-source-specific-predicted-direction parameters 422a-422n estimate a direction of a predicted light source illuminating the digital training image 402a from a reference point, where a set of 3D-source-specific-direction parameters 422a corresponds to an initial light source and a set of 3D-source-specific-direction parameters 422n corresponds to an additional light source. Similarly, each set from the source-specific-predicted-size parameters 424a-424n estimates a size of a predicted light source. Further, each set from the source-specific-predicted-color parameters 426a-426n estimates a color of a predicted light source.

In contrast to the 3D-source-specific-predicted-lighting parameters, the predicted ambient parameter 428a estimates remaining light in the digital training image 402a without specificity to a predicted light source. For example, the predicted ambient parameter 428a may estimate ambient light in terms of RGB values and represent an average of remaining light within the digital training image 402a—unassigned to a predicted light source.

To generate predicted lighting parameters 421a, in certain implementations, the lighting estimation system 108 determines predicted lighting parameters $\hat{\mathcal{P}}$ corresponding to multiple light sources illuminating a digital training image (or illuminating a corresponding panoramic image). For example, in some cases, the lighting estimation system 108 determines predicted lighting parameters $\hat{\mathcal{P}}$ according to the following equation:

$$\hat{\mathcal{P}} = \{\hat{p}_1, \hat{p}_2, \ldots, \hat{p}_N, \hat{a}\} \qquad (3)$$

In equation (3), $\hat{p}_i$ represents a set of 3D-source-specific-predicted-lighting parameters corresponding to a predicted light source, and a represents â predicted ambient parameter estimating ambient light in a digital training image, where $\hat{a} \in \mathbb{R}^3$.

As indicated by equation (3), a given collection of predicted lighting parameters $\hat{\mathcal{P}}$ may include a first set of 3D-source-specific-predicted-lighting parameters $\hat{p}_1$ corresponding to a first predicted light source, a second set of 3D-source-specific-predicted-lighting parameters $\hat{p}_2$ corresponding to a second predicted light source, and any additional such sets up through an Nth set of 3D-source-specific-predicted-lighting parameters $\hat{p}_N$ corresponding to an Nth predicted light source.

As further suggested above, in the first training stage, a given set of 3D-source-specific-predicted-lighting parameters $\hat{p}_i$ corresponding to a predicted light source may include different predicted lighting parameters. In the first training stage, for example, a given set of 3D-source-specific-predicted-lighting parameters $\hat{p}_i$ can include different lighting parameters according to the following equation:

$$\hat{p}_i = \{\hat{l}_i, \hat{s}_i, \hat{c}_i\} \quad (4)$$

In equation (4), $\hat{l}_i$ represents 3D-source-specific-predicted-direction parameters estimating a direction of a predicted light source from a reference point, where $\hat{l}_i \in \mathbb{R}^3$. In some cases, $\hat{l}_i$ constitutes a unit vector representing a direction in x, y, and z coordinates from the reference point to a center of mass of light pixels corresponding to a predicted light source. As further indicated by equation (4), $\hat{s}_i$ represents source-specific-predicted-size parameters estimating a size of a predicted light source with respect to the reference point. To determine $\hat{s}_i$, the lighting estimation system 108 can determine an angular size of light from a light source measured in steradians. Finally, $\hat{c}_i$ represents source-specific-predicted-color parameters estimating a color of a predicted light source, such as a color represented in RGB values, where $\hat{c}_i \in \mathbb{R}^3$. In some cases, $\hat{c}_i$ constitutes a mean RGB color of light pixels corresponding to a predicted light source.

While a number of predicted light sources N may vary in any given digital training image in a first or second training stage, in some embodiments, the lighting estimation system 108 configures or presets a source-specific-lighting-estimation-neural network to generate 3D-source-specific-predicted-lighting parameters corresponding to a preset number of predicted light sources N, such as by presetting N to equal a value of 2, 3, or 5. When the lighting estimation system 108 configures a source-specific-lighting-estimation-neural network to a preset number of predicted light sources and the source-specific-lighting-estimation-neural network determines fewer light sources illuminate a given digital training image, a source-specific-lighting-estimation-neural network can effectively remove an extra light source (and corresponding 3D-source-specific-predicted-lighting parameters) by setting source-specific-predicted-color parameters $\hat{c}_i$ for a predicted light source to equal a value of 0.

As further shown in FIG. 4A, the lighting estimation system 108 applies a differentiable-projection layer 430 to the 3D-source-specific-predicted parameters output by some of the parametric-specific-network layers 412a. To project or render the predicted environment map 432, for example, the lighting estimation system 108 applies the differentiable-projection layer 430 to the 3D-source-specific-predicted-direction parameters 422a-422n, the source-specific-predicted-size parameters 424a-424n, and the source-specific-predicted-color parameters 426a-426n. As explained further below, by rendering the predicted environment map 432 in the first training stage, the lighting estimation system 108 bypasses matching 3D-source-specific-predicted-lighting parameters with ground-truth-source-specific-lighting parameters.

In some embodiments, for example, the lighting estimation system 108 uses the following mapping function $f(\cdot)$ as part of the differentiable-projection layer 430 to project the 3D-source-specific-predicted-lighting parameters for each predicted light source onto a predicted environment map:

$$f(\hat{\mathcal{P}}, u) = \sum_{i=1}^{N} \hat{c}_i \exp \frac{\hat{l}_i \cdot u - 1}{\frac{1}{4\pi} \hat{s}_i} \quad (5)$$

According to equation (5), the lighting estimation system 108 projects 3D-source-specific-predicted-lighting parameters onto a spherical gaussian representation. In equation (5), u represents a unit vector indicating a direction on a sphere for a spherical gaussian representation.

When computing equation (5) for a given predicted light source, in some embodiments, the lighting estimation system 108 scales the source-specific-predicted-size parameters $\hat{s}_i$ such that the light intensity falls under 10% of its peak after a distance corresponding to source-specific-predicted-size parameters $\hat{s}_i$. Because the lighting estimation system 108 can optionally precompute $\hat{l}_i \cdot u$ for all possible values of the lighting estimation system 108 can efficiently determine the mapping function $f(\cdot)$ for equation (5). Further, because the mapping function $f(\cdot)$ is differentiable everywhere on a sphere, the lighting estimation system 108 can backpropagate an error in environment-map reconstruction to internal parameters of the source-specific-lighting-estimation-neural network 400a.

After constructing the predicted environment map 432, the lighting estimation system 108 compares (i) the predicted environment map 432 to the ground-truth-environment map 436 corresponding to the digital training image 402a and (ii) the predicted ambient parameter 428a to a ground-truth-ambient parameter 438a corresponding to the digital training image 402a. For example, in some embodiments, the lighting estimation system 108 uses a map-loss function 434 to compare the predicted environment map 432 and the ground-truth-environment map 436 to determine an environment-map loss. The lighting estimation system 108 can further use an ambient-loss function 440 to compare the predicted ambient parameter 428a and the ground-truth-ambient parameter 438a to determine an ambient-parameter loss.

The lighting estimation system 108 optionally determines an overall loss based on the ambient-loss function 440 and the map-loss function 434. In certain cases, for example, the lighting estimation system 108 uses the following equation to determine an overall loss in training iterations of the first training stage:

$$\mathcal{L}_1(\mathcal{P}, \hat{\mathcal{P}}) = w_r \ell_2(f(\hat{\mathcal{P}}, \mathcal{R})) + w_a \ell_2(\hat{a}, a) \quad (6)$$

In equation (6), $\mathcal{R}$ represents a ground-truth-environment map corresponding to ground-truth-lighting parameters $\mathcal{P}$ for a digital training image. By contrast, $f(\cdot)$ represents the mapping function that projects a predicted environment map from predicted lighting parameters $\hat{\mathcal{P}}$ for the digital training image. Equation (6) further uses $\ell_2$ to represent an L2-loss function (or least-squared-error function) applied to comparisons of different variables. In particular, equation (6) includes a first L2-loss function as the map-loss function 434 comparing a ground-truth-environment map $\mathcal{R}$ and a predicted environment map from the mapping function $f(\hat{\mathcal{P}})$. Equation (6) further includes a second L2-loss function as the ambient-loss function 440 comparing a ground-truth-ambient parameter a and a predicted ambient parameter â.

As further indicated by equation (6), in some embodiments, the lighting estimation system 108 applies weights to the L2 losses, where $w_r$ applies to the first L2-loss function for lighting parameters and $w_a$ applies to the second L2-loss function for ambient parameters. To more heavily weight adjustments to internal parameters corresponding to 3D-source-specific-predicted-lighting parameters, the lighting estimation system 108 can increase the weight $w_r$ relative to the weight $w_a$. For example, in some embodiments, the lighting estimation system 108 sets the following integers as weights: $w_r=20$ and $w_a=1$. In the alternative to an L2-loss function as described above or below, the lighting estimation system 108 can use another suitable loss function, such as a least-absolute-deviations-loss function, a mean-squared-error function, or a cross-entropy-loss function.

Upon determining the environment-map loss from the map-loss function 434 and an ambient-parameter loss from the ambient-loss function 440, the lighting estimation system 108 modifies internal parameters (e.g., weights or values) of the source-specific-lighting-estimation-neural network 400a to decrease a loss for the map-loss function 434 and the ambient-loss function 440 in a subsequent training iteration using back propagation. To indicate such back propagation, FIG. 4A includes arrows from the map-loss function 434 and the ambient-loss function 440 to the source-specific-lighting-estimation-neural network 400a. For example, the lighting estimation system 108 may increase or decrease weights or values from some (or all) of the first subset of common network layers 404, the second subset of common network layers 408, and the parametric-specific-network layers 412a within the source-specific-lighting-estimation-neural network 400a to decrease or minimize losses in a subsequent training iteration of the first training stage.

During the first training stage, the lighting estimation system 108 uses the source-specific-lighting-estimation-neural network 400a to iteratively generate 3D-source-specific-predicted-lighting parameters and predicted ambient parameters based on digital training images. The lighting estimation system 108 also iteratively projects predicted environment maps and determines environment-map losses and ambient-parameter losses. As the lighting estimation system 108 applies the source-specific-lighting-estimation-neural network 400a in subsequent training iterations, different numbers of light sources may illuminate different digital training images as inputs. In some cases, the lighting estimation system 108 performs training iterations for the first training stage until the value or weights of the source-specific-lighting-estimation-neural network 400a do not change significantly across training iterations or otherwise satisfies a convergence criteria.

By comparing environment maps to determine environment-map losses in the first training stage, the lighting estimation system 108 avoids potential mismatching errors of comparing 3D-source-specific-predicted-lighting parameters to ground-truth-source-specific-lighting parameters in early training iterations. For example, a digital imagery system could dynamically assign each predicted light source to a closest ground-truth-light source according an angular distance. But such a light-source assignment would create a dependency between 3D-source-specific-predicted-direction parameters $\hat{l}_i$ and other source-specific-predicted-lighting parameters—because a digital imagery system would make such light-source assignments based on 3D-source-specific-predicted-direction parameters $\hat{l}_i$. Such a dependency would (i) create errors early in the training process when the 3D-source-specific-predicted-direction parameters $\hat{l}_i$ could change arbitrarily and (ii) create mismatched light-source assignments that, in turn, lead to unstable gradient flow and network convergence.

The lighting estimation system 108 can avoid these errors in the first training stage by relying on environment-map losses. By converting 3D-source-specific-lighting parameters into a predicted environment map, the lighting estimation system 108 can minimize global errors and leads to better convergence and avoids mismatching a number of predicted light sources and a corresponding number of ground-truth-light sources for a given digital training image.

After the first training stage, in some embodiments, the lighting estimation system 108 processes training iterations as part of a second training stage. As shown in FIG. 4B, the lighting estimation system 108 applies a source-specific-lighting-estimation-neural network 400b to a digital training image 402b to generate 3D-source-specific-predicted-lighting parameters. The lighting estimation system 108 further compares the 3D-source-specific-predicted-lighting parameters to ground-truth-source-specific-lighting parameters. By comparing such lighting parameters, the lighting estimation system 108 determines lighting parameter losses. Based on determining lighting parameter losses in multiple training iterations, the lighting estimation system 108 iteratively modifies internal parameters of parametric-specific-network layers 412b from the source-specific-lighting-estimation-neural network 400b until a point of convergence. In some embodiments, the lighting estimation system 108 further maintains internal parameters of the first subset of common network layers 404 and the second subset of common network layers 408 during the second training stage.

As depicted in FIG. 4B, the source-specific-lighting-estimation-neural network 400b includes distance-parametric-specific-network layers 442 as part of parametric-specific-network layers 412b. The source-specific-lighting-estimation-neural network 400a depicted in FIG. 4A lacks such distance-parametric-specific layers. By adding the distance-parametric-specific-network layers 442 as depicted in FIG. 4B, the source-specific-lighting-estimation-neural network 400b can output 3D-source-specific-predicted-distance parameters estimating a distance of one or more predicted light sources during training iterations for the second training stage. In some embodiments, the distance-parametric-specific-network layers 442 comprise a distance-parameter-specific decoder that includes deconvolutional layers.

As suggested above, the lighting estimation system 108 iteratively inputs digital training images into the source-specific-lighting-estimation-neural network 400b for training during the second training stage. In an initial training iteration shown by FIG. 4B, for example, the lighting estimation system 108 feeds the digital training image 402b to the source-specific-lighting-estimation-neural network 400b. As shown in FIG. 4A, the lighting estimation system 108 processes the digital training image 402a using the first subset of common network layers 404 to extract (or encode) a latent-feature-training vector 406b. The lighting estimation system 108 further processes the latent-feature-training vector 406b using the second subset of common network layers 408 to extract a common-feature-training vector 410b.

After extracting the common-feature-training vector 410b, the lighting estimation system 108 applies some of the parametric-specific-network layers 412b to the common-feature-training vector 410b to generate predicted lighting parameters 421b in part. As shown in FIG. 4B, for example, the lighting estimation system 108 extracts (or decodes) 3D-source-specific-predicted-direction parameters 446a-446n from the common-feature-training vector 410b using the direction-parametric-specific-network layers 414. The lighting estimation system 108 further extracts (or decodes) source-specific-predicted-size parameters 448a-448n from the common-feature-training vector 410b using the size-parametric-specific-network layers 416. The lighting estimation system 108 further extracts (or decodes) source-specific-predicted-color parameters 450a-450n from the common-feature-training vector 410b using the color-parametric-specific-network layers 418. Additionally, the lighting estimation system 108 extracts (or decodes) a predicted ambient parameter 428b from the common-feature-training vector 410b using the ambient-specific layers 420.

As further shown in FIG. 4B, the lighting estimation system 108 also extracts (or decodes) 3D-source-specific-predicted-distance parameters 444a-444n using the distance-parametric-specific-network layers 442. In contrast to other parametric-specific-network layers, the distance-parametric-specific-network layers 442 generates the 3D-source-specific-predicted-distance parameters 444a-444n based on both the latent-feature-training vector 406b and the 3D-source-specific-predicted-direction parameters 446a-446n. The lighting estimation system 108 accordingly conditions the distance-parametric-specific-network layers 442 in the second training stage based on latent-feature-training vectors and 3D-source-specific-predicted-direction parameters.

As suggested above, sets of 3D-source-specific-predicted-lighting parameters correspond to a predicted light source. For example, each set from the 3D-source-specific-predicted-distance parameters 444a-444n estimate a distance of a predicted light source illuminating the digital training image 402b from a reference point, where a set of 3D-source-specific-predicted-distance parameters 444a corresponds to an initial light source and a set of 3D-source-specific-predicted-distance parameters 444n corresponds to an additional light source. Similarly, each of the 3D-source-specific-predicted-direction parameters 446a-446n, the source-specific-predicted-size parameters 448a-448n, and the source-specific-predicted-color parameters 450a-450n include a set corresponding to the initial light source and a set corresponding to the additional light source. By contrast, the predicted ambient parameter 428b estimates remaining light in the digital training image 402b unassigned a predicted light source.

To generate the predicted lighting parameters 421b, in certain implementations, the lighting estimation system 108 determines predicted lighting parameters $\hat{\mathcal{P}}$ according to equation (3). In contrast to the first training stage, however, a given set of 3D-source-specific-predicted-lighting parameters $\hat{p}_i$ in the second training stage can include a different collection of lighting parameters according to the following expression:

$$\hat{p}_i = \{\hat{l}_i, \hat{d}_i, \hat{s}_i, \hat{c}_i\} \quad (7)$$

In contrast to equation (4) for the first training stage, equation (7) for the second training stage defines a given set of 3D-source-specific-predicted-lighting parameters $\hat{p}_i$ to include 3D-source-specific-predicted-distance parameters $\hat{d}_i$. In particular, $\hat{d}_i$ represents 3D-source-specific-predicted-distance parameters estimating a distance of a predicted light source from a reference point, such as a scalar encoding of distance measured in meters. In some embodiments, $\hat{d}_i$ represents a mean depth for pixels corresponding to a predicted light source, such as the center of mass of light pixels corresponding to the predicted light source. By contrast, each of $\hat{l}_i$, $\hat{s}_i$, and $\hat{c}_i$ represent the same type of parameters from equation (4) above.

After generating the predicted lighting parameters 421b, the lighting estimation system 108 compares some of the predicted lighting parameters 421b to corresponding ground-truth-lighting parameters. As shown in FIG. 4B, for example, the lighting estimation system 108 uses an ambient-loss function 452 to compare the predicted ambient parameter 428b and a ground-truth-ambient parameter 438b to determine an ambient-parameter loss. The lighting estimation system 108 further uses a color-loss function 454 to compare the source-specific-predicted-color parameters 450a-450n to ground-truth-source-specific-color parameters 460a-460n to determine color-parameter losses. Similarly, the lighting estimation system 108 uses a size-loss function 456 to compare the source-specific-predicted-size parameters 448a-448n and ground-truth-source-specific-size parameters 462a-462n to determine size-parameter losses. Further, the lighting estimation system 108 uses a distance-loss function 458 to compare the 3D-source-specific-predicted-distance parameters 444a-444n and ground-truth-source-specific-size parameters 464a-464n to determine distance-parameter losses.

The lighting estimation system 108 optionally determines an overall loss based on a combination of two or more of the ambient-loss function 452, the color-loss function 454, the size-loss function 456, or the distance-loss function 458. In certain cases, for example, the lighting estimation system 108 uses the following equation to determine an overall loss in training iterations of the second training stage:

$$\mathcal{L}_2(\mathcal{P}, \hat{\mathcal{P}}) = \ell_2(a, \hat{a}) + \sum_{i=1}^{N} \ell_2(d_i, \hat{d}_i) + \ell_2(s_i, \hat{s}_i) + \ell_2(c_i, \hat{c}_i) \quad (8)$$

In equation (8), $\ell_2$ represents an L2-loss function applied to comparisons of different variables. In particular, equation (8) includes (i) a first L2-loss function as the ambient-loss function 440 comparing a ground-truth-ambient parameter a and a predicted ambient parameter â, (ii) a second L2-loss function as the distance-loss function 458 comparing ground-truth-source-specific-distance parameters $d_i$ to 3D-source-specific-predicted-distance parameters $\hat{d}_i$, (iii) a third L2-loss function as the size-loss function 456 comparing ground-truth-source-specific-size parameters $s_i$ to source-specific-predicted-size parameters $\hat{s}_i$, and (iv) a fourth L2-loss function as the color-loss function 454 comparing ground-truth-source-specific-color parameters $c_i$ to source-specific-predicted-color parameters $\hat{c}_i$.

As further indicated by equation (8), the lighting estimation system 108 determines and sums color-parameter losses, size-parameter losses, and distance-parameter losses corresponding to a same predicted light source. In determining the overall loss for a training iteration in the second training stage, therefore, the lighting estimation system 108 optionally accounts for (and compares) 3D-source-specific-predicted-lighting parameters to ground-truth-source-specific-lighting parameters corresponding to a same light source and sums $\ell$ losses (or other suitable losses) for the same light source. In some embodiments, the lighting estimation system 108 matches 3D-source-specific-predicted-lighting parameters to ground-truth-source-specific-lighting parameters from a closest light source based on angular distance. If a predicted light source has an angular distance greater than 45 degrees (or another threshold degree), in certain implementations, the lighting estimation system 108 does not determine a loss for the corresponding 3D-sourcespecific-predicted-lighting parameters. In such cases, the angular distance is too far from any ground-truth-light source to produce reliable losses.

Upon determining losses from the ambient-loss function 452, the color-loss function 454, the size-loss function 456, and the distance-loss function 458, the lighting estimation system 108 modifies internal parameters (e.g., weights or values) of the parametric-specific-network layers 412b from the source-specific-lighting-estimation-neural network 400b to decrease losses in a subsequent training iteration using back propagation. To indicate such back propagation, FIG. 4B includes an arrow from the ambient-loss function 452, the color-loss function 454, the size-loss function 456, and the distance-loss function 458 to the parametric-specific-network layers 412b. For example, the lighting estimation system 108 may increase or decrease weights or values from some (or all) of the distance-parametric-specific-network layers 442, the direction-parametric-specific-network layers 414, the size-parametric-specific-network layers 416, the color-parametric-specific-network layers 418, and the ambient-specific layers 420 to decrease or minimize losses in a subsequent training iteration of the second training stage.

During the second training stage, the lighting estimation system 108 can use the source-specific-lighting-estimation-neural network 400b to iteratively generate 3D-source-specific-predicted-lighting parameters and predicted ambient parameters based on digital training images. The lighting estimation system 108 also can iteratively compare such 3D-source-specific-predicted-lighting parameters to ground-truth-source-specific-lighting parameters to determine corresponding losses.

By modifying internal parameters of the parametric-specific-network layers 412b—and maintaining internal parameters of the first subset of common network layers 404 and the second subset of common network layers 408—the lighting estimation system 108 can tune the parametric-specific-network layers 412b during the second training stage. As indicated above, in some cases, the lighting estimation system 108 performs training iterations for the second training stage until the value or weights of the parametric-specific-network layers 412b do not change significantly across training iterations or otherwise satisfies a convergence criteria.

To train a source-specific-lighting-estimation-neural network, in some implementations, the lighting estimation system 108 cycles through batches of 48 digital training images for 150 epochs during the first training stage—with an optional early stopping mechanism based on a small validation set of 3D-source-specific-lighting parameters. As noted above, the lighting estimation system 108 can initialize internal parameters for a first subset of common network layers comprising a DenseNet using weights pretrained on an ImageNet. After the first training stage, the lighting estimation system 108 can further train the source-specific-lighting-estimation-neural network again with batches of 48 digital training images for 50 additional epochs during the second training stage. In both the first and second training stages of some embodiments, the lighting estimation system 108 trains a source-specific-lighting-estimation-neural network using an Adam optimizer with a learning rate of 0.001, where $\beta=0.9$. In some cases, the lighting estimation system 108 halves the learning rate each 25 epochs. By halving the learning rate in the first and second training stages and using a Titan V Graphics Processing Unit ("GPU"), the lighting estimation system 108 can reach convergence in approximately 12 hours for the first training stage and reach convergence in a few hours for the second training stage.

Figure 4C:
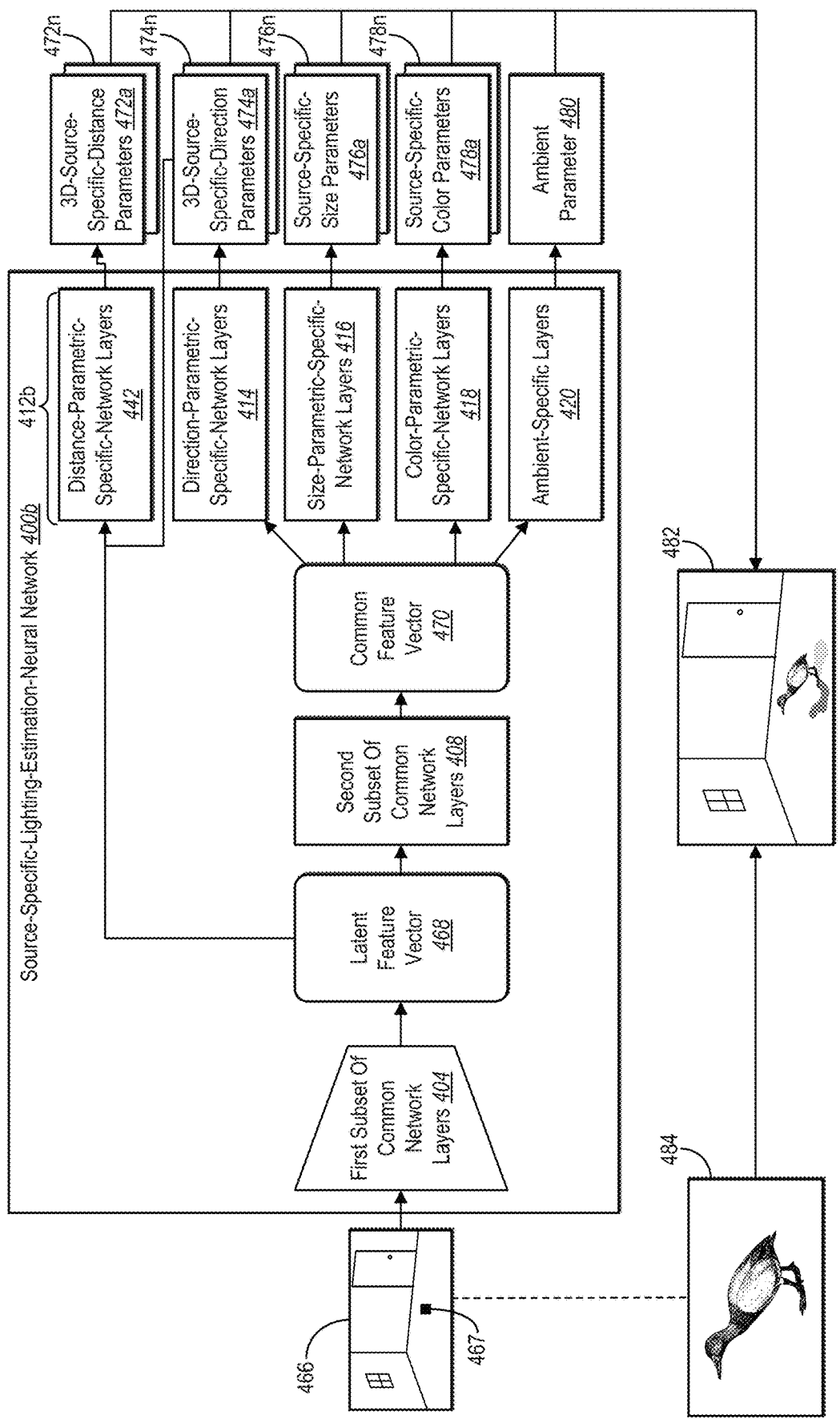
FIG. 4C illustrates a lighting estimation system using a trained source-specific-lighting-estimation-neural network to generate 3D-source-specific-lighting parameters for a digital image in accordance with one or more embodiments.

Once trained using one or both of the first training stage and the second training stage, the lighting estimation system 108 can use the source-specific-lighting-estimation-neural network 400b to generate 3D-source-specific-lighting parameters. FIG. 4C depicts an example of one such application. In general, and as shown in FIG. 4C, the lighting estimation system 108 can identify a request to render a virtual object 484 at a designated position indicated by a local position indicator 467 within a digital image 466. The lighting estimation system 108 can then use the source-specific-lighting-estimation-neural network 400b to analyze the digital image 466 to generate 3D-source-specific-lighting parameters for illuminating the digital image 466. Based on the render request, the lighting estimation system 108 can render a modified digital image 482 comprising the virtual object 484 at the designated position illuminated according to the 3D-source-specific-lighting parameters.

As just noted, the lighting estimation system 108 can identify a request to render the virtual object 484 at a designated position within the digital image 466. For instance, the lighting estimation system 108 may identify a digital request from a computing device executing a digital imagery application to render a virtual character (or other virtual item) at a particular position on, near, or within a real surface (or another real item) depicted in the digital image 466. Alternatively, the lighting estimation system 108 may identify a digital request from a computing device based on computer-executable instructions part of a digital imagery application and accordingly not directly selected by a user. As indicated by FIG. 4C, the request to render the virtual object 484 can include the local position indicator 467 for a designated position at which to render the virtual object 484.

Based on receiving the render request indicated by FIG. 4C, the lighting estimation system 108 can process the digital image 466 using the source-specific-lighting-estimation-neural network 400b. As shown in FIG. 4C, the lighting estimation system 108 applies the first subset of common network layers 404 to extract (or encode) a latent feature vector 468 from the digital image 466. The lighting estimation system 108 further applies the second subset of common network layers 408 to extract a common feature vector 470 from the latent feature vector 468. The lighting estimation system 108 subsequently applies some of the parametric-specific-network layers 412b to the common feature vector 470 to generate 3D-source-specific-lighting parameters (in part) and an ambient parameter.

As shown in FIG. 4C, for example, the lighting estimation system 108 extracts (or decodes) 3D-source-specific-direction parameters 474a-474n from the common feature vector 470 using the direction-parametric-specific-network layers 414. The lighting estimation system 108 further extracts (or decodes) source-specific-size parameters 476a-476n from the common feature vector 470 using the size-parametric-specific-network layers 416. The lighting estimation system 108 further extracts (or decodes) source-specific-color parameters 478a-478n from the common feature vector 470 using the color-parametric-specific-network layers 418. Additionally, the lighting estimation system 108 extracts (or decodes) an ambient parameter 480 from the common feature vector 470 using the ambient-specific layers 420.

As further shown in FIG. 4C, the lighting estimation system 108 extracts (or decodes) 3D-source-specific-distance parameters 472a-472n using the distance-parametric-specific-network layers 442. In contrast to other parametric-specific-network layers, the distance-parametric-specific-network layers 442 generates the 3D-source-specificdistance parameters 472a-472n based on both the latent feature vector 468 and the 3D-source-specific-direction parameters 474a-474n.

As suggested above, sets of 3D-source-specific-lighting parameters correspond to a predicted light source. For example, each set from the 3D-source-specific-distance parameters 472a-472n estimate a distance of a predicted light source illuminating the digital image 466 from a reference point, where a set of 3D-source-specific-distance parameters 472a corresponds to an initial light source and a set of 3D-source-specific-distance parameters 472n corresponds to an additional light source. Similarly, each of the 3D-source-specific-direction parameters 474a-474n, the source-specific-size parameters 476a-476n, and the source-specific-color parameters 478a-478n include a set corresponding to the initial light source and a set corresponding to the additional light source. By contrast, the ambient parameter 480 estimates remaining light in the digital image 466 without specificity to a predicted light source.

Similar to configurations in a training stage, in some embodiments, the lighting estimation system 108 configures or presets a source-specific-lighting-estimation-neural network to generate 3D-source-specific-lighting parameters corresponding to a preset number of predicted light sources N, such as by presetting N to equal a value of 2, 3, or 5. When the lighting estimation system 108 configures the source-specific-lighting-estimation-neural network 400b to a preset number of predicted light sources and the source-specific-lighting-estimation-neural network determines fewer light sources illuminate a given digital image, the source-specific-lighting-estimation-neural network 400b can effectively remove an extra light source (and corresponding 3D-source-specific-lighting parameters) by setting source-specific-color parameters $\hat{c}_i$ to equal a value of 0.

After generating such 3D-source-specific-lighting parameters and an ambient parameter, the lighting estimation system 108 can render the modified digital image 482 comprising the virtual object 484 at the designated position illuminated according to the 3D-source-specific-lighting parameters and the ambient parameter 480. In particular, the lighting estimation system 108 illuminates the modified digital image 482 comprising the virtual object 484 according to the 3D-source-specific-distance parameters 472a-472n, the 3D-source-specific-direction parameters 474a-474n, the source-specific-size parameters 476a-476n, the source-specific-color parameters 478a-478n, and the ambient parameter 480. For example, in some embodiments, the lighting estimation system 108 superimposes or otherwise integrates a computer-generated image of the virtual object 484 within the digital image 466. As part of the rendering, the lighting estimation system 108 can select and render pixels for the virtual object 484 that reflect lighting, shading, or appropriate color hues indicated by the 3D-source-specific-lighting parameters and the ambient parameter 480.

In addition to accurately portraying lighting conditions based on multiple light sources, 3D-source-specific-lighting parameters can dynamically capture lighting from different perspectives of a digital image. As the digital image 482 changes in perspective in camera viewpoint, model orientation, or other perspective adjustment, in certain implementations, the lighting estimation system 108 can generate new 3D-source-specific-lighting parameters that accurately indicate lighting conditions for the designated position based on such perspective changes.

In some embodiments, for example, the lighting estimation system 108 identifies a perspective-adjustment request to render a digital image from a different point of view, such as by detecting movement of a mobile device reorienting the digital image or identifying a user input modifying the perspective of the digital image (e.g., a camera movement adjusting the perspective) to capture a new digital image. Based on the perspective-adjustment request and a corresponding change in point of view for a digital image, the lighting estimation system 108 extracts a new latent feature vector from the digital image (or new digital image) from the different point of view utilizing the first subset of common network layers 404. The lighting estimation system 108 further extracts a new common feature vector from the new latent feature vector utilizing the second subset of common network layers 408.

Based on the new common feature vector, the lighting estimation system 108 generates new 3D-source-specific-lighting parameters and a new ambient parameter utilizing the parametric-specific-network layers 412b. In particular, the lighting estimation system 108 extracts (or decodes) new 3D-source-specific-direction parameters, new source-specific-size parameters, new source-specific-color parameters, and a new ambient parameter from the new common feature vector respectively utilizing the direction-parametric-specific-network layers 414, the size-parametric-specific-network layers 416, the color-parametric-specific-network layers 418, and the ambient-specific layers 420. Based on the new latent feature vector and the 3D-source-specific-direction parameters, the lighting estimation system 108 further generates new 3D-source-specific-distance parameters utilizing the distance-parametric-specific-network layers 442. In response to the perspective-adjustment request, the lighting estimation system 108 accordingly can render an adjusted digital image comprising the virtual object at the designated position illuminated according to the new 3D-source-specific-lighting parameters and a new ambient parameter.

Figure 5B:
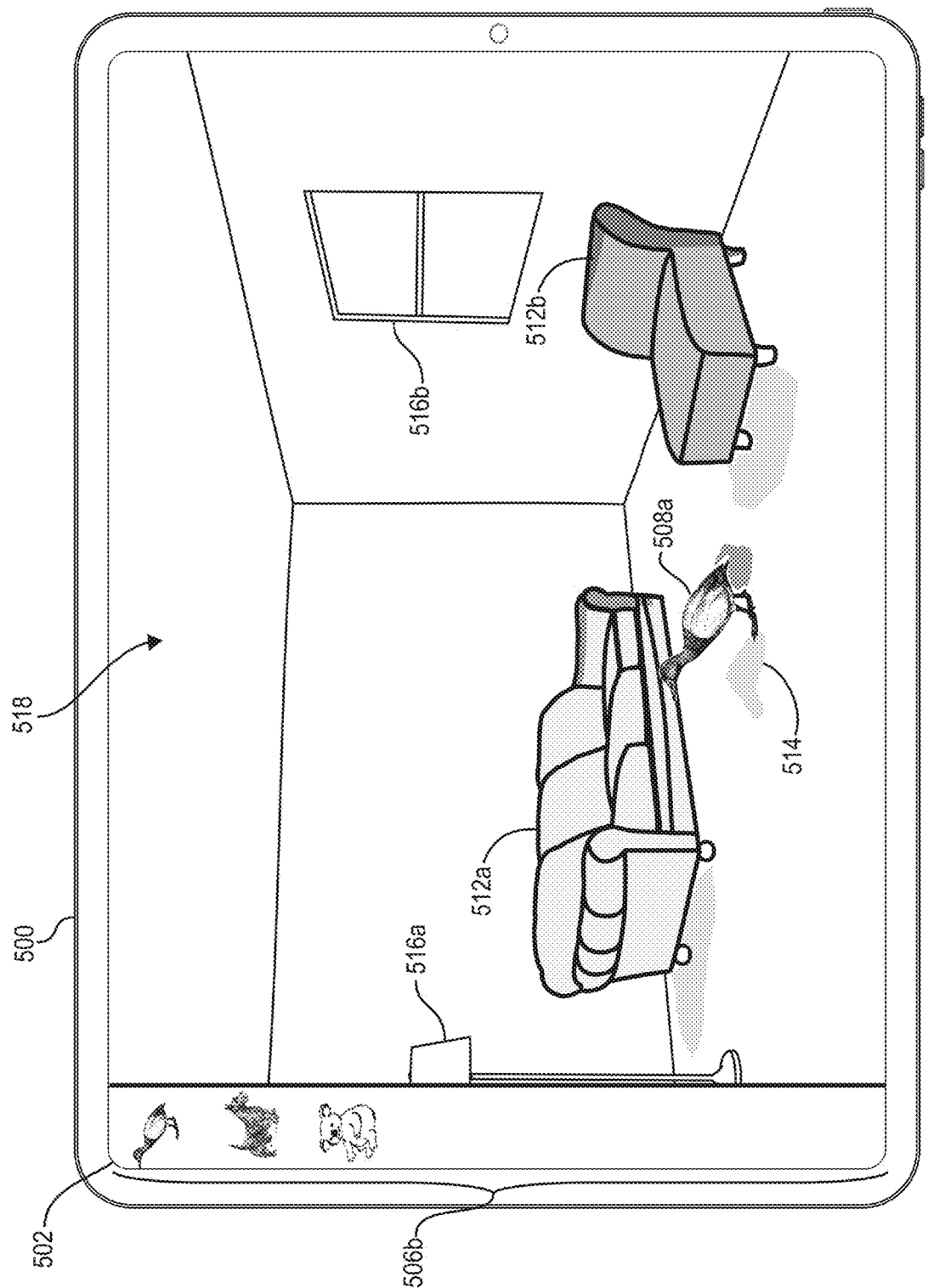
Figure 5C:
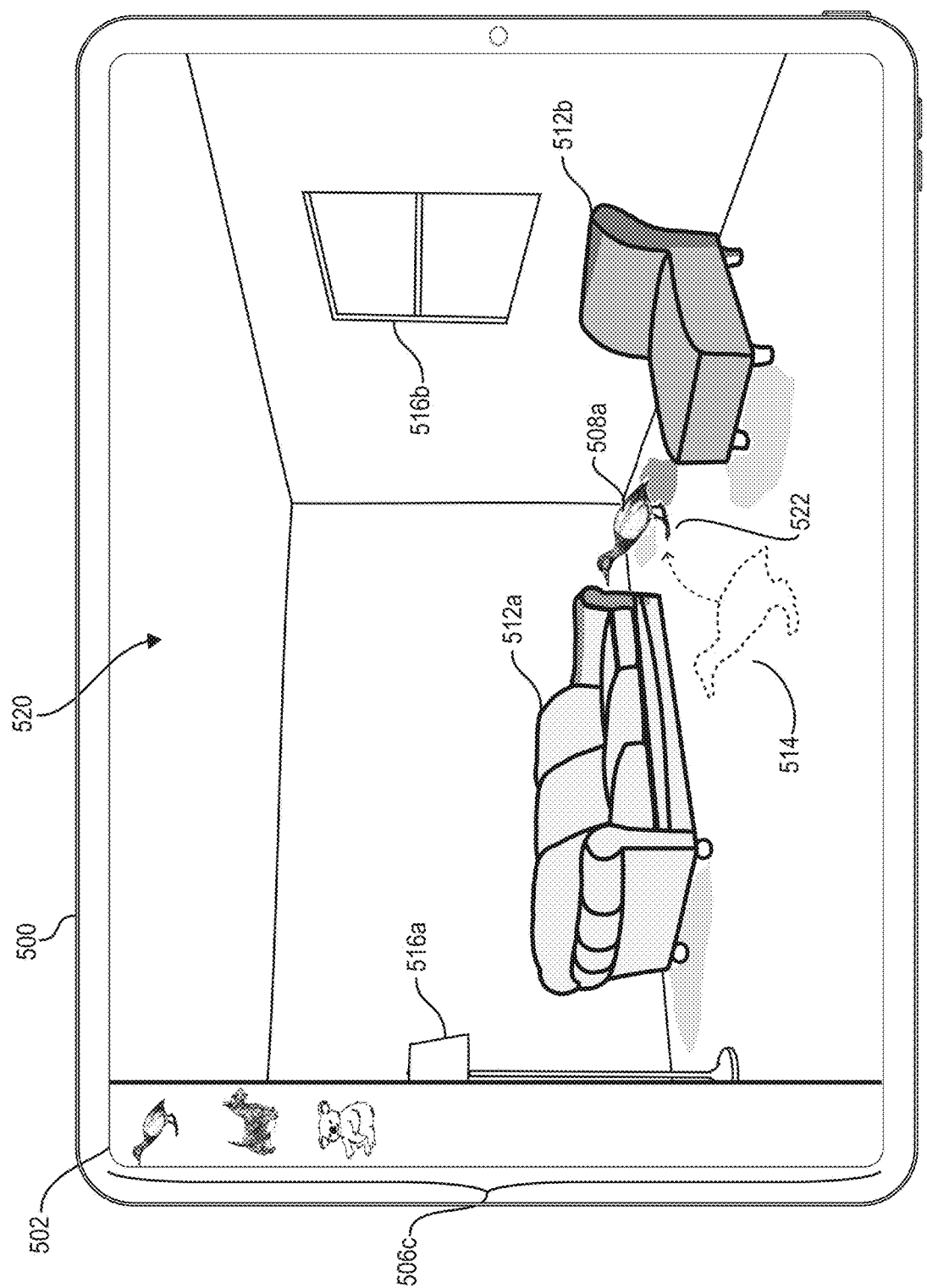
Figure 5D:
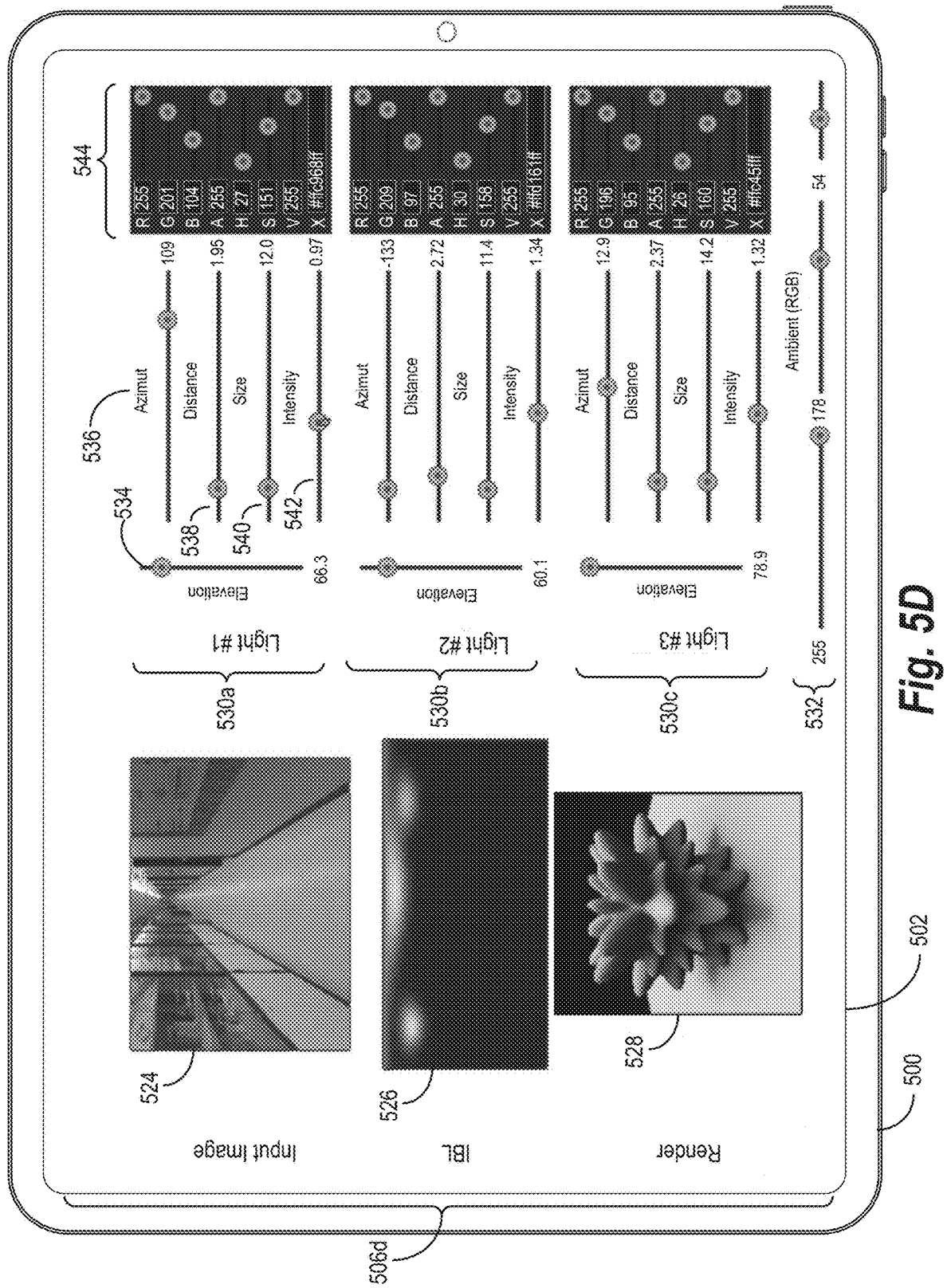
FIGS. 5D-5E illustrate a computing device presenting graphical user interfaces comprising lighting parameter controls for 3D-source-specific-lighting parameters corresponding to different light sources in accordance with one or more embodiments.
Figure 5E:
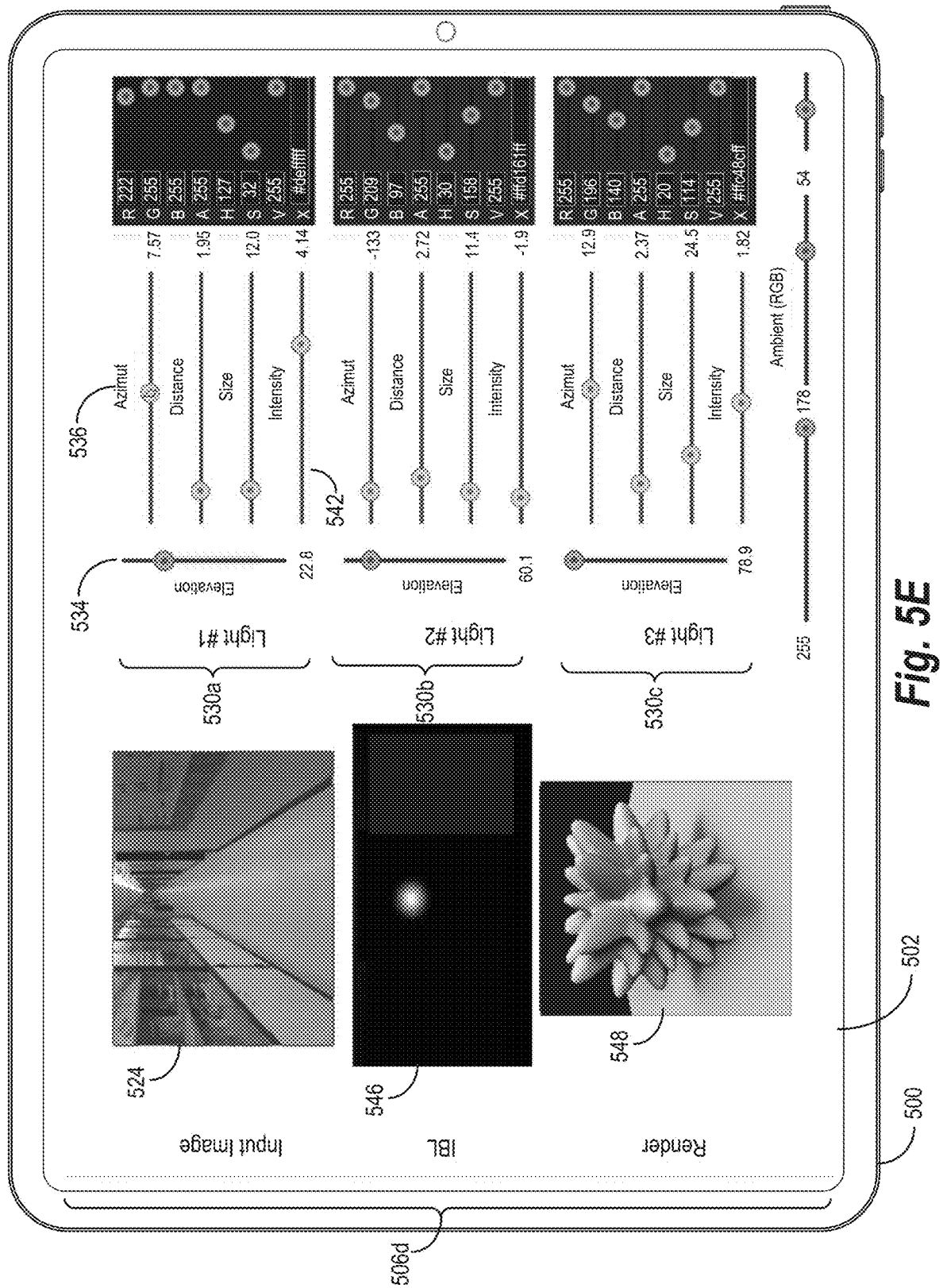

As suggested above, the lighting estimation system 108 can generate or adjust 3D-source-specific-lighting parameters based on a change in a virtual object's position or a change in lighting conditions within a digital image. To illustrate such adjustments, FIGS. 5A-5C depict an embodiment of the lighting estimation system 108 in which a computing device renders a digital image comprising a virtual object at different designated positions according to 3D-source-specific-lighting parameters and ambient parameters. FIGS. 5D-5E depict an embodiment of the lighting estimation system 108 in which a computing device presents a graphical user interface comprising lighting parameter controls for 3D-source-specific-lighting parameters corresponding to different predicted light sources. As an overview, FIGS. 5A-5E each depict a computing device 500 comprising a digital imagery application for the digital imagery system 106 and the lighting estimation system 108. The digital imagery application comprises computer-executable instructions that cause the computing device 500 to perform certain actions depicted in FIGS. 5A-5E.

Rather than repeatedly describe the computer-executable instructions within the digital imagery application as causing the computing device 500 to perform such actions, this disclosure primarily describes the computing device 500 or the lighting estimation system 108 as performing the actions as a shorthand. This disclosure additionally refers to various user interactions indicated by FIGS. 5A-5E, such as when the computing device 500 detects a user selection of a virtual object. While the computing device 500 appears as a mobile device (e.g., tablet) in FIGS. 5A-5E, the computing device 500 may alternatively be any type of computing device, such as a desktop, laptop, or smartphone, and may also detect any suitable user interaction, including, but not limited to, an audio input into a microphone, a gaming-device-button input, a keyboard input, a mouse click, a stylus interaction with a touch screen, or a touch gesture on a touch screen.

Turning back now to FIG. 5A, this figure depicts the computing device 500 presenting a graphical user interface 506a comprising a digital image 510 within a screen 502. As shown in FIG. 5A, the digital image 510 includes real objects 512a and 512b. Light sources 516a and 516b further illuminate the digital image 510. While FIG. 5A depicts the light sources 516a and 516b within the digital image 510, a digital image may be illuminated by any number of light sources within or without the digital image. The graphical user interface 506a further comprises a selectable-option bar 504 for virtual objects 508a-508c. By presenting the graphical user interface 506a, the computing device 500 provides options for a user to request the lighting estimation system 108 to render one or more of the virtual objects 508a-508c at designated positions within the digital image 510.

As indicated by FIG. 5A, for example, the computing device 500 detects a user interaction requesting that the lighting estimation system 108 render the virtual object 508a at a designated position 514 within the digital image 510. In particular, FIG. 5A depicts the computing device 500 detecting a drag-and-drop gesture moving the virtual object 508a to the designated position 514 or identifying the designated position 514 as a destination for the virtual object 508a. While FIG. 5A illustrates a user using a drag-and-drop gesture, the computing device 500 may detect any suitable user interaction requesting the lighting estimation system 108 render a virtual object within a digital image.

Based on receiving the request for the lighting estimation system 108 to render the virtual object 508a within the digital image 510, the digital imagery system 106 in conjunction with the lighting estimation system 108 can render the virtual object 508a at the designated position 514. FIG. 5B depicts an example of such a rendering. As illustrated in FIG. 5B, the computing device 500 presents a graphical user interface 506b comprising a modified digital image 518 within the screen 502. Consistent with the disclosure above, the computing device 500 renders the modified digital image 518 comprising the virtual object 508a at the designated position 514 illuminated according to 3D-source-specific-lighting parameters and an ambient parameter generated by the lighting estimation system 108.

To generate the 3D-source-specific-lighting parameters and the ambient parameter, the lighting estimation system 108 optionally performs the actions illustrated and described above in reference to FIG. 4C. As shown in rendered form in FIG. 5B, the 3D-source-specific-lighting parameters indicate realistic lighting conditions for the virtual object 508a with lighting and shading consistent with the real objects 512a and 512b. The shading for the virtual object 508a and for the real objects 512a and 512b consistently reflect light from the light sources 516a and 516b.

As noted above, the lighting estimation system 108 can generate new 3D-source-specific-lighting parameters and an adjusted digital image in response to a position-adjustment request to render a virtual object at a new designated position. FIG. 5C depicts an example of such an adjusted digital image reflecting new 3D-source-specific-lighting parameters. As shown in FIG. 5C, the computing device 500 presents a graphical user interface 506c comprising an adjusted digital image 520 within the screen 502. As a trigger for moving the virtual object 508a, the computing device 500 detects a user interaction comprising a position-adjustment request to move the virtual object 508a from the designated position 514 to a new designated position 522.

Based on receiving the request for the lighting estimation system 108 to move the virtual object 508a, the digital imagery system 106 in conjunction with the lighting estimation system 108 render the virtual object 508a at the new designated position 522. Accordingly, FIG. 5C depicts the computing device 500 rendering the adjusted digital image 520 comprising the virtual object 508a at the new designated position 522 illuminated according to the 3D-source-specific-lighting parameters and the ambient parameter generated by the lighting estimation system 108—projected to capture the new designated position 522.

To generate such new parameters, the lighting estimation system 108 optionally uses the source-specific-lighting-estimation-neural network 400b to generate 3D-source-specific-lighting parameters and an ambient parameter as illustrated and described above in relation to FIG. 4C. For instance, the lighting estimation system 108 can identify a new local position indicator based on the new designated position 522. The lighting estimation system 108 can adjust a projection of 3D-source-specific-lighting parameters for the new designated position 522. In response to the position-adjustment request, the digital imagery system 106 in conjunction with the lighting estimation system 108 accordingly can render the adjusted digital image 520 comprising the virtual object 508a at the new designated position 522 illuminated according to the adjusted projection of the 3D-source-specific-lighting parameters and the ambient parameter.

As depicted in FIG. 5C, the new 3D-source-specific-lighting parameters indicate realistic lighting conditions for the virtual object 508a with adjusted lighting and shading consistent with the real objects 512a and 512b—based on light emanating from the light sources 516a and 516b. As the transition from FIGS. 5B to 5C illustrate, the lighting estimation system 108 can adapt lighting conditions to different positions in real (or near-real) time in response to a position-adjustment request to move a virtual object within a digital image. For example, in some embodiments, the lighting estimation system 108 can generate the modified digital image 518 or the adjusted digital image 520 in 51 milliseconds per image using a CPU.

In addition to (or independent of) adjusting lighting parameters based on movement of a virtual object, in some embodiments, the lighting estimation system 108 generates predicted lighting parameters that can be adjusted by a user to improve accuracy or to create a visual effect. For example, in some cases, the lighting estimation system 108 provides data (or instructions) to a computing device for a graphical user interface comprising lighting parameter controls. Such lighting parameter controls enable a user to individually adjust 3D-source-specific-lighting parameters. FIGS. 5D and 5E provide examples of a graphical user interface with such controls.

As shown in FIG. 5D, for example, the computing device 500 presents a graphical user interface 506d comprising a digital image 524 and corresponding lighting parameter controls within a screen 502. As FIG. 5D indicates, the computing device 500 detects a user selection of the digital image 524 and a user selection to render a virtual object within the digital image 524. Based on the render request, the lighting estimation system 108 applies a source-specific-lighting-estimation-neural network to the digital image 524 to generate 3D-source-specific-lighting parameters and an ambient parameter. As further shown in FIG. 5D, the computing device 500 generates a predicted environment map 526 based on a projection of the 3D-source-specific-lighting parameters. Based on the 3D-source-specific-lighting parameters and the ambient parameter, the computing device 500 generates (or renders) a parameter-based-rendering 528 of the virtual object.

In addition to the digital image 524 and corresponding imagery, the computing device 500 further presents source-specific-lighting-parameter controls 530a-530c and ambient lighting controls 532. As indicated by FIG. 5D, the source-specific-lighting-parameter controls 530a, 530b, and 530c respectively correspond to different predicted light sources illuminating the digital image 524. For example, in some embodiments, each of the source-specific-lighting-parameter controls 530a-530c include controls for adjusting a direction, position, size, and color of a particular predicted light source. In the embodiment shown in FIG. 5D, the source-specific-lighting-parameter controls 530a-530c each include slider controls as examples. But the lighting estimation system 108 may use any suitable parameter controls, including, but not limited to, buttons, check boxes, entry fields, radio buttons, or toolbars.

As shown in FIG. 5D, for example, the source-specific-lighting-parameters controls 530a include a couple of positioning controls—including a light-source-elevation control 534 and a light-source-distance control 538. Based on detecting a user interaction with the light-source-elevation control 534, the computing device 500 adjusts values from 3D-source-specific-distance parameters to alter lighting conditions to simulate an increase or a decrease in elevation of a predicted lighting source illuminating the parameter-based-rendering 528. By contrast, based on detecting a user interaction with the light-source-distance control 538, the computing device 500 adjusts values from 3D-source-specific-distance parameters to alter lighting conditions to simulate an increase or decrease in distance along an abscissa axis (i.e., x-axis) or an applicate axis (i.e., z-axis) of the predicted lighting source.

In addition to positioning controls, the source-specific-lighting-parameters controls 530a further include a light-source-direction control 536, a light-source-size control 540, and a light-source-intensity control 542. Based on detecting a user interaction with the light-source-direction control 536, for example, the computing device 500 adjusts values from 3D-source-specific-direction parameters to alter lighting conditions to simulate a change in direction from a reference point of a predicted lighting source illuminating the parameter-based-rendering 528 (e.g., in terms of degrees from a camera). By contrast, based on detecting a user interaction with the light-source-size control 540, the computing device 500 adjusts values from source-specific-size parameters to alter lighting conditions to simulate a change in size of the predicted lighting source (e.g., in terms of angular size or steradians). When the computing device 500 detects a user interaction with the light-source-intensity control 542, the computing device 500 adjusts values from source-specific-color parameters (or other lighting parameters) to alter lighting conditions to simulate a change in light intensity emanating from the predicted lighting source.

As further shown in FIG. 5D, the source-specific-lighting-parameter controls 530a also include light-source-color controls 544. The light-source-color controls 544 include controls for various color metrics. For example, the light-source-color controls 544 include a control for a red code, a green code, and a blue code and (additionally or alternatively) a hue metric, a saturation metric, and a color-value metric. Based on detecting a user interaction with one of the light-source-size controls 540, the computing device 500 adjusts values from 3D-source-specific-color parameters to alter a lighting color of a predicted lighting source illuminating the parameter-based-rendering 528 in terms of a red code, a green code, a blue code, a hue metric, a saturation metric, or a color-value metric.

In addition to the source-specific-lighting-parameter controls 530a-530c, the computing device 500 further presents ambient lighting controls 532 within the graphical user interface 506d. The ambient lighting controls 532 include controls for a red code, a green code, and a blue code for ambient lighting within digital image 524. Based on detecting a user interaction with one of the ambient lighting controls 532, the computing device 500 adjusts values of the ambient parameter to alter a color of ambient lighting within the parameter-based-rendering 528 in terms of a red code, a green code, or a blue code.

When the lighting estimation system 108 adjusts 3D-source-specific-light parameters based on user interactions with such lighting parameter controls, in some embodiments, the lighting estimation system 108 provides real time (or near real-time) renderings depicted such adjustments. FIG. 5E depicts an example of the lighting estimation system 108 adjusting 3D-source-specific-light parameters in a rendering of a virtual object within a digital image. As shown in FIG. 5E, the computing device 500 presents a graphical user interface 506e comprising the digital image 524, an adjusted environment map 546, and an adjusted parameter-based-rendering 548 within the screen 502.

Based on adjustments to 3D-source-specific-light parameters or an ambient parameter, the lighting estimation system 108 applies a source-specific-lighting-estimation-neural network to the digital image 524 to generate one or both of adjusted 3D-source-specific-lighting parameters and an ambient parameter. The computing device 500 further generates the adjusted environment map 546 based on a projection of the adjusted 3D-source-specific-lighting parameters. Based on one or both of the adjusted 3D-source-specific-lighting parameters and the adjusted ambient parameter, the computing device 500 generates the adjusted parameter-based-rendering 548 of the virtual object.

As indicated by a comparison of the predicted environment map 526 from FIG. 5D and the adjusted environment map 546 from FIG. 5E, the adjusted environment map 546 reflects changes to 3D-source-specific-light parameters based on adjustments to one or more of the source-specific-lighting-parameter controls 530a-530c. For example, the lighting estimation system 108 renders the adjusted environment map 546 comprising a change in elevation, direction, and intensity to a particular predicted light source illuminating the digital image 524—based on adjustments to the light-source-elevation control 534, the light-source-direction control 536, and the light-source-intensity control 542, respectively. But the lighting estimation system 108 could reflect changes in an adjusted environment map based on adjustments to any of the source-specific-lighting-parameter controls 530a-530c.

As indicated by a comparison of the parameter-based-rendering 528 from FIG. 5D and the adjusted parameter-based-rendering 548 from FIG. 5E, the adjusted parameter-based-rendering 548 includes modified lighting conditions reflecting changes to 3D-source-specific-light parameters based on adjustments from one or more of the source-specific-lighting-parameter controls 530a-530c. For example, the lighting estimation system 108 renders the adjusted parameter-based-rendering 548 comprising a virtual object illuminated according to 3D-source-specific-light parameters comprising a change in elevation, direction, and intensity to a particular predicted light source—based on adjustments to the light-source-elevation control 534, the light-source-direction control 536, and the light-source-intensity control 542, respectively. But the lighting estimation system 108 could reflect changes in an adjusted parameter-based-rendering based on adjustments to any of the source-specific-lighting-parameter controls 530a-530c or the ambient lighting controls 532.

As noted above, the lighting estimation system 108 can generate 3D-source-specific-lighting parameters that indicate accurate and realistic lighting conditions for a digital image illuminated by multiple light sources. To test the accuracy and realism of the lighting estimation system 108, researchers extracted digital images from 258 HDR-panoramic images within the Laval Indoor HDR Dataset (as described above). In total, the researchers extracted 2,016 digital images (not used during training) for quantitative and qualitative evaluations of a source-specific-lighting-estimation-neural network. The researchers subsequently applied a source-specific-lighting-estimation-neural network and neural networks from existing digital imagery systems to the digital images. For example, the researchers applied neural networks described by Gardner and Kevin Karsch et al., "Rendering Synthetic Objects into Legacy Photographs," Vol. 30, *ACM Transactions on Graphics* (2011) (hereinafter, "Karsch"), the entire contents of which are incorporated by reference. Whereas Gardner's neural network outputs non-parametric lighting representations, Karsch's neural network output parametric lighting representations.

Figures 6A, 6B:
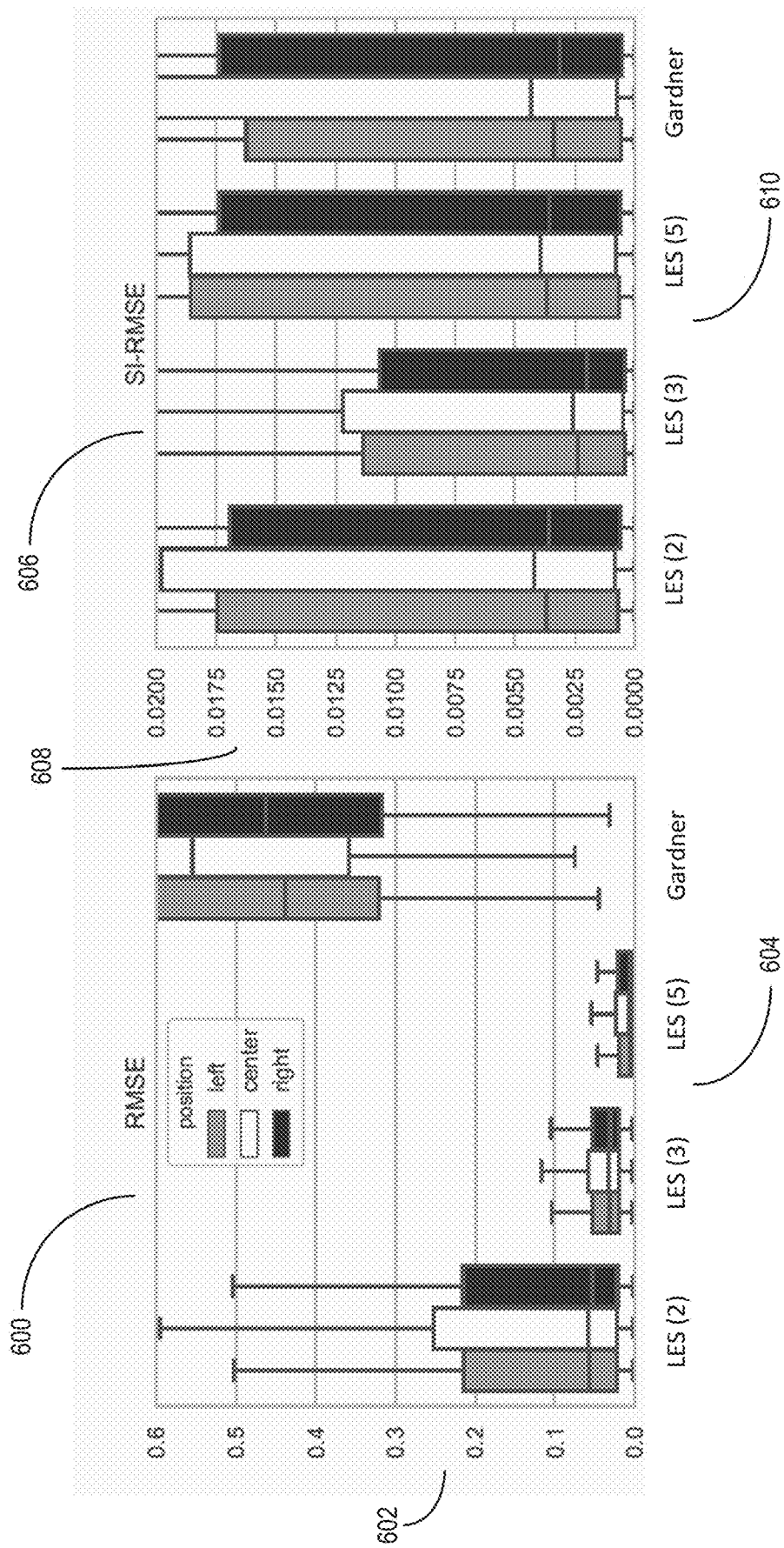
FIGS. 6A and 6B illustrate graphs comparing Root Mean Square Error ("RMSE") and scale-invariant RMSE ("si-RMSE") for renderings generated by the lighting estimation system and an existing digital imagery system in accordance with one or more embodiments.
Figure 7:
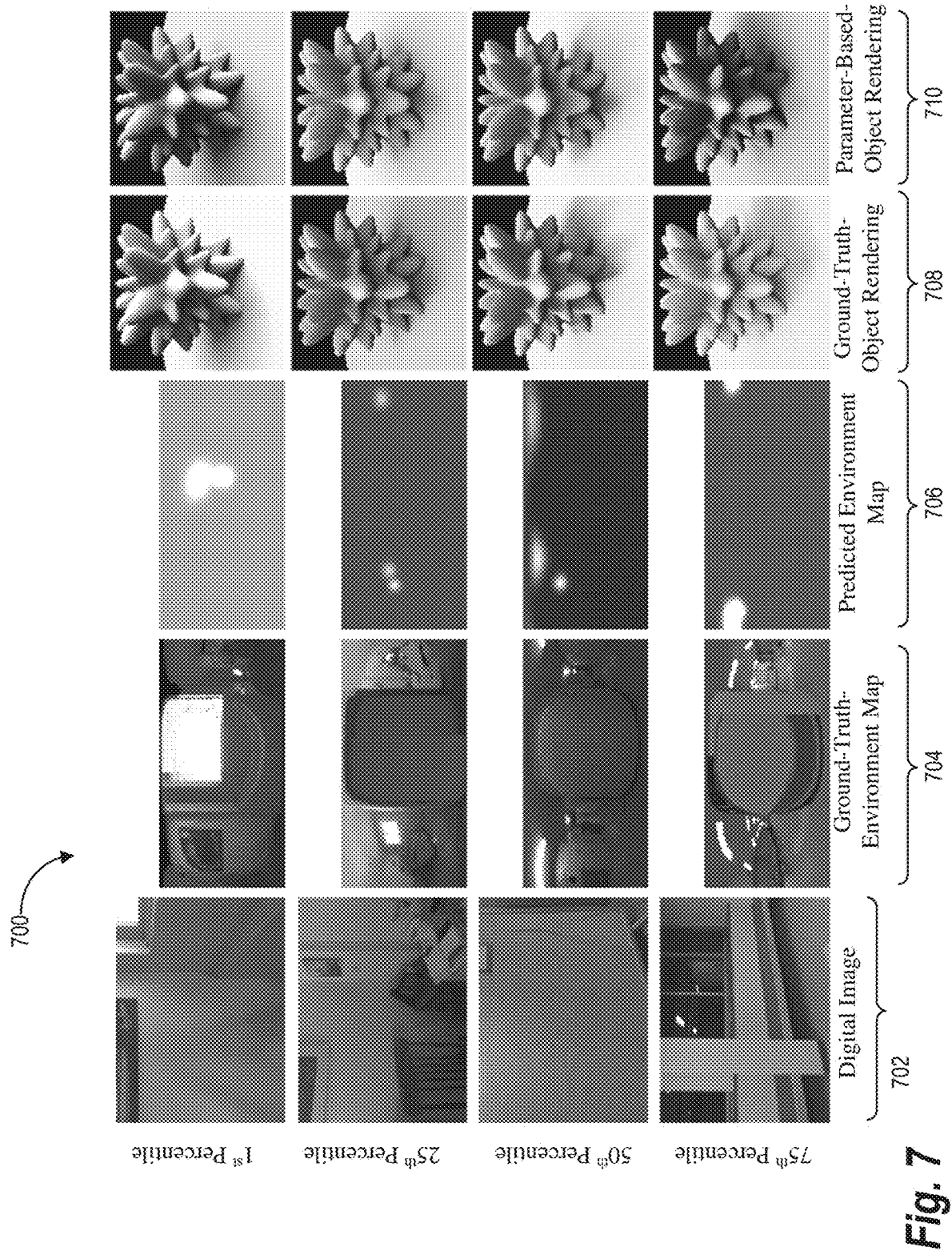
FIG. 7 illustrates a comparison of sample predicted environment maps and sample parameter-based-object renderings generated by the lighting estimation system organized according to error percentiles of RMSE in accordance with one or more embodiments.

FIGS. 6A and 6B illustrate quantitative examples of the accuracy and realism with which the lighting estimation system 108 renders a virtual object at designated positions within a digital image illuminated by 3D-source-specific-lighting parameters. To compare the source-specific-lighting-estimation-neural network to Gardner's neural network, for instance, the researchers used the source-specific-lighting-estimation-neural network and Gardner's neural network to render a diffuse virtual object at three different locations within digital images: a center position, a left position one meter to the left of the center position, and a right position one meter to the right of the center position. As explained further below, FIG. 7 depicts an example of such a diffuse virtual object as a spiky sphere-like object. The researchers also applied three different configurations of a source-specific-lighting-estimation-neural network to the digital images. In particular, the lighting estimation system 108 configured three source-specific-lighting-estimation-neural networks to generate 3D-source-specific-lighting parameters corresponding to 2, 3, and 5 predicted light sources, respectively.

The researchers further generated ground-truth-environment maps corresponding to the digital images illuminated according to ground-truth-source-specific-lighting parameters. To warp HDR-panoramic images into the ground-truth-environment maps corresponding to the digital images, the researchers used the geometry of EnvyDepth from Banterle. The researchers subsequently compared ground-truth-object renderings of virtual objects (corresponding to the ground-truth-environment maps) to renderings of the virtual objects illuminated according to lighting parameters from the source-specific-lighting-estimation-neural network and Gardner's neural network.

Based on the foregoing ground-truth comparisons, the researchers determined a Root Mean Square Error ("RMSE") and a scale-invariant RMSE ("si-RMSE") corresponding to each digital image. In this context, RMSE indicates errors in overall light intensity with better sensitivity than si-RMSE. By contrast, si-RMSE factors out scale differences between a source-specific-lighting-estimation-neural network and Gardner's neural network, on the one hand, and ground-truth-environment maps, on the other hand. The si-RMSE further focuses on cues such as shading and shadows primarily from light-source positions.

As shown in FIG. 6A, for example, a RMSE graph 600 indicates the RMSE for renderings of a diffuse virtual object based on lighting parameters from the source-specific-lighting-estimation-neural network and Gardner's neural network. The RMSE graph 600 includes an RMSE-axis 602 indicating RMSE values. The RMSE graph 600 further includes a network-axis 604 indicating a neural network corresponding to the RMSE values—including source-specific-lighting-estimation-neural networks respectively configured for two, three, or five predicted light sources or a neural network from Gardner. For simplicity, FIGS. 6A and 6B refer to the lighting estimation system 108 and a corresponding source-specific-lighting-estimation-neural network with the abbreviation "LES."

As indicated by the RMSE graph 600 from FIG. 6A, the source-specific-lighting-estimation-neural network outperforms Gardner's neural network in terms of RMSE. For each of the three positions for the virtual object, the source-specific-lighting-estimation-neural network in each configuration demonstrates better RMSE values than Gardner's neural network. The RMSE graph 600 further indicates that the source-specific-lighting-estimation-neural networks result in better RMSE values as the configuration increases from estimating parameters for two light sources to three light sources and from three light sources to five light sources. Such an improved RMSE suggests that changing a configuration for a source-specific-lighting-estimation-neural network to match an increasing number of light sources also increases the degrees of freedom for the network to better fit an overall energy distribution of an environment map. In addition to better RMSE values, the source-specific-lighting-estimation-neural network also demonstrates consistent errors across the three different positions for the virtual object—unlike the higher variance in RMSE for Gardner's neural network across the different positions.

As shown in FIG. 6B, a si-RMSE graph 606 indicates the si-RMSE for renderings of a diffuse virtual object based on lighting parameters from the source-specific-lighting-estimation-neural network and Gardner's neural network. The si-RMSE graph 606 includes an si-RMSE-axis 608 indicating si-RMSE values. The si-RMSE graph 606 further includes a network-axis 610 indicating a neural network corresponding to the si-RMSE values—including source-specific-lighting-estimation-neural networks respectively configured for two, three, or five predicted light sources or a neural network from Gardner.

As the si-RMSE graph 606 suggests, the source-specific-lighting-estimation-neural network configured for three predicted light sources outperforms Gardner's neural network in terms of si-RMSE. The si-RMSE values for the three-light-source configuration are better than the si-RMSE values for the two-light-source configuration. But the si-RMSE values for the three-light-source configuration are also better than the si-RMSE values for the five-light-source configuration. The si-RMSE values accordingly suggests that optimizing positions of five light sources is more difficult than three light sources for the source-specific-lighting-estimation-neural network. As the si-RMSE graph 606 further indicates, the three-light-source configuration for the source-specific-lighting-estimation-neural network generates 3D-source-specific-lighting parameters for renderings resulting in a 40% increase in median estimation performance in terms of si-RMSE in comparison to Gardner's neural network. In addition to better si-RMSE values, the source-specific-lighting-estimation-neural network also outputs lighting parameters for renderings corresponding to more consistent si-RMSE values across the three different positions for the virtual object than Gardner's neural network.

FIG. 7 illustrates qualitative examples of the accuracy and realism with which the lighting estimation system 108 renders a virtual object within a digital image illuminated by 3D-source-specific-lighting parameters. In particular, FIG. 7 depicts a comparison array 700 comprising sample predicted environment maps and sample parameter-based-object renderings generated by the lighting estimation system 108. As organized according to error percentiles of RMSE, the comparison array 700 demonstrates comparisons of ground-truth-environment maps and predicted environment maps generated by the lighting estimation system 108 from sample digital images, as well as comparisons of ground-truth-object renderings and parameter-based-object renderings generated by the lighting estimation system 108.

As shown in FIG. 7, each row of the comparison array 700 comprises a digital image from a digital-scene column 702, a ground-truth-environment map from a ground-truth-map column 704, a predicted environment map from a predicted-map column 706, a ground-truth-object rendering from a ground-truth-rendering column 708, and a parameter-based-object rendering from a parameter-rendering column 710. Each row of the comparison array 700 also corresponds to a different error percentile of RMSE indicating an error (or difference) between the environment maps or lighting parameters for the renderings, including a first percentile, a twenty-fifth percentile, a fiftieth percentile, and a seventy-fifth percentile.

As part of determining RMSE for the qualitative analysis described above, the lighting estimation system 108 analyzes each digital image from the digital-scene column 702 to generate (i) each corresponding ground-truth-environment map shown in the ground-truth-map column 704 based on ground-truth-source-specific-lighting parameters and (ii) each corresponding predicted environment map shown in the predicted-map column 706 based on 3D-source-specific-lighting parameters. The lighting estimation system 108 further generates (i) each ground-truth-object rendering shown in the ground-truth-rendering column 708 according to the ground-truth-source-specific-lighting parameters and (ii) each corresponding parameter-based-object rendering shown in the parameter-rendering column 710 according to the 3D-source-specific-lighting parameters. The lighting estimation system 108 illuminates a virtual object in the parameter-based-object renderings according to lighting conditions at a center position of the digital image based on the 3D-source-specific-lighting parameters.

As indicated by the row corresponding to the first percentile RMSE in the comparison array 700, the differences between the lighting in the ground-truth-environment map and the predicted environment map—and the differences between the ground-truth-object rendering and the parameter-based-object rendering—demonstrate the accuracy of 3D-source-specific-lighting parameters in realistically estimating lighting conditions. Even in the row corresponding to the seventy-fifth percentile RMSE with more significant error, the differences between the lighting in the ground-truth-environment map and predicted environment map—and the differences between the ground-truth-object rendering and the parameter-based-object rendering—demonstrate a plausible representation of lighting conditions from the digital image according to the 3D-source-specific-lighting parameters.

Figure 8:
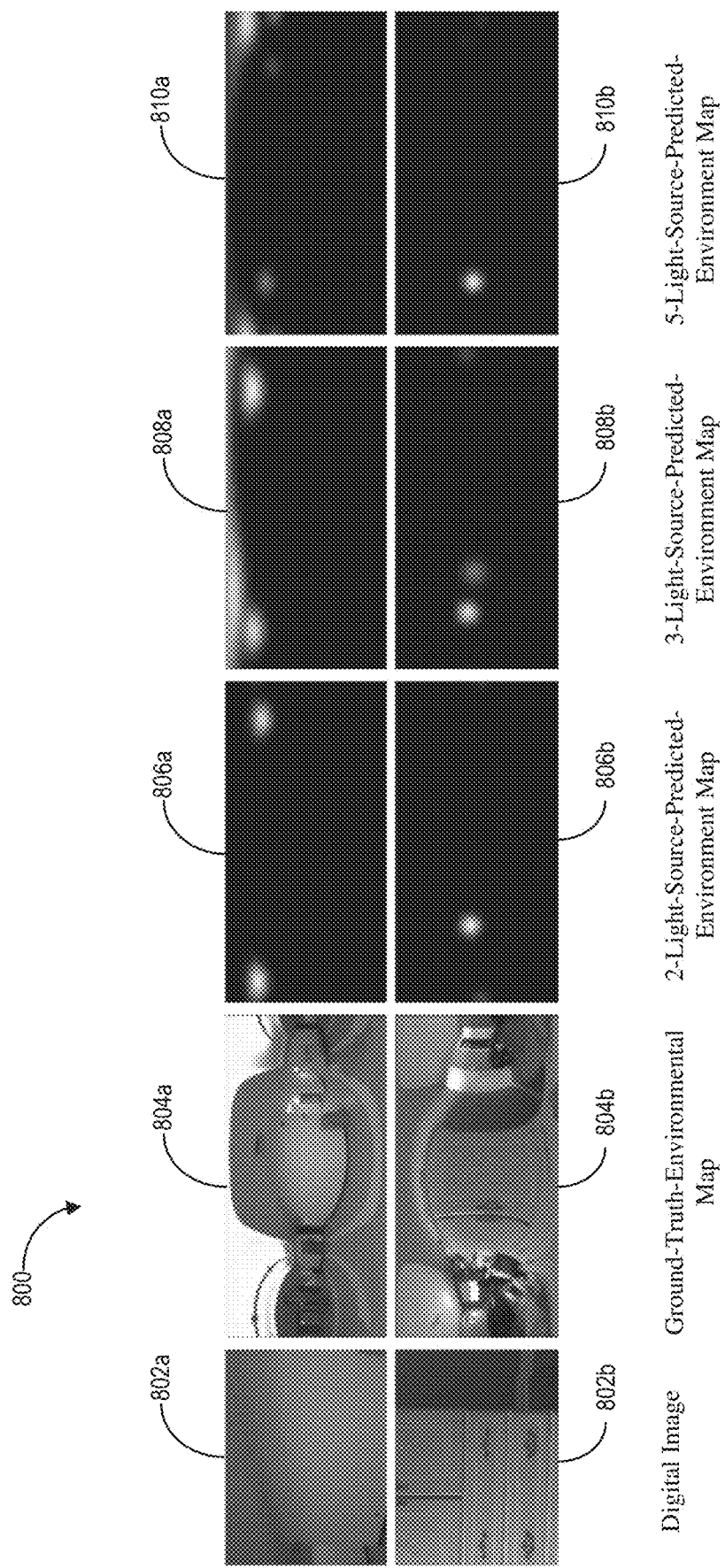
FIG. 8 illustrates a comparison of sample digital images, sample ground-truth-environment maps, and sample predicted environment maps corresponding to 3D-source-specific-lighting parameters generated by different source-specific-lighting-estimation-neural networks in accordance with one or more embodiments.

As noted above, in some embodiments, the lighting estimation system 108 configures a source-specific-lighting-estimation-neural network to generate 3D-source-specific-lighting parameters corresponding to a preset number of predicted light sources. For the quantitative evaluation described above, for example, the lighting estimation system 108 applies different source-specific-lighting-estimation-neural networks separately preset to a two-light-source configuration, a three-light-source configuration, and a five-light-source configuration. FIG. 8 depicts a map-comparison array 800 comprising sample digital images, sample ground-truth-environment maps, and sample predicted environment maps corresponding to 3D-source-specific-lighting parameters generated by source-specific-lighting-estimation-neural networks of such different configurations. As indicated by a ground-truth-environment map 804a, two light sources illuminate the sample digital image 802a. As indicated by a ground-truth-environment map 804b, by contrast, one light source illuminates the sample digital image 802b.

As illustrated in FIG. 8, the lighting estimation system 108 applies the source-specific-lighting-estimation-neural networks of the two-light-source configuration, the three-light-source configuration, and the five-light-source configuration to the sample digital images 802a and 802b to generate 3D-source-specific-lighting parameters. Based on the 3D-source-specific-lighting parameters from the differently configured networks, the lighting estimation system 108 projects different types of predicted environment maps—including two-light-source-predicted-environment maps 806a and 806b, three-light-source-predicted-environment maps 808a and 808b, and five-light-source-predicted-environment maps 810a and 810b.

As shown by a comparison of the ground-truth-environment map 804a to (i) the two-light-source-predicted-environment map 806a, (ii) the three-light-source-predicted-environment map 808a, and (iii) the five-light-source-predicted-environment map 810a, the lighting estimation system 108 generates 3D-source-specific-lighting parameters that accurately indicate positions and other parameters for two light sources when using a source-specific-lighting-estimation-neural network. By decreasing or zeroing out source-specific-predicted-color parameters $ĉ_i$, a source-specific-lighting-estimation network generates 3D-source-specific-lighting parameters indicating two predicted light sources illuminating the sample digital image 802a—despite preset light-source configurations. In particular, a source-specific-lighting-estimation network demonstrates such accuracy in each of the two-light-source configuration, the three-light-source configuration, and the five-light-source configuration—respectively corresponding to the two-light-source-predicted-environment map 806a, the three-light-source-predicted-environment map 808a, and the five-light-source-predicted-environment map 810a.

As shown by a comparison of the ground-truth-environment map 804b to (i) the two-light-source-predicted-environment map 806b, (ii) the three-light-source-predicted-environment map 808b, and (iii) the five-light-source-predicted-environment map 810b, the lighting estimation system 108 generates 3D-source-specific-lighting parameters that accurately indicate positions and other parameters for one light source when using a source-specific-lighting-estimation-neural network. By decreasing or zeroing out source-specific-predicted-color parameters $ĉ_i$, a source-specific-lighting-estimation network generates 3D-source-specific-lighting parameters indicating one predicted light source illuminating the sample digital image 802*b*—despite preset light-source configurations. In particular, a source-specific-lighting-estimation network demonstrates such accuracy in each of the two-light-source configuration, the three-light-source configuration, and the five-light-source configuration—respectively corresponding to the two-light-source-predicted-environment map 806*b*, the three-light-source-predicted-environment map 808*b*, and the five-light-source-predicted-environment map 810*b*.

Figure 9:
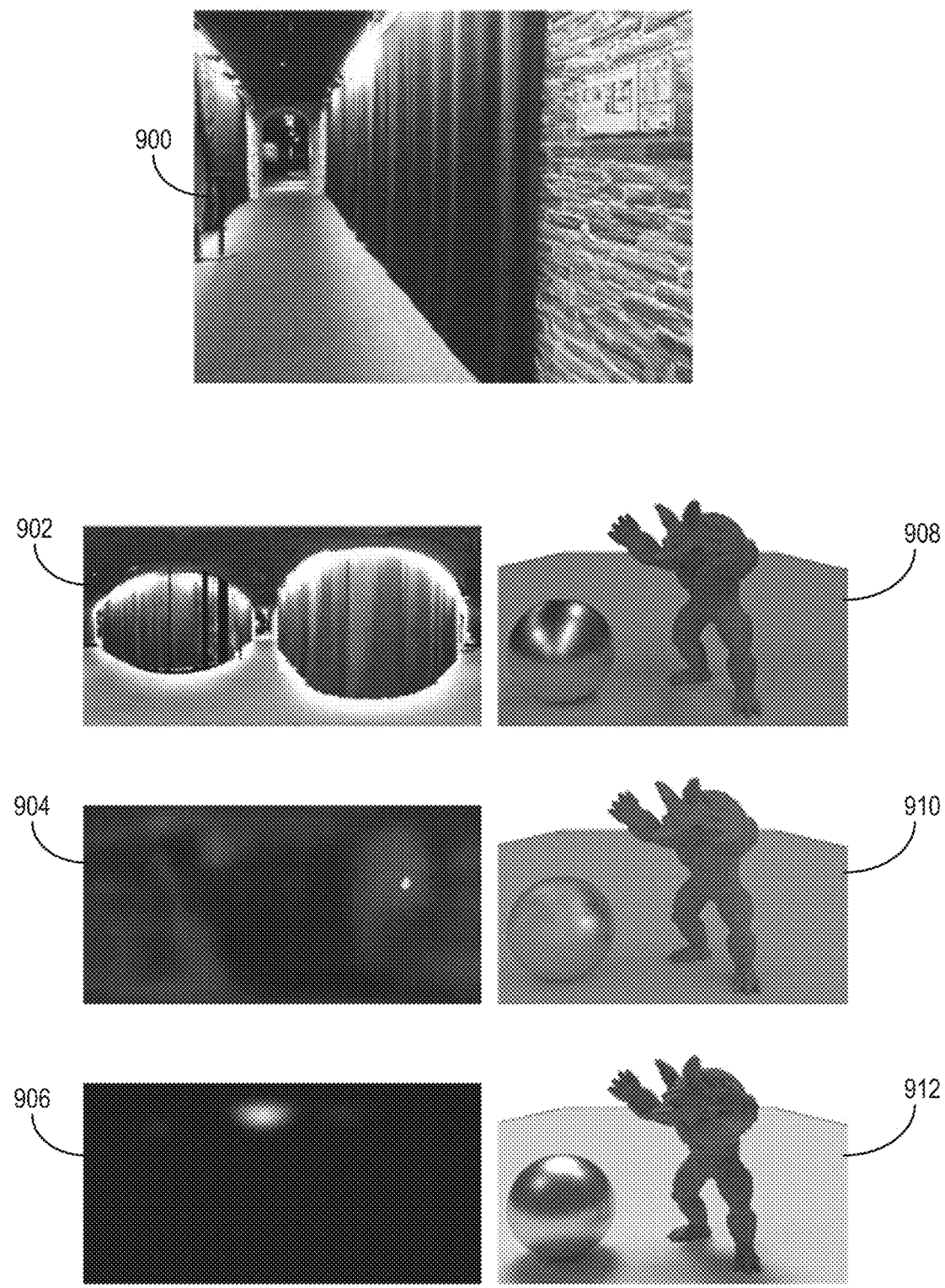
FIG. 9 illustrates renderings comprising virtual objects and environment maps based on lighting parameters generated by the lighting estimation system and an existing digital imagery system in accordance with one or more embodiments.
Figure 10:
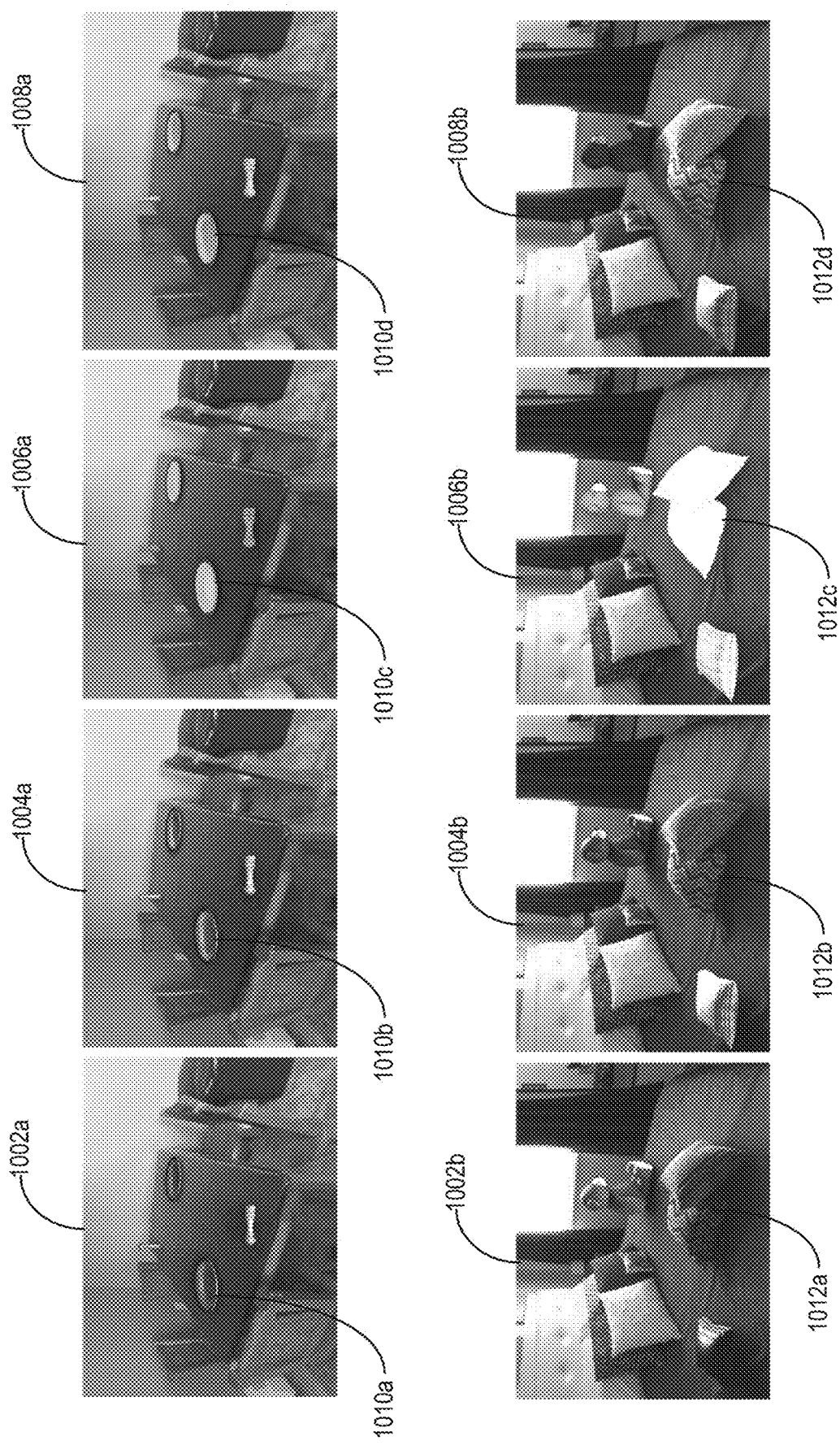
FIG. 10 illustrates renderings comprising virtual objects based on lighting parameters generated by the lighting estimation system and existing digital imagery systems in accordance with one or more embodiments.

FIGS. 9 and 10 further illustrate qualitative comparisons of renderings between the lighting estimation system 108 and existing models for digital imagery systems. As shown in FIG. 9, for example, the lighting estimation system 108 applies a source-specific-lighting-estimation-neural network to a digital image 900 to generate 3D-source-specific-lighting parameters. Based on the 3D-source-specific-lighting parameters, the lighting estimation system 108 projects a predicted environment map 906. The lighting estimation system 108 also generates a parameter-based-object rendering 912 comprising virtual objects based on the 3D-source-specific-lighting parameters illuminating a center position of the digital image 900. By contrast, researchers apply Gardner's neural network to the digital image 900 to generate non-parametric lighting representations of the digital image 900. Based on Gardner's non-parametric lighting representations, the researchers reconstruct a lighting environment map 904. Gardner's system further generates a lighting-based-object rendering 910 comprising the virtual objects based on the non-parametric lighting representations illuminating a center position of the digital image 900.

For purposes of comparison, FIG. 9 further depicts a ground-truth-environment map 902 corresponding to the digital image 900 and a ground-truth-object rendering 908 based on lighting conditions from the ground-truth-environment map 902. Despite a source-specific-lighting-estimation network generating 3D-source-specific-lighting parameters in a more compact representation than Gardner's non-parametric lighting representations, the lighting estimation system 108 generates a rendering of virtual objects that better matches the ground-truth-object rendering 908 than Gardner's lighting-based-object rendering 910. The lighting estimation system 108 can similarly generate parameter-based-object renderings of virtual objects better matching ground-truth-object renderings than Gardner's lighting-based-object renderings—despite a digital image comprising a light source visible within the scene's point of view, a digital image providing little lighting information, or a digital image comprising floor reflections from a light source.

FIG. 10 illustrates qualitative comparisons of modified digital images comprising virtual objects illuminated according to lighting representations from a source-specific-lighting-estimation network, Gardner's neural network, and Karsch's neural network. In each case, a neural network analyzes a first digital image and a second digital image. As indicated by FIG. 10, for example, the lighting estimation system 108 applies a source-specific-lighting-estimation network to the first and second digital images to generate corresponding 3D-source-specific-lighting parameters and respectfully render modified digital images 1004*a* and 1004*b*. The modified digital images 1004*a* and 1004*b* comprise virtual objects illuminated according to the corresponding 3D-source-specific-lighting parameters.

By contrast, researchers apply Karsch's neural network to the first and second digital images to generate corresponding parametric lighting representations of the digital images and respectively render modified digital images 1006*a* and 1006*b*. The modified digital images 1006*a* and 1006*b* comprise virtual objects illuminated according to the corresponding parametric lighting representations. Researchers further apply Gardner's neural network to the first and second digital images to generate corresponding non-parametric lighting representations of the digital images and render modified digital images 1008*a* and 1008*b*. The modified digital images 1008*a* and 1008*b* comprise virtual objects illuminated according to the corresponding non-parametric lighting representations.

For purposes of comparison, the lighting estimation system 108 further determines ground-truth-source-specific-lighting parameters for the first and second digital images and respectfully renders ground-truth-modified-digital images 1002*a* and 1002*b* comprising the virtual objects illuminated according to the ground-truth-source-specific-lighting parameters. Researchers further apply per-image-exposure scaling to the ground-truth-modified-digital image 1002*a* and the modified digital images 1004*a*, 1006*a*, and 1008*a*. By contrast, the ground-truth-modified-digital image 1002*b* and the modified digital images 1004*b*, 1006*b*, and 1008*b* lack such per-image-exposure scaling.

As shown in FIG. 10, each of the ground-truth-modified-digital image 1002*a* and the modified digital images 1004*a*, 1006*a*, and 1008*a* include a same set of virtual objects upon rendering. For example, the ground-truth-modified-digital image 1002*a*, the modified digital image 1004*a*, the modified digital image 1006*a*, and the modified digital image 1008*a* respectively include virtual objects 1010*a*, 1010*b*, 1010*c*, and 1010*d*—where each represent versions of the same virtual object. Similarly, each of the ground-truth-modified-digital image 1002*b* and the modified digital images 1004*b*, 1006*b*, and 1008*b* include a same set of virtual objects upon rendering. For example, the ground-truth-modified-digital image 1002*b*, the modified digital image 1004*b*, the modified digital image 1006*b*, and the modified digital image 1008*b* respectively include virtual objects 1012*a*, 1012*b*, 1012*c*, and 1012*d*—where each represent versions of the same virtual object.

As a comparison of modified digital images from FIG. 10 indicates, the modified digital images 1004*a* and 1004*b* from the lighting estimation system 108 more realistically resemble the lighting conditions of the ground-truth-modified-digital images 1002*a* and 1002*a* than the modified digital images 1006*a*-1006*b* and 1008*a*-1008*b* from Gardner and Karsch. In terms of chromaticity, light intensity, and spatially-varying directionality, the modified digital images 1004*a* and 1004*b* more realistically resemble the ground-truth-modified-digital images 1002*a* and 1002*a*. By contrast, the modified digital images 1006*a*-1006*b* and 1008*a*-1008*b* from Gardner and Karsch introduce coloring errors and exposure errors.

Figure 11:
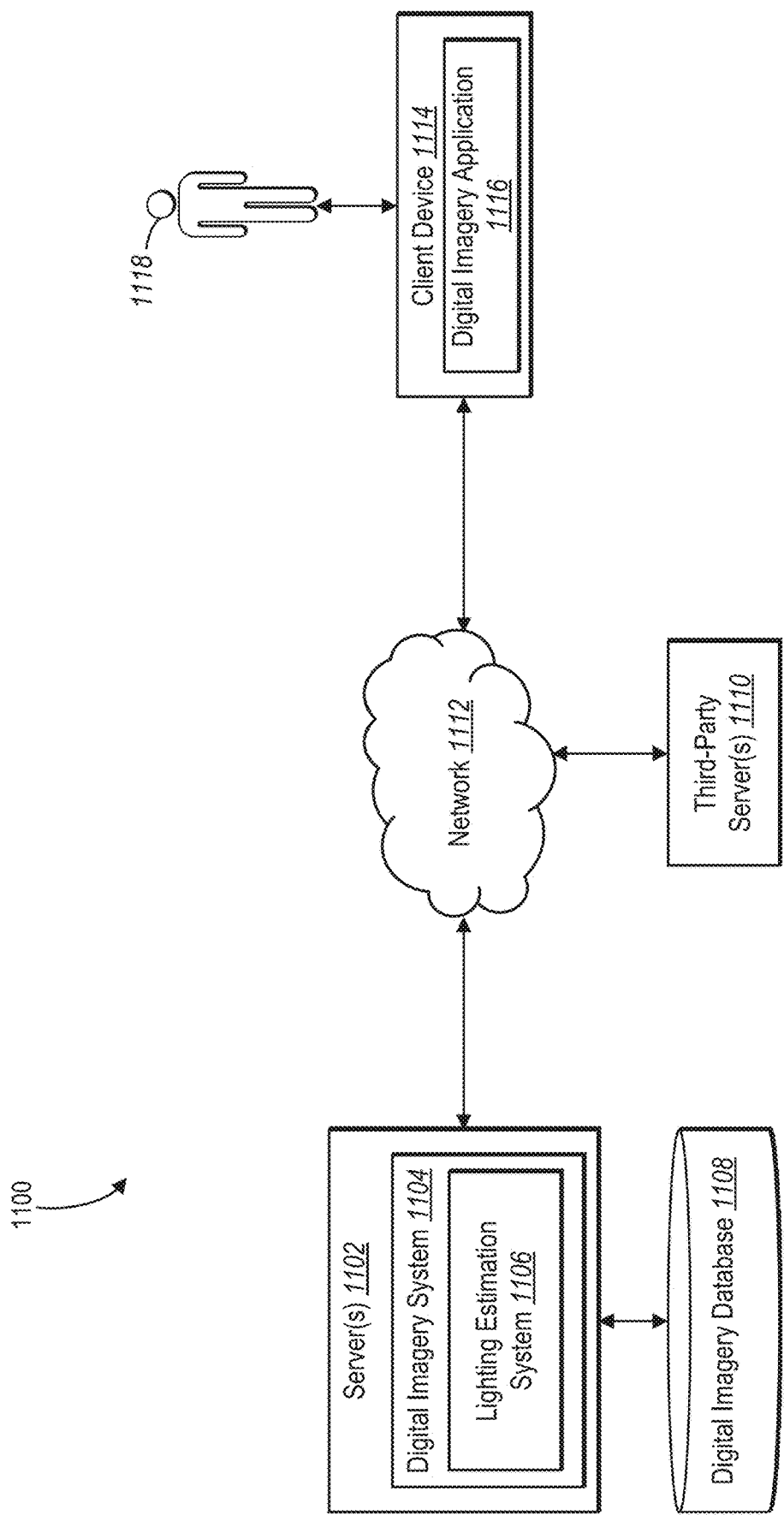
FIG. 11 illustrates a block diagram of an environment in which the lighting estimation system can operate in accordance with one or more embodiments.
Figure 12:
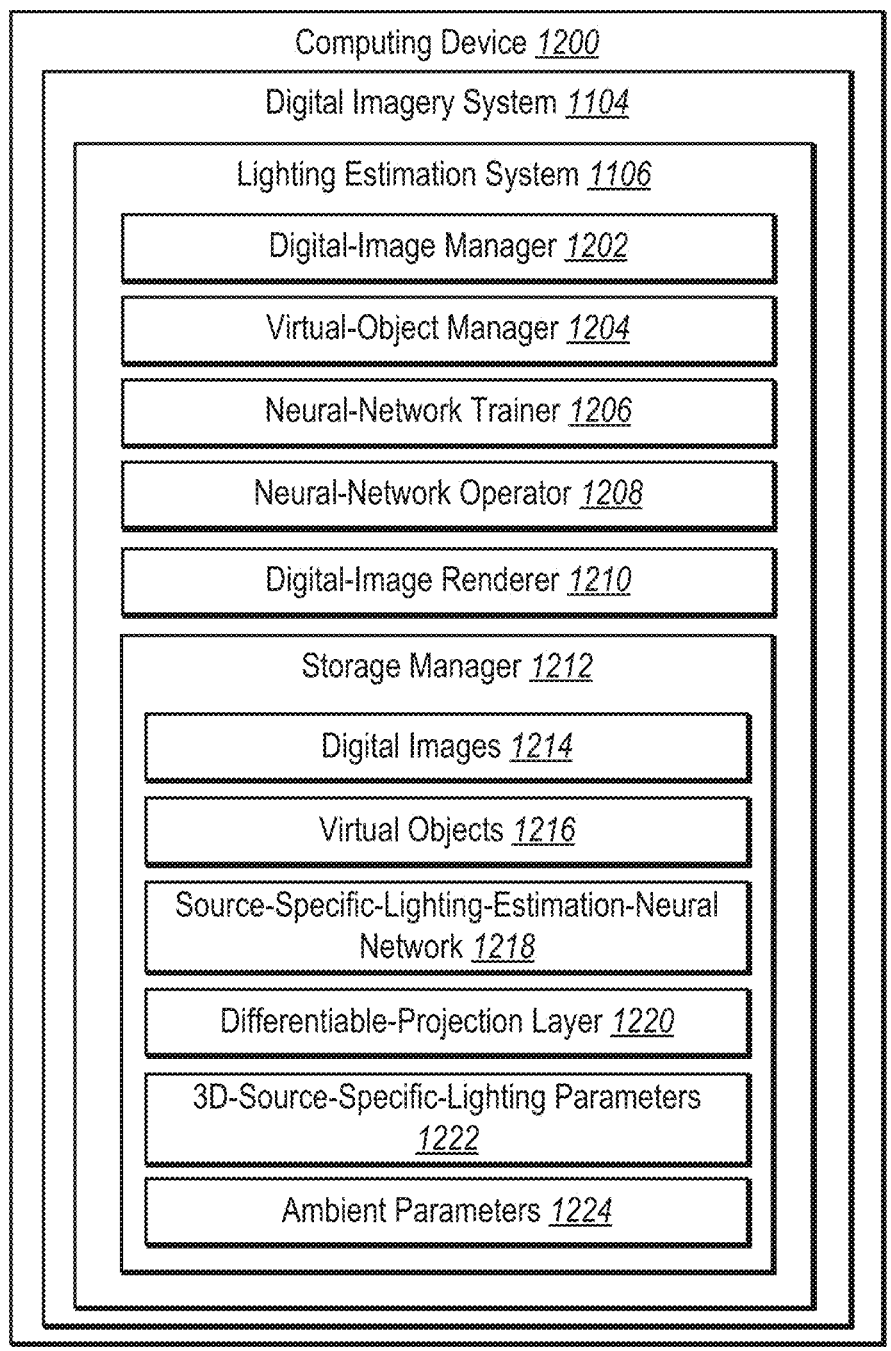
FIG. 12 illustrates a schematic diagram of the lighting estimation system of FIG. 11 in accordance with one or more embodiments.

Turning now to FIGS. 11 and 12, these figures provide an overview of an environment in which a lighting estimation system can operate and an example of an architecture for the lighting estimation system. In particular, FIG. 11 depicts a block diagram illustrating an exemplary system environment ("environment") 1100 in which a lighting estimation system 1106 can operate in accordance with one or more embodiments.

Specifically, FIG. 11 illustrates the environment 1100 comprising server(s) 1102, third-party server(s) 1110, a network 1112, a client device 1114, and a user 1118 associated with the client device 1114. Although FIG. 11 illustrates one client device and one user, in alternative embodiments, the environment 1100 can include any number of computing devices and associated users. Similarly, although FIG. 11 illustrates a particular arrangement of the server(s) 1102, the third-party server(s) 1110, the network 1112, the client device 1114, and the user 1118, various additional arrangements are possible.

As shown in FIG. 11, the server(s) 1102, the third-party server(s) 1110, the network 1112, and the client device 1114 may be communicatively coupled with each other either directly or indirectly, such as coupling through the network 1112, which is described further below in relation to FIG. 15. The server(s) 1102 and the client device 1114 may include any type of computing device, including one or more computing devices as discussed further below in relation to FIG. 15.

As depicted in FIG. 11, the server(s) 1102 can generate, store, receive, and/or transmit any type of data, including inputs of digital images into neural networks or user inputs requesting a rendering of a virtual object to create a modified digital image. For example, the server(s) 1102 can receive a user input from the client device 1114 requesting to render a virtual object at a designated position within a digital image and then utilize a source-specific-lighting-estimation-neural network to generate 3D-source-specific-lighting parameters for the digital image. Upon generating such parameters, the server(s) 1102 can further render a modified digital image comprising the virtual object at the designated position illuminated according to the 3D-source-specific-lighting parameters. In some embodiments, the server(s) 1102 comprise a data server, a communication server, or a web-hosting server.

As further shown in FIG. 11, the server(s) 1102 can include a digital imagery system 1104. In general, the digital imagery system 1104 facilitates the generation, modification, sharing, accessing, storing, and/or deletion of digital content in augmented-reality-based imagery or visual-effects-based imagery (e.g., two-dimensional-digital image of a scene or three-dimensional-digital model of a scene). For example, the digital imagery system 1104 can use the server(s) 1102 to generate modified digital images or models comprising virtual objects or modify existing digital images. In certain implementations, the digital imagery system 1104 uses the server(s) 1102 to receive user inputs identifying digital images, virtual objects, or designated positions within digital images from the client device 1114 or transmit data representing digital images, virtual objects, or designated positions to the client device 1114.

In addition to the digital imagery system 1104, the server(s) 1102 include the lighting estimation system 1106. The lighting estimation system 1106 is an embodiment (and can perform the functions, methods, and processes) of the lighting estimation system 108 described above. In some embodiments, for example, the lighting estimation system 1106 uses the server(s) 1102 to identify a request to render a virtual object at a designated position within a digital image. The lighting estimation system 1106 further uses the server(s) 1102 to extract a common feature vector from the digital image utilizing common network layers of a source-specific-lighting-estimation-neural network. The lighting estimation system 1106 further uses the server(s) 1102 to generate 3D-source-specific-lighting parameters utilizing parametric-specific-network layers of the source-specific-lighting-estimation-neural network. In response to the request to render, the lighting estimation system 1106 further uses the server(s) 1102 to render a modified digital image comprising the virtual object at the designated position illuminated according to the 3D-source-specific-lighting parameters.

As suggested by previous embodiments, the lighting estimation system 1106 can be implemented in whole or in part by the individual elements of the environment 1100. Although FIG. 11 illustrates the lighting estimation system 1106 implemented within the server(s) 1102, components of the lighting estimation system 1106 can be implemented in other components of the environment 1100. For instance, in some embodiments, the client device 1114 comprises the lighting estimation system 108 and performs all of the functions, methods, and processes of the lighting estimation system 1106 described above and below. This disclosure describes the components of the lighting estimation system 1106 further below with regard to FIG. 12.

As further shown in FIG. 11, in some embodiments, the client device 1114 comprises a computing device that allows the user 1118 to send and receive digital communications. For example, the client device 1114 can include a desktop computer, laptop computer, smartphone, tablet, or other electronic device. In some embodiments, the client device 1114 further includes one or more software applications (e.g., a digital imagery application 1116) that allows a user 1118 to send and receive digital communications. For example, the digital imagery application 1116 can be a software application installed on the client device 1114 or a software application hosted on the server(s) 1102. When hosted on the server(s) 1102, the digital imagery application 1116 may be accessed by the client device 1114 through another application, such as a web browser. In some implementations, the digital imagery application 1116 includes instructions that, when executed by a processor, cause the client device 1114 to present one or more graphical user interfaces, such as user interfaces comprising digital images and/or virtual objects for the user 1118 to select and for the lighting estimation system 1106 to include as inputs when generating 3D-source-specific-lighting parameters or modified digital images.

As also illustrated in FIG. 11, the digital imagery system 1104 is communicatively coupled to a digital imagery database 1108. In one or more embodiments, the digital imagery system 1104 accesses and queries data from the digital imagery database 1108 associated with requests from the lighting estimation system 1106. For instance, the digital imagery system 1104 may access digital images, virtual objects, designated positions within digital images, 3D-source-specific-lighting parameters, or ambient parameters for the lighting estimation system 1106. As shown in FIG. 11, the digital imagery database 1108 is separately maintained from the server(s) 1102. Alternatively, in one or more embodiments, the digital imagery system 1104 and the digital imagery database 1108 comprise a single combined system or subsystem within the server(s) 1102.

Turning now to FIG. 12, this figure provides additional detail regarding components and features of the lighting estimation system 1106. In particular, FIG. 12 illustrates a computing device 1200 implementing the digital imagery system 1104 and the lighting estimation system 1106. In some embodiments, the computing device 1200 comprises one or more servers (e.g., the server(s) 1102). In other embodiments, the computing device 1200 comprises one or more client devices (e.g., the client device 1114).

As shown in FIG. 12, the computing device 1200 includes the digital imagery system 1104. In some embodiments, the digital imagery system 1104 uses its components to provide tools for generating (or editing) digital images, augmented-reality-based imagery, or visual-effects-based imagery within a user interface of the digital imagery application 1116. Additionally, in some cases, the digital imagery system 1104 facilitates the generation, modification, sharing, accessing, storing, and/or deletion of digital content in augmented-reality-based imagery or visual-effects-based imagery.

As further shown in FIG. 12, the computing device 1200 includes the lighting estimation system 1106. The lighting estimation system 1106 includes, but is not limited to, a digital-scene manager 1202, a virtual-object manager 1204, a neural-network trainer 1206, a neural-network operator 1208, a digital-scene renderer 1210, and/or a storage manager 1212. The following paragraphs describe each of these components in turn.

As just mentioned, the lighting estimation system 1106 includes the digital-scene manager 1202. The digital-scene manager 1202 identifies, analyzes, and receives inputs concerning digital images. For example, in some embodiments, the digital-scene manager 1202 receives user inputs identifying digital images and presents digital images from a digital imagery application. Additionally, in some embodiments, the digital-scene manager 1202 identifies multiple digital images for presentation as part of a sequence of images (e.g., an augmented-reality sequence or a visual-effects sequence).

As further shown in FIG. 12, the virtual-object manager 1204 identifies, analyzes, and receives inputs concerning virtual objects. For example, in some embodiments, the virtual-object manager 1204 receives user inputs identifying virtual objects and requesting that the lighting estimation system 108 render virtual objects at designated positions within digital images. Additionally, in some embodiments, the virtual-object manager 1204 provides selectable options for virtual objects, such as selectable options shown in a user interface of a digital imagery application.

As further shown in FIG. 12, the neural-network trainer 1206 trains a source-specific-lighting-estimation-neural network 1218. For example, in some embodiments, the neural-network trainer 1206 trains the source-specific-lighting-estimation-neural network 1218 as illustrated in FIG. 4A or 4B, respectively. Among other embodiments, for example, the neural-network trainer 1206 may use a differentiable-projection layer 1220 to project a predicted environment map from 3D-source-specific-lighting parameters when training the source-specific-lighting-estimation-neural network 1218. In some embodiments, the neural-network trainer 1206 further communicates with the storage manager 1212 to generate, apply, and/or access digital training images from digital images 1214, ground-truth-source-specific-lighting parameters from 3D-source-specific-lighting parameters 1222, ground-truth-ambient parameters from ambient parameters 1224, and/or the source-specific-lighting-estimation-neural network 1218.

As further shown in FIG. 12, the neural-network operator 1208 applies a trained version of the source-specific-lighting-estimation-neural network 1218. For example, in some embodiments, the neural-network operator 1208 applies the source-specific-lighting-estimation-neural network 1218 as illustrated in FIG. 1 or 4C, respectively. In some embodiments, the neural-network operator 1208 further communicates with the storage manager 1212 to apply and/or access digital images from the digital images 1214, virtual objects from virtual objects 1216, 3D-source-specific-lighting parameters from the 3D-source-specific-lighting parameters 1222, ambient parameters from the ambient parameters 1224, and/or the source-specific-lighting-estimation-neural network 1218.

In addition to the neural-network operator 1208, in some embodiments, the lighting estimation system 1106 further comprises the digital-scene renderer 1210. The digital-scene renderer 1210 renders modified digital images comprising virtual objects, such as the digital images shown in FIGS. 5B and 5C. For example, in some embodiments, based on a request to render a virtual object at a designated position within a digital image, the digital-scene renderer 1210 renders a modified digital image comprising the virtual object at the designated position illuminated according to 3D-source-specific-lighting parameters from the neural-network operator 1208.

In one or more embodiments, each of the components of the lighting estimation system 1106 are in communication with one another using any suitable communication technologies. Additionally, the components of the lighting estimation system 1106 can be in communication with one or more other devices including one or more client devices described above. Although the components of the lighting estimation system 1106 are shown to be separate in FIG. 12, any of the subcomponents may be combined into fewer components, such as into a single component, or divided into more components as may serve a particular implementation. Furthermore, although the components of FIG. 12 are described in connection with the lighting estimation system 1106, at least some of the components for performing operations in conjunction with the lighting estimation system 1106 described herein may be implemented on other devices within the environment 1100.

Each of the components 1202-1224 of the lighting estimation system 1106 can include software, hardware, or both. For example, the components 1202-1224 can include one or more instructions stored on a computer-readable storage medium and executable by processors of one or more computing devices, such as a client device or server device. When executed by the one or more processors, the computer-executable instructions of the lighting estimation system 1106 can cause the computing device(s) to perform the methods described herein. Alternatively, the components 1202-1224 can include hardware, such as a special-purpose processing device to perform a certain function or group of functions. Alternatively, the components 1202-1224 of the lighting estimation system 1106 can include a combination of computer-executable instructions and hardware.

Furthermore, the components 1202-1224 of the lighting estimation system 1106 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 1202-1224 may be implemented as a stand-alone application, such as a desktop or mobile application. Furthermore, the components 1202-1224 may be implemented as one or more web-based applications hosted on a remote server. The components 1202-1224 may also be implemented in a suite of mobile device applications or "apps." To illustrate, the components 1202-1224 may be implemented in a software application, including, but not limited to, ADOBE ILLUSTRATOR, ADOBE EXPERIENCE DESIGN, ADOBE CREATIVE CLOUD, ADOBE PHOTOSHOP, PROJECT AERO, or ADOBE LIGHTROOM. "ADOBE," "ILLUSTRATOR," "EXPERIENCE DESIGN," "CREATIVE CLOUD," "PHOTOSHOP," "PROJECT AERO," and "LIGHTROOM" are either registered trademarks or trademarks of Adobe Inc. in the United States and/or other countries.

Figure 13:
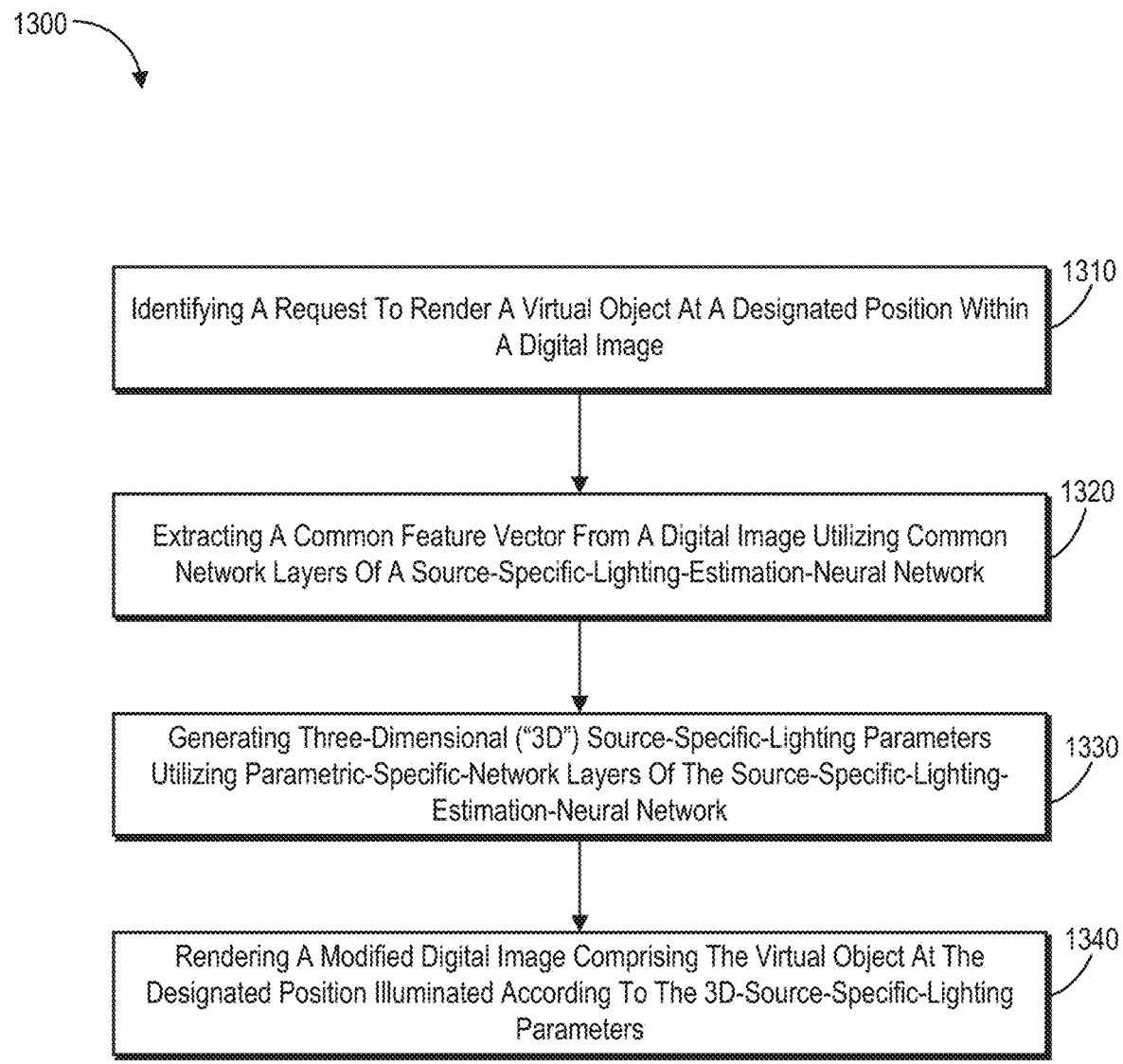
FIGS. 13-14 illustrate flowcharts of a series of acts of using a source-specific-lighting-estimation-neural network to generate 3D-source-specific-lighting parameters for a digital image in accordance with one or more embodiments.

Turning now to FIG. 13, this figure illustrates a flowchart of a series of acts 1300 of using a source-specific-lightingestimation-neural network to generate 3D-source-specific-lighting parameters for a digital image in accordance with one or more embodiments. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer readable storage medium can comprise instructions that, when executed by one or more processors, cause a computing device to perform the acts depicted in FIG. 13. In still further embodiments, a system comprising one or more memory devices and one or more server devices can perform the acts of FIG. 13.

As shown in FIG. 13, the acts 1300 include an act 1310 of identifying a request to render a virtual object at a designated position within a digital image. For instance, in some cases, identifying a request to render comprises receiving, from a computing device, the request to render the virtual object at the designated position within a two-dimensional image.

As further shown in FIG. 13, the acts 1300 include an act 1320 of extracting a common feature vector from a digital image utilizing common network layers of a source-specific-lighting estimation-neural network. For instance, in certain implementations, extracting the common feature vector from the digital image utilizing the common network layers comprises: extracting a latent feature vector from the digital image utilizing a first subset of the common network layers; and extracting the common feature vector from the latent feature vector utilizing a second subset of the common network layers.

As further shown in FIG. 13, the acts 1300 include an act 1330 of generating three-dimensional ("3D") source-specific-lighting parameters utilizing parametric-specific-network layers of the source-specific-lighting-estimation-neural network. For example, in some implementations, generating the 3D-source-specific-lighting parameters comprises applying a first set of parametric-specific-network layers to the common feature vector to generate a first set of 3D-source-specific-lighting parameters for a first lighting parameter; and applying a second set of parametric-specific-network layers to the common feature vector to generate a second set of 3D-source-specific-lighting parameters for a second lighting parameter.

As indicated above, in some embodiments, generating the 3D-source-specific-lighting parameters comprises applying different sets of the parametric-specific-network layers to generate: 3D-source-specific-distance parameters estimating one or more distances of one or more light sources from a reference point; 3D-source-specific-direction parameters estimating one or more directions of the one or more light sources with respect to the reference point; source-specific-size parameters estimating one or more sizes of the one or more light sources; and source-specific-color parameters estimating one or more colors of the one or more light sources.

Additionally, or alternatively, in certain implementations, generating the 3D-source-specific-lighting parameters comprises applying the parametric-specific-network layers to the common feature vector to: generate a first set of 3D-source-specific-lighting parameters corresponding to a first predicted light source illuminating the digital image; and generate a second set of 3D-source-specific-lighting parameters corresponding to a second predicted light source illuminating the digital image.

Further, in some embodiments, generating the 3D-source-specific-lighting parameters comprises generating 3D-source-specific-distance parameters estimating one or more distances of one or more light sources from a reference point based on the latent feature vector and 3D-source-specific-direction parameters utilizing distance-parametric-specific-network layers from the parametric-specific-network layers.

As further shown in FIG. 13, the acts 1300 include an act 1340 of rendering a modified digital image comprising the virtual object at the designated position illuminated according to the 3D-source-specific lighting parameters. For instance, in some embodiments, rendering the modified digital image comprises, based on receiving the request, rendering, within a graphical user interface of the computing device, a modified two-dimensional image comprising the virtual object at the designated position illuminated according to the 3D-source-specific-lighting parameters.

In addition to the acts 1310-1340, in some cases, the acts 1300 further include providing, for display on a computing device, a graphical user interface comprising: a first set of lighting parameter controls for a first set of 3D-source-specific-lighting parameters corresponding to a first predicted light source illuminating the modified digital image; and a second set of lighting parameter controls for a second set of 3D-source-specific-lighting parameters corresponding to a second predicted light source illuminating the modified digital image. Similarly, in certain implementations, the acts 1300 further include providing, for display on a computing device, a graphical user interface comprising a set of lighting parameter controls for a set of 3D-source-specific-lighting parameters corresponding to a predicted light source illuminating the modified digital image; and, based on detecting a user interaction with a lighting parameter control from among the set of lighting parameter controls, adjusting one or more 3D-source-specific-lighting parameters from the set of 3D-source-specific-lighting parameters corresponding to the predicted light source.

Further in one or more embodiments, the acts 1300 further include identifying a position-adjustment request to move the virtual object from the designated position within the digital image to a new designated position within the digital image; adjusting a projection of the 3D-source-specific-lighting parameters for the new designated position within the digital image; and based on the position-adjustment request, rendering an adjusted digital image comprising the virtual object at the new designated position illuminated according to the adjusted projection of the 3D-source-specific-lighting parameters.

Figure 14:
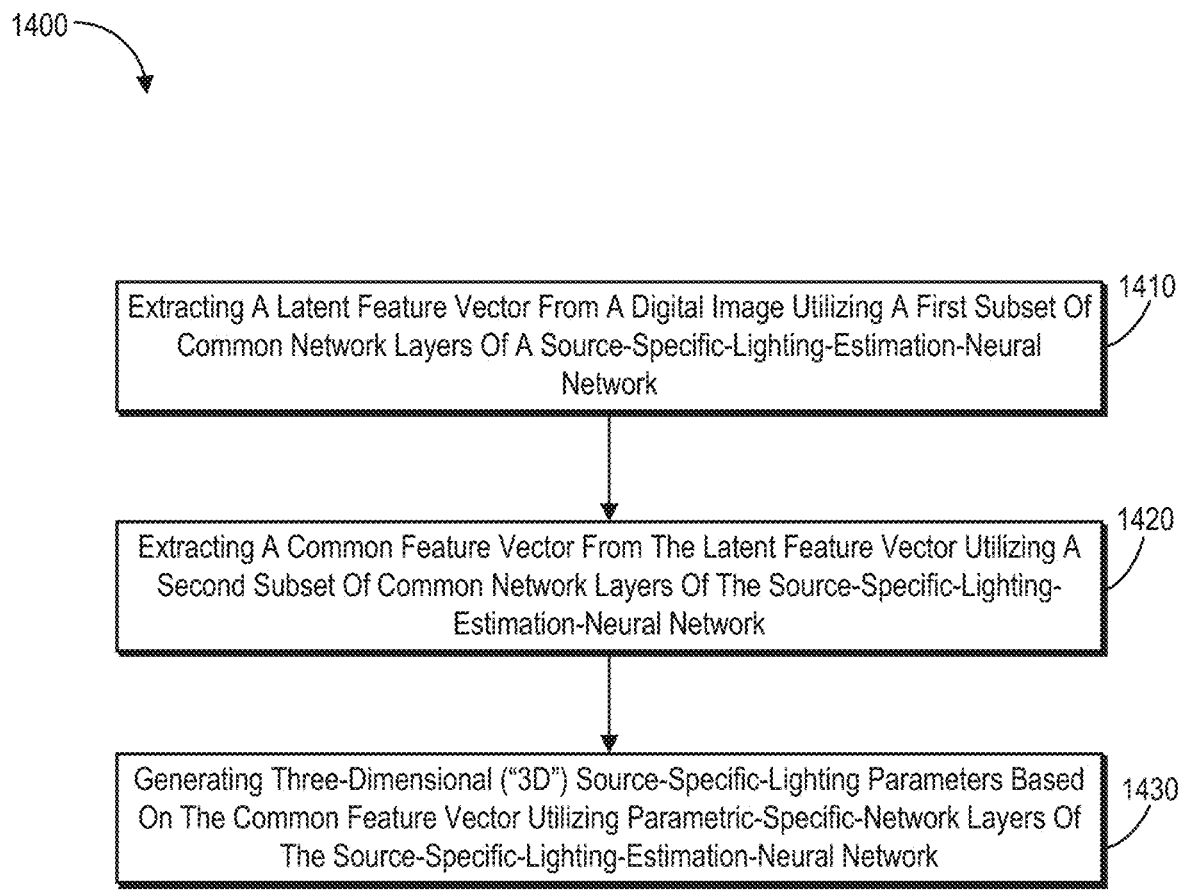

Turning now to FIG. 14, this figure illustrates a flowchart of a series of acts 1400 of using a source-specific-lighting-estimation-neural network to generate 3D-source-specific-lighting parameters for a digital image in accordance with one or more embodiments. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable storage medium can comprise instructions that, when executed by one or more processors, cause a computing device to perform the acts depicted in FIG. 14. In still further embodiments, a system comprising one or more memory devices and one or more server devices can perform the acts of FIG. 14.

As shown in FIG. 14, the acts 1400 include an act 1410 of extracting a latent feature vector from a digital image utilizing a first subset of common network layers of a source-specific-lighting estimation-neural network and act 1420 of extracting a common feature vector from the latent feature vector utilizing a second subset of common network layers of the source-specific-lighting estimation-neural network.

As further shown in FIG. 14, the acts 1400 include an act 1430 of generating three-dimensional ("3D") source-specific-lighting parameters based on the common feature vector utilizing parametric-specific-network layers of the source-specific-lighting-estimation-neural network. For example, in some implementations, generating the 3D-source-specific-lighting parameters comprises generating 3D-source-specific-distance parameters estimating one or more distances of one or more light sources from a reference point based on the latent feature vector utilizing distance-parametric-specific-network layers of the parametric-specific-network layers; and generating source-specific-lighting parameters based on the common feature vector utilizing additional parametric-specific-network layers of the parametric-specific-network layers.

As indicated above, in some embodiments, generating the source-specific-lighting parameters comprises applying different sets of the additional parametric-specific-network layers to generate: 3D-source-specific-direction parameters estimating one or more directions of the one or more light sources with respect to the reference point; source-specific-size parameters estimating one or more sizes of the one or more light sources; and source-specific-color parameters estimating one or more colors of the one or more light sources.

Additionally, generating the 3D-source-specific-distance parameters comprises: generating a first set of 3D-source-specific-distance parameters corresponding to a first predicted light source illuminating the digital image; and generating a second set of 3D-source-specific-distance parameters corresponding to a second predicted light source illuminating the digital image.

In addition to the acts 1410-1430, in some cases, the first subset of common network layers comprises an encoder from a densely connected convolutional network, the second subset of common network layers comprises fully connected layers, and each set of the parametric-specific-network layers comprise a parametric-specific decoder. Further, in certain implementations, the acts 1400 further include identifying a request to render a virtual object at a designated position within the digital image; and based on the request, rendering a modified digital image comprising the virtual object at the designated position illuminated according to the 3D-source-specific-lighting parameters.

Additionally, or alternatively, in certain embodiments, the acts 1400 further include identifying a perspective-adjustment request to render the virtual object at the designated position within the digital image from a different point of view; extracting a new latent feature vector from the digital image from the different point of view utilizing the first subset of common network layers; extracting a new common feature vector from the new latent feature vector utilizing the second subset of common network layers; generating new 3D-source-specific-lighting parameters based on the new common feature vector utilizing the parametric-specific-network layers; and based on the perspective-adjustment request, rendering an adjusted digital image comprising the virtual object at the new designated position illuminated according to the new 3D-source-specific-lighting parameters.

As noted above, in some embodiments, a lighting estimation system trains a source-specific-lighting-estimation-neural network. For example, in some embodiments, the acts 1400 further include training the source-specific-lighting-estimation-neural network in a first training stage by: generating 3D-source-specific-predicted-lighting parameters based on a common-feature-training vector extracted from a digital training image utilizing the source-specific-lighting-estimation-neural network; applying a differentiable-projection layer to the 3D-source-specific-predicted-lighting parameters to project a predicted environment map corresponding to the digital training image; comparing the predicted environment map to a ground-truth-environment map corresponding to the digital training image to determine an environment-map loss; and modifying internal parameters of the source-specific-lighting-estimation-neural network based on the environment-map loss.

Further, in certain implementations, the acts 1400 further include training the source-specific-lighting-estimation-neural network in a second training stage by: generating subsequent 3D-source-specific-predicted-lighting parameters based on a subsequent common-feature-training vector extracted from a subsequent digital training image utilizing the source-specific-lighting-estimation-neural network; comparing the subsequent 3D-source-specific-predicted-lighting parameters to ground-truth-source-specific-lighting parameters corresponding to the subsequent digital training image to determine lighting parameter losses; and modifying internal parameters of the parametric-specific-network layers based on the lighting parameter losses while maintaining internal parameters of the first and second subsets of common network layers.

Relatedly, in one or more embodiments, training the source-specific-lighting-estimation-neural network comprises: adding the distance-parametric-specific-network layers to the parametric-specific-network layers for the second training stage; and generating 3D-source-specific-predicted-distance parameters as part of the subsequent 3D-source-specific-predicted-lighting parameters, the 3D-source-specific-predicted-distance parameters estimating one or more distances of one or more predicted light sources from the reference point utilizing the distance-parametric-specific-network layers.

Further, in some embodiments, comparing the subsequent 3D-source-specific-predicted-lighting parameters to the ground-truth-source-specific-lighting parameters to determine the lighting parameter losses comprises: comparing subsequent 3D-source-specific-predicted-distance parameters for a predicted light source to ground-truth-source-specific-distance parameters to determine a distance-parameter loss; comparing subsequent 3D-source-specific-predicted-size parameters for the predicted light source to ground-truth-source-specific-size parameters to determine a size-parameter loss; and comparing subsequent 3D-source-specific-predicted-color parameters for the predicted light source to ground-truth-source-specific-color parameters to determine a color-parameter loss.

In addition (or in the alternative) to the acts describe above, in some embodiments, the acts 1300 or the acts 1400 include a step for generating three-dimensional ("3D") source-specific-lighting parameters for the digital image by utilizing a source-specific-lighting-estimation-neural network. For instance, the algorithms and acts described in reference to FIG. 4C can comprise the corresponding acts for performing a step for generating three-dimensional ("3D") source-specific-lighting parameters for the digital image by utilizing a source-specific-lighting-estimation-neural network.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 15:
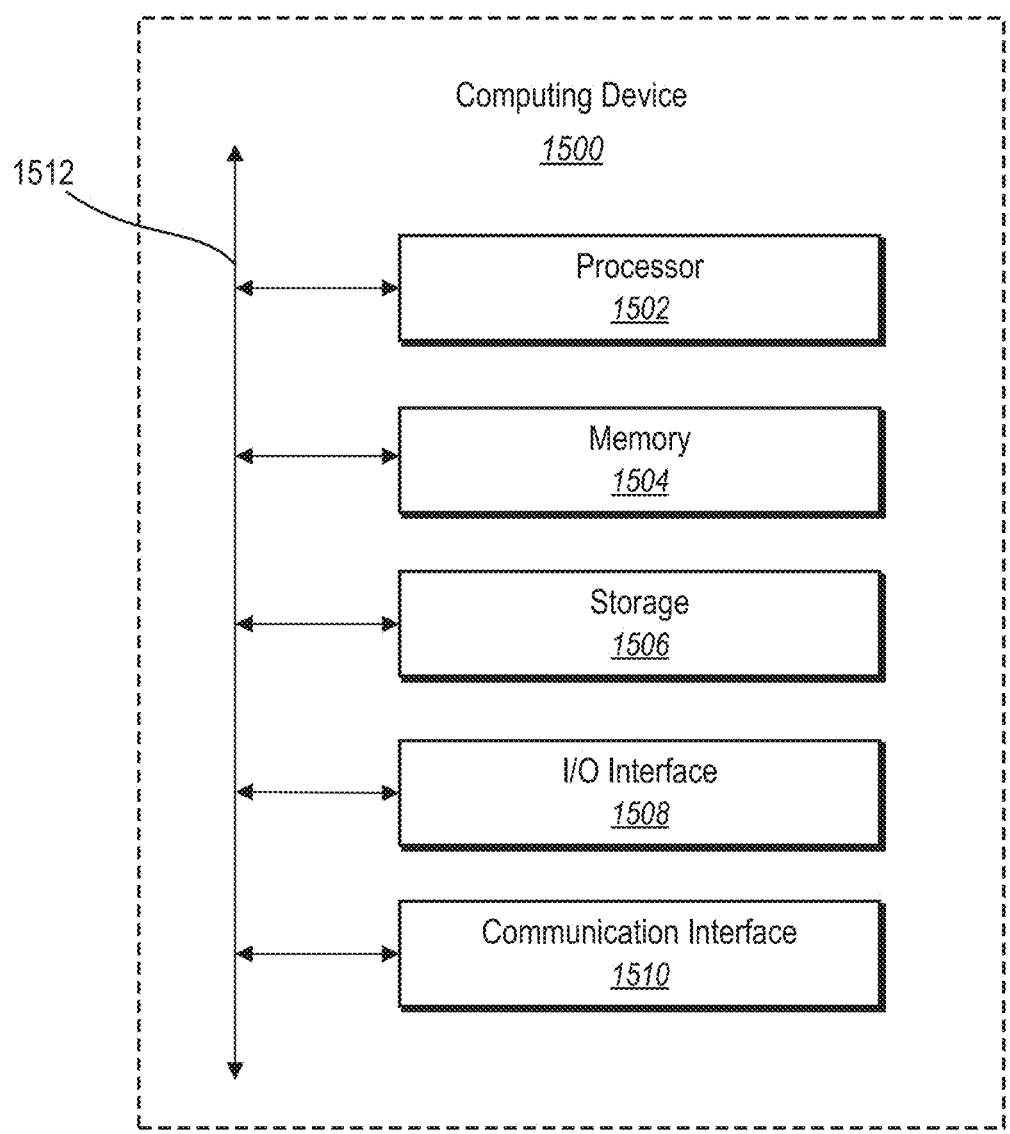
FIG. 15 illustrates a block diagram of an exemplary computing device for implementing one or more embodiments of the present disclosure.

FIG. 15 illustrates a block diagram of exemplary computing device 1500 that may be configured to perform one or more of the processes described above. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example, and not by way of limitation, to execute instructions for digitizing real-world objects, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions related to object digitizing processes (e.g., digital scans, digital models).

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example and not by way of limitation, the communication interface 1510 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computing device to:
    identify a request to render a virtual object at a designated position within a digital image;
    extract a common feature vector from the digital image utilizing common network layers of a source-specific-lighting-estimation-neural network;
    generate, utilizing separate parallel parametric-specific-network layers, a plurality of different three-dimensional ("3D") source-specific-lighting parameters of a light source illuminating the digital image comprising a first 3D source-specific-lighting parameter of the light source and a second 3D source-specific-lighting parameter of the light source by:
        generating the first 3D source-specific-lighting parameter of the light source by processing the common feature vector from the common network layers utilizing a first parametric-specific-network layer of the source-specific-lighting-estimation-neural network; and
        generating the second 3D source-specific-lighting parameter of the light source by processing the common feature vector from the common network layers utilizing a second parametric-specific-network layer of the source-specific-lighting-estimation-neural network, the second parametric-specific-network layer being different than the first parametric-specific-network layer and in parallel with the first parametric-specific-network layer; and
    based on the request, render a modified digital image comprising the virtual object at the designated position illuminated according to the plurality of different 3D-source-specific-lighting parameters of the light source.

2. The non-transitory computer readable medium of claim 1, further comprising instructions that, when executed by the at least one processor, cause the computing device to generate the plurality of different 3D-source-specific-lighting parameters by:
    generating, utilizing the separate parallel parametric-specific-network layers, a first set of different 3D-source-specific-lighting parameters corresponding to a first predicted light source illuminating the digital image; and generating, utilizing the separate parallel parametric-specific-network layers, a second set of different 3D-source-specific-lighting parameters corresponding to a second predicted light source illuminating the digital image.

3. The non-transitory computer readable medium of claim 1, further comprising instructions that, when executed by the at least one processor, cause the computing device to provide, for display on the computing device, a graphical user interface comprising:
   a first set of lighting parameter controls for a first set of different 3D-source-specific-lighting parameters corresponding to a first predicted light source illuminating the modified digital image; and
   a second set of lighting parameter controls for a second set of different 3D-source-specific-lighting parameters corresponding to a second predicted light source illuminating the modified digital image.

4. The non-transitory computer readable medium of claim 1, further comprising instructions that, when executed by the at least one processor, cause the computing device to:
   identify a position-adjustment request to move the virtual object from the designated position within the digital image to a new designated position within the digital image;
   adjust a projection of the plurality of different 3D-source-specific-lighting parameters for the new designated position within the digital image; and
   based on the position-adjustment request, render an adjusted digital image comprising the virtual object at the new designated position illuminated according to the adjusted projection of the plurality of different 3D-source-specific-lighting parameters.

5. The non-transitory computer readable medium of claim 1, wherein:
   the instructions, when executed by the at least one processor, cause the computing device to generate the plurality of different 3D source-specific-lighting parameters by inferring the plurality of different 3D-source-specific-lighting parameters directly from the common feature vector; and
   the source-specific-lighting-estimation-neural network comprises less than ten million network parameters.

6. In a digital medium environment for rendering digitally altered scenes, a computer-implemented method for estimating parametric lighting conditions, comprising:
   identifying a request to render a virtual object at a designated position within a digital image;
   extracting a common feature vector from the digital image utilizing common network layers of a source-specific-lighting-estimation-neural network;
   generating, utilizing separate parallel parametric-specific-network layers, a plurality of different three-dimensional ("3D") source-specific-lighting parameters of a light source illuminating the digital image comprising a first 3D source-specific-lighting parameter of the light source and a second 3D source-specific-lighting parameter of the light source by:
      generating the first 3D source-specific-lighting parameter of the light source by processing the common feature vector from the common network layers utilizing a first parametric-specific-network layer of the source-specific-lighting-estimation-neural network; and
      generating the second 3D source-specific-lighting parameter of the light source by processing the common feature vector from the common network layers utilizing a second parametric-specific-network layer of the source-specific-lighting-estimation-neural network, the second parametric-specific-network layer being different than the first parametric-specific-network layer and in parallel with the first parametric-specific-network layer; and
   based on the request, rendering a modified digital image comprising the virtual object at the designated position illuminated according to the plurality of different 3D-source-specific-lighting parameters of the light source.

7. The computer-implemented method of claim 6, further comprising:
   receiving, from a computing device, the request to render the virtual object at the designated position within a two-dimensional image; and
   based on receiving the request, rendering, within a graphical user interface of the computing device, a modified two-dimensional image comprising the virtual object at the designated position illuminated according to the plurality of different 3D-source-specific-lighting parameters.

8. A system comprising:
   one or more memory devices storing a digital image and a source-specific-lighting-estimation-neural network; and
   one or more server devices that cause the system to:
      identify a request to render a virtual object at a designated position within the digital image;
      extract a common feature vector from the digital image utilizing common network layers of a source-specific-lighting-estimation-neural network;
      generate, utilizing separate parallel parametric-specific-network layers, a plurality of different three-dimensional ("3D") source-specific-lighting parameters of a light source illuminating the digital image comprising a first 3D source-specific-lighting parameter of the light source and a second 3D source-specific-lighting parameter of the light source by:
         generating the first 3D source-specific-lighting parameter of the light source by processing the common feature vector from the common network layers utilizing a first parametric-specific-network layer of the source-specific-lighting-estimation-neural network; and
         generating the second 3D source-specific-lighting parameter of the light source by processing the common feature vector from the common network layers utilizing a second parametric-specific-network layer of the source-specific-lighting-estimation-neural network, the second parametric-specific-network layer being different than the first parametric-specific-network layer and in parallel with the first parametric-specific-network layer; and
      based on the request, render a modified digital image comprising the virtual object at the designated position illuminated according to the plurality of different 3D-source-specific-lighting parameters of the light source.

9. The system of claim 8, wherein the one or more server devices cause the system to generate the plurality of different 3D-source-specific-lighting parameters by:
   generating, utilizing the separate parallel parametric-specific-network layers, a first set of different 3D-sourcespecific-lighting parameters corresponding to a first predicted light source illuminating the digital image; and generating, utilizing the separate parallel parametric-specific-network layers, a second set of different 3D-source-specific-lighting parameters corresponding to a second predicted light source illuminating the digital image.

10. The system of claim 8, wherein the one or more server devices cause the system to provide, for display on a computing device, a graphical user interface comprising:
   a first set of lighting parameter controls for a first set of different 3D-source-specific-lighting parameters corresponding to a first predicted light source illuminating the modified digital image; and
   a second set of lighting parameter controls for a second set of different 3D-source-specific-lighting parameters corresponding to a second predicted light source illuminating the modified digital image.

11. The system of claim 10, wherein the one or more server devices further cause the system to:
   detect a user interaction with a lighting parameter control from the first set of lighting parameter controls; and
   in response to the user interaction, adjust one or more 3D-source-specific-lighting parameters from the first set of different 3D-source-specific-lighting parameters corresponding to the first predicted light source.

\* \* \* \* \*